(12) United States Patent
Ravuru et al.

(10) Patent No.: US 11,647,238 B2
(45) Date of Patent: May 9, 2023

(54) GENERATION AND DELIVERY OF CONTENT VIA REMOTE RENDERING AND DATA STREAMING

(71) Applicant: META PLATFORMS, INC., Menlo Park, CA (US)

(72) Inventors: Rakesh Ravuru, Santa Clara, CA (US); Brian Fox, Chicago, IL (US); Keenan Christopher Pridmore, Wilmette, IL (US); Miguel Angel Perez, Brooklyn, NY (US); Xin Zhou, San Francisco, CA (US); Adetunji Toritseju Olojede, Oakland, CA (US); Kyle Scot Shank, Bar Harbor, ME (US); Robert Thomas Moakler, Brooklyn, NY (US); Nikhil Girish Nawathe, Brooklyn, NY (US); Lara Jessamine Andrews, Brooklyn, NY (US); Tatiana Borrell Peck, Brooklyn, NY (US); Rotem Druker, Kirkland, WA (US); Siqi Huang, Redmond, WA (US); Siyi Wang, Kirkland, WA (US); Hoang Viet Nguyen, Seattle, WA (US)

(73) Assignee: META PLATFORMS, INC., Menlo Park, CA (US)

(*) Notice: Subject to any disclaimer, the term of this patent is extended or adjusted under 35 U.S.C. 154(b) by 0 days.

(21) Appl. No.: 17/522,746

(22) Filed: Nov. 9, 2021

(65) Prior Publication Data
US 2022/0150553 A1 May 12, 2022

Related U.S. Application Data

(60) Provisional application No. 63/195,755, filed on Jun. 2, 2021, provisional application No. 63/163,456, filed
(Continued)

(51) Int. Cl.
*H04N 21/235* (2011.01)
*H04N 21/462* (2011.01)

(52) U.S. Cl.
CPC ......... *H04N 21/235* (2013.01); *H04N 21/462* (2013.01)

(58) Field of Classification Search
CPC .......................... H04N 21/235; H04N 21/462
(Continued)

(56) References Cited

U.S. PATENT DOCUMENTS 9,460,451 B2  10/2016  Ruiz et al.
9,769,544 B1*  9/2017  Pau ...................... H04N 21/254
(Continued)

OTHER PUBLICATIONS

Rotem Durker "Facebook for Developers, Carrying Over Reactions", Nov. 1, 2017, 2 pages. <https://developers.facebook.com/ads/blog/post/2017/07/18/transfering-reactions/>.
(Continued)

*Primary Examiner* — Dominic D Saltarelli
(74) *Attorney, Agent, or Firm* — Mannava & Kang, P.C.

(57) ABSTRACT

According to examples, a system for generating and delivering enhanced content utilizing remote rendering and data streaming is described. The system may include a processor and a memory storing instructions. The processor, when executing the instructions, may cause the system to transmit a selected engagement content item for transmission to a user device and receive an indication of interest relating to the selected engagement content item. The processor, when executing the instructions, may then select, based on the received indication of interest, an enhanced content item, process the enhanced to content item to generate a stream of content data associated with the enhanced content item and transmit the stream of content data associated with the enhanced content item to the user device.

20 Claims, 33 Drawing Sheets

Related U.S. Application Data on Mar. 19, 2021, provisional application No. 63/141,849, filed on Jan. 26, 2021, provisional application No. 63/111,470, filed on Nov. 9, 2020.

(58) Field of Classification Search
USPC .......................................................... 725/34
See application file for complete search history.

(56) References Cited

U.S. PATENT DOCUMENTS

| | | | |
|---|---|---|---|
| 10,080,966 | B2 | 9/2018 | Relan et al. |
| 10,108,979 | B2 | 10/2018 | Shulman et al. |
| 10,387,921 | B1 | 8/2019 | Lewis |
| 10,467,659 | B2 | 11/2019 | Chalasani et al. |
| 10,572,908 | B2 | 2/2020 | Kulkarni et al. |
| 2007/0027760 | A1 | 2/2007 | Collins et al. |
| 2008/0117448 | A1 | 5/2008 | Ijams et al. |
| 2008/0249855 | A1 | 10/2008 | Collins et al. |
| 2009/0100459 | A1* | 4/2009 | Riedl ............... H04N 21/2405 725/35 |
| 2009/0187481 | A1 | 7/2009 | Bonzi et al. |
| 2009/0254931 | A1* | 10/2009 | Pizzurro ........... H04N 21/2668 725/60 |
| 2010/0146380 | A1 | 6/2010 | Rousso et al. |
| 2013/0117107 | A1* | 5/2013 | Evans ............... G06Q 30/0276 705/14.72 |
| 2014/0068676 | A1* | 3/2014 | Lin .................... H04N 21/8455 725/50 |
| 2014/0156416 | A1 | 6/2014 | Goenka et al. |
| 2014/0324604 | A1 | 10/2014 | Munoz Torres et al. |
| 2015/0150046 | A1* | 5/2015 | Maharajh ............. H04W 4/06 725/34 |
| 2015/0312626 | A1* | 10/2015 | Hoctor ............... H04N 21/4821 725/12 |
| 2015/0358687 | A1* | 12/2015 | Kummer ........... H04N 21/4756 725/34 |
| 2016/0173926 | A1* | 6/2016 | Abed ................. H04N 21/4332 725/28 |
| 2018/0130092 | A1 | 5/2018 | Nahass et al. |
| 2018/0225718 | A1 | 8/2018 | Mohamed et al. |
| 2018/0300745 | A1 | 10/2018 | Aubespin et al. |
| 2019/0073691 | A1 | 3/2019 | Hanegby et al. |
| 2019/0205919 | A1 | 7/2019 | Goksel et al. |
| 2020/0202382 | A1 | 6/2020 | Chen et al. |
| 2020/0220916 | A1 | 7/2020 | Ahmed et al. |
| 2020/0334691 | A1 | 10/2020 | Nadig |
| 2022/0222373 | A1* | 7/2022 | Villax ................. G06F 21/6254 |

OTHER PUBLICATIONS

Josh Sturgeon, "How to Reuse Facebook Ads With The Most Social Proof", Embertribe, Nov. 6, 2020, 10 pages. <https://blog.embertribe.com/reuse-facebook-ads-social-proof-qtt-16>.

AdEspresso.com, "Reuse ads and posts", 1 page. <https://support.adespresso.com/hc/en-us/articles/360041128353-Reuse-ads-and-posts>.

Facebook for Business, "Create Ads From Existing Posts in Ads Manager", Dec. 7, 2020, 4 pages. <https://www.facebook.com/business/help/374756690038600?id=649869995454285>.

Youtube.com, "How to Use Existing Posts in Facebook Ad Campaigns (FB Ads Tutorial)" <https://www.youtube.com/watch?v=X21X8bL4UPA>.

"Using templates—Google Web Designer Help", downloaded online on Jan. 25, 2021, 4 pages. <https://support.google.com/webdesigner/answer/6185261?hl=en>.

Parsec, "A Look at Game Streaming Tech in the Browser", Oct. 15, 2018, 8 pages. <https://blog.parsecgaming.com/game-streaming-tech-in-the-browser-with-parsec-5b70d0f359bc>.

Video with a demo version (Playable Ads) (type:video+HTML5, objective: in-app Installs), downloaded online on Sep. 15, 2020 <https://target.my.com/help/advertisers/adformatplayableads/en>.

* cited by examiner

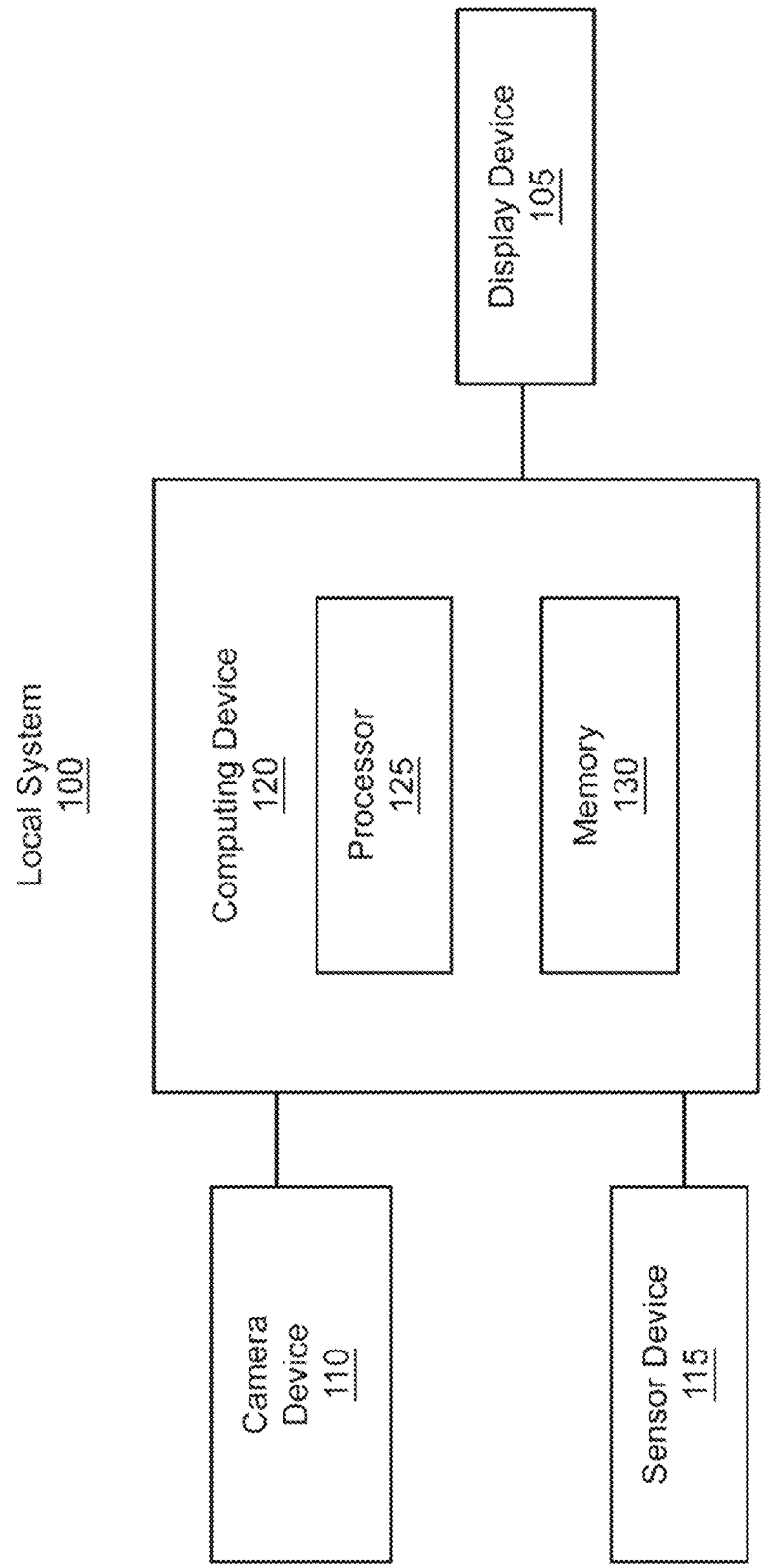

20

GENERATION AND DELIVERY OF CONTENT VIA REMOTE RENDERING AND DATA STREAMING

PRIORITY

This patent application claims priority to U.S. Provisional Patent Application No. 63/111,470, entitled "Digital Content Customization using Artificial Intelligence (AI) Based Audience Detection Techniques," filed on Nov. 9, 2020, U.S. Provisional Patent Application No. 63/141,849, entitled "Generation and Delivery of Content Via Remote Rendering and Data Streaming," filed on Jan. 26, 2021, U.S. Provisional Patent Application No. 63/163,456, entitled "Generation and Implementation of Quantitative Indicators to Measure and Predict Impact of Creative Qualities of Content Items," filed on Mar. 19, 2021, and U.S. Provisional Patent Application No. 63/195,755, entitled "Content Previews and Social Data Aggregation," filed on Jun. 2, 2021, all of which are hereby incorporated by reference herein in their entireties.

TECHNICAL FIELD

This patent application relates generally to generation and delivery of content, and more specifically, to systems and methods for generation and delivery of enhanced content utilizing remote rendering and data streaming. This patent application also relates generally to digital content customization via audience detection, and more specifically, to systems and methods for utilizing artificial intelligence (AI) based audience detection techniques and mechanisms to deliver customized digital content over communications devices. This patent application further relates generally to measuring and analyzing content items, and more specifically, to systems and methods for generation and implementation of quantitative indicators to measure and predict impact of creative qualities of content items, including gathering information relating to a content item, determining one or more input values associated with the content item, and iteratively adjusting a model utilizing the one or more input values to generate an quantitative indicator to measure and predict impact of creative qualities of the content item. This patent application also relates generally to content processing on social media platforms.

BACKGROUND

With recent advances in technology, the prevalence and proliferation of digital content creation and delivery has increased greatly in recent years. Content providers are continuously looking for ways to deliver more appealing content. One way to deliver more appealing content may be to deliver content of higher visual quality. For example, content presented in high-definition (HD) typically may be more appealing than a content presented in standard definition (SD). Higher quality content may typically require more storage than lower quality content. This may present a problem to service providers trafficking in content distribution, as they may be reluctant to assume associated costs. As a result, service providers may impose size limitations for content items on their platforms. This may often lead to less appealing content and less interest and less engagement from users.

Content providers are also continuously looking to create outreach efforts that will gain attention from viewers. An effective outreach campaign may be a result of a number of factors, such as targeting, execution and creative qualities. These factors may be quantified for prediction and optimization. As effectiveness (i.e., appeal) of creative quality may appear to be subjective, impact of creative quality of a content item may be difficult to quantify and predict. Consequently, measuring the impact of creative quality on incremental business outcomes has been a persistent challenge.

Additionally, signage displays may also provide a way to provide content to a user. A digital signage display device may include any device configured to display visual content, for example, to a local audience of viewers. Digital signage display devices are typically placed at locations where people gather (e.g., malls, restaurants, bus stops, etc.), as this provides a digital content provider, such as an advertiser, an opportunity to display digital content, such as advertisements, to one or more people at the same time and/or on a continuous basis. However, these digital signage display devices are not "intelligent," in that are typically incapable of displaying digital content that are tailored or specific to the particular audience, location or context.

Furthermore, social media platforms permit entities including individuals and organizations to share news about themselves or news that is of particular interest to them via their exclusive 'pages'. A specific page is assigned to a particular entity to allow the entity to share information or news or even advertisements associated with the entity. An entity's page may be public so that it is viewable by anyone who may visit the social media website or it may be private so that only select users of the social media platform permitted by the entity may access the page. An entity may also have a page designated as a public page and another page designated as a private page. A Page post may be a message that is shared from the entity's 'Page'. Some of the features of page posts may include post options wherein different content types can be chosen, a content box where the text to be shown in the message is added, and sharing options wherein the user selects where, when and who sees the post. The post may show up in the entity's timeline and may also appear in the newsfeed of other entities who may like or follow the entity's page.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 1A illustrates a block diagram of a local system that may be implemented to utilize audience detection to deliver customized digital content over communications devices, according to an example.

DETAILED DESCRIPTION

Figure 1B:
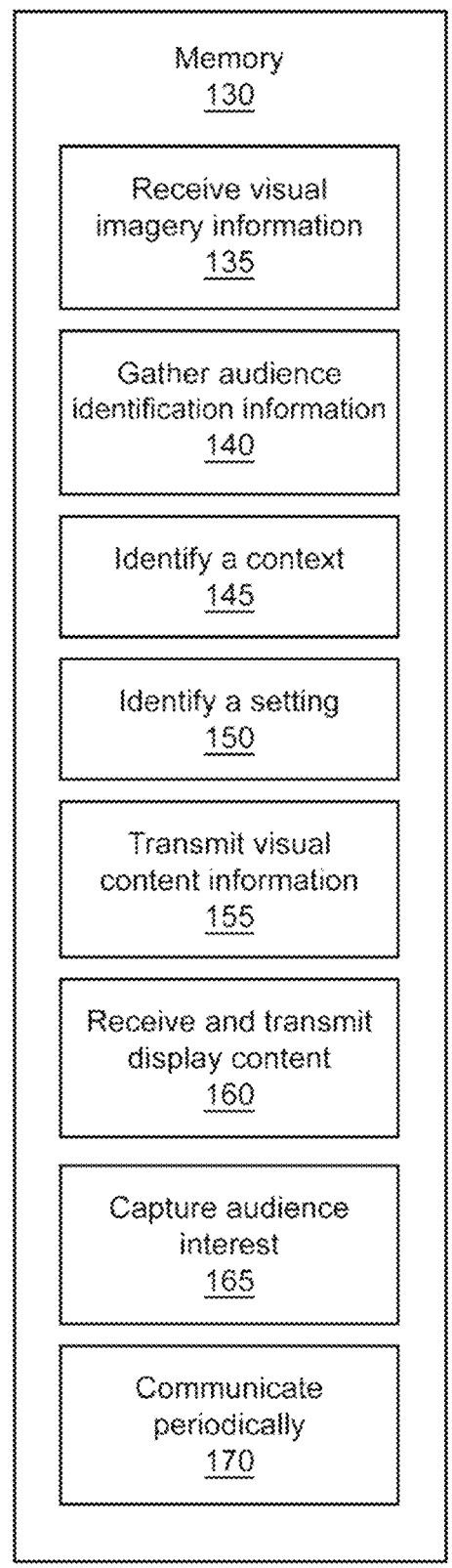
FIG. 1B illustrates a block diagram of a memory including computer readable instructions, that when executed by a processor may be configured to utilize audience detection to deliver customized digital content over communications devices, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Typically, advertising content is designed to inform an audience of a product or service being offered. With the proliferation of different types of digital content delivery mechanisms (e.g., mobile phone devices, tablet devices, etc.), it is very important to gain the attention of audience members with content that is of interest to them.

One mechanism to deliver such digital content may be digital signage display devices. However currently, these digital signage display devices are not "intelligent", in that are typically incapable of displaying digital content that is specific to the particular audience, location or context. Consequently, for a member of the viewing audience, there is a risk that the audience member will have minimal or no interest the advertising content. For an advertiser, the display time will have been wasted and the resources expended to acquire the display time will have been misspent.

Systems and methods for delivering personalized and context-aware digital content via intelligent detection and analysis of a viewing audience are disclosed herein. As used herein, "digital content", "digital content item" and "content item" may refer to any digital data (e.g., a data file). Examples of digital content items include, but are not limited to, digital images, digital video files, digital audio files, and/or streaming content. It should also be appreciated that the systems and methods described herein may be particularly suited for digital content, such as video, animation and/or other interactive media, some or all of which may be associated with any number of online actions, advertisements, and/or financial transactions. These and other benefits will be apparent in the description provided herein.

The systems and methods described herein may, provide customized and context-aware generation and delivery of digital content (e.g., an advertisement). That is, the systems and methods disclosed may enable, among other things, intelligent detection of a viewing audience within a display distance of a display device, analysis of detected information relating to the viewing audience to determine one or more characteristics of the viewing audience and determining of display content that is likely to be of interest to the viewing audience.

In one example, for audience members, the systems and methods disclosed may determine and analyze characteristics (e.g., preferences) relating to the audience members and other related information (e.g., context, location) to create and deliver display content that is personalized and context-specific. In one example, for advertisers, the systems and methods disclosed may provide targeted delivery of their digital content to audience members predetermined to likely to have interest.

Figure 1C:
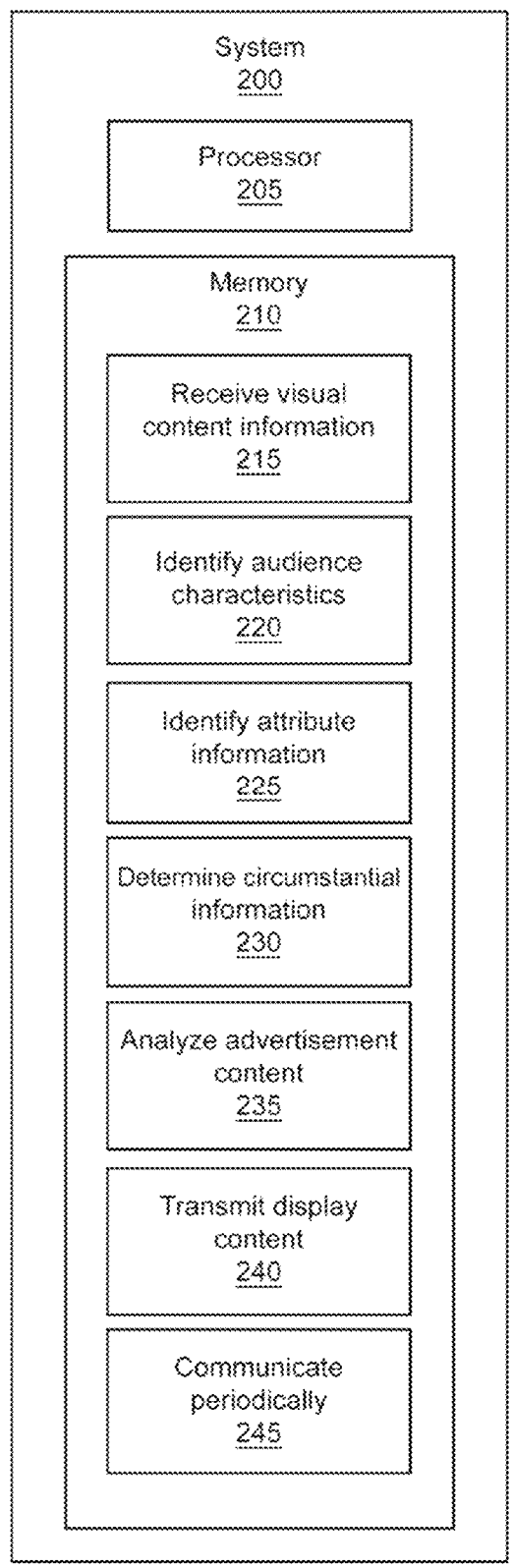
FIG. 1C illustrates a block diagram of a system that may be implemented to utilize audience detection to deliver customized digital content over communications devices, according to an example.
Figure 1D:
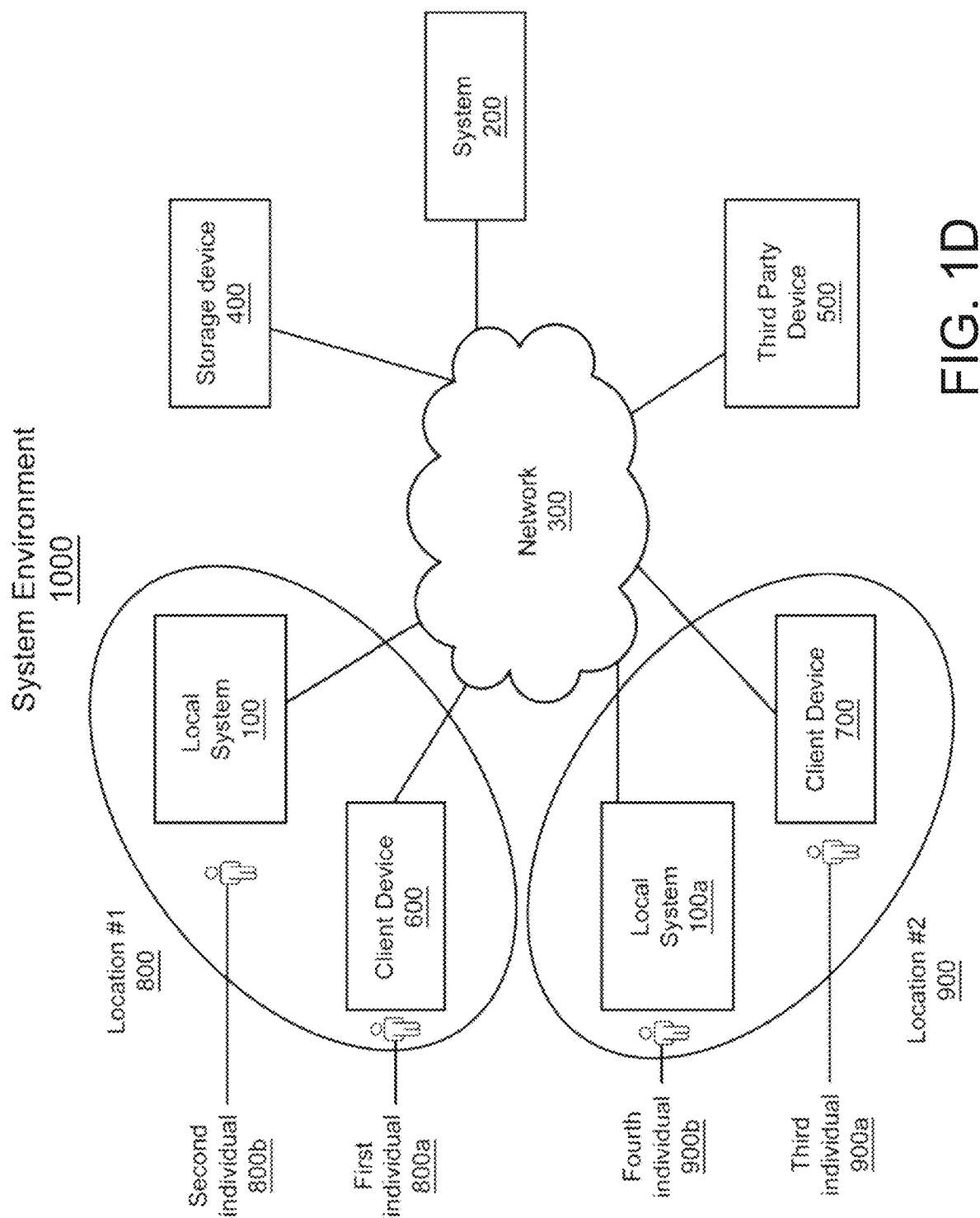
FIG. 1D illustrates a block diagram of a system environment, including the system and the local system, that may be implemented to utilize audience detection to deliver customized digital content over communications devices, according to an example.

Reference is now made with respect to FIGS. 1A-D. FIG. 1A illustrates a block diagram of a local system 100 that may be implemented to utilize audience detection to deliver customized digital content over communications devices, according to an example. FIG. 1B illustrates a block diagram of a memory 130 including computer readable instructions, that when executed by a processor may be configured to utilize audience detection to deliver customized digital content over communications devices, according to an example. FIG. 1C illustrates a block diagram of a system 200 that may be implemented to utilize audience detection to deliver customized digital content over communications devices, according to an example. FIG. 1D illustrates a block diagram of a system environment 1000, including the system and the local system, that may be implemented to utilize audience detection to deliver customized digital content over communications devices, according to an example.

It should be appreciated that system environment 1000, local systems 100, 100a, and system 200 depicted in FIGS. 1A-D may be provided as examples. Thus, system environment 1000, the local systems 100, 100a, and the system 200 may or may not include additional features and some of the features described herein may be removed and/or modified without departing from the scopes of the system environment 1000, the local systems 100, 100a, and the system 200 outlined herein.

As shown in FIGS. 1A-B, the local system 100 may include a display device 105, a camera device 110, a sensor device 115 and a computing device 120, including a processor 125 and a memory 130. As shown in FIG. 1C, the system 200 may include a processor 205 and a memory 210. As shown in FIG. 1D, the system environment 1000 may include the local systems 100, 100a, the system 200, network 300, storage device 400, and third-party device 500.

In one example, and as will be described further below, one or more of the local system 100, the system 200, and the storage device 400 may be operated by a service provider to create and deliver personalized and context-aware digital content via intelligent detection and analysis of a viewing audience. In some examples, the local system 100, the system 200, and/or the storage device 400 may be or associated with a social networking system, a content sharing network, an advertisement system, an online system, and/or any other system that facilitates any variety of digital content in personal, social, commercial, financial, and/or enterprise environments. In one example, the service provider may be a social media application provider.

As illustrated in FIG. 1D, the system environment 1000 may include a first location 800 (e.g., a mall) comprising a viewing audience with a first individual 800a holding a client device 600 and a second individual 800b, wherein the first individual 800a and the second individual 800b may be located within a viewing distance of a display device of the local system 100. In one example, the client device 600 may be a smartphone configured to provide access to the social media application of the service provider.

The system environment may also include a second location 900 (e.g., an airport) comprising a viewing audience with a third individual 900a holding a client device 700 and a fourth individual 900b, wherein the third individual 900a and the fourth individual 900b may be located within a viewing distance of a display device of the local system 100a. The client devices 600, 700 may be electronic or computing devices configured to transmit and/or receive data (e.g., via a social media application), and in one example, the client device 600 may be a smartphone and the client device 700 may be a tablet.

The system environment 1000 may also include a network 300. In operation, one or more of the local systems 100, 100a, the system 200, the storage device 400 and the third-party device 500 may communicate with one or more of the other devices via the network 300. The network 300 may be a local area network (LAN), a wide area network (WAN), the Internet, a cellular network, a cable network, a satellite network, or other network that facilitates communication between the client devices 600, 700, the local systems 100, 100a, the system 200, and/or any other system, component, or device connected to the network 300. The network 300 may further include one, or any number, of the exemplary types of networks mentioned above operating as a stand-alone network or in cooperation with each other. For example, the network 300 may utilize one or more protocols of one or more clients or servers to which they are communicatively coupled. The network 300 may facilitate transmission of data according to a transmission protocol of any of the devices and/or systems in the network 300. Although the network 300 is depicted as a single network in the system environment 1000 of FIG. 1D, it should be appreciated that, in some examples, the network 300 may include a plurality of interconnected networks as well.

It should be appreciated that the systems and subsystems shown herein, as described herein, may include one or more servers or computing devices. Each of these servers or computing devices may further include a platform and at least one application. An application may include software (e.g., machine-readable instructions) stored on a non-transitory computer readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the local systems 100, 100a, the system 200, the storage device 400 or the system environment 1000.

The system environment 1000 may further include the storage device 400. In one example, the storage device 400 may include any number of servers, hosts, systems, and/or databases that store data to be accessed by the local systems 100, 100a, the system 200, and/or other network elements (not shown) in the system environment 1000. In addition, in one example, the servers, hosts, systems, and/or databases of the storage device 400 may include one or more storage mediums storing any data, and may be utilized to store information (e.g., user information, demographic information, preference information, etc.) relating to users of the social media application of the service provider.

The system environment 1000 may also include the third-party device 500. In one example, the third-party device 500 may be a merchant (also "advertiser") advertising goods and services. The third-party device 500 may be a computer system with any number of servers, hosts, systems, and/or databases that may be communicatively coupled to the network 300. In one example, the advertiser may utilize the third-party device to transmit digital content (e.g., advertising content) to the storage device 400.

Reference will now be made to FIG. 1A. In one example, the local system 100 may be configured by a service provider to create and deliver personalized and context-aware digital content via intelligent detection and analysis of a viewing audience. It should be appreciated that the local system 100 depicted in FIG. 1A may be provided as an example. Thus, the local system 100 may or may not include additional features and some of the features described herein may be removed and/or modified without departing from the scope of the local system 100 outlined herein. Details of the local system 100 and its operation within the system environment 1000 will be described in more detail below.

The local system 100 may include the display device 105. In one example, the display device 105 may be an output device configured to visually display digital content for a viewing audience, including the first individual 800a and the second individual 800b, within a viewing distance in the first location 800. The display device 105 may be incorporated directly into/with other components of the local system 100 (e.g., the computing device 120), or may separate from but communicably connected to the other components of the local system 100.

In one example, the display device 105 may be a wall-mounted digital billboard configured to display digital content that is changed every thirty seconds. The display device 105 may be configured to, among other things, receive and display digital content delivered from the local system 100 and/or the system 200 that is customized for the audience and context-aware. The display device 105 may be any type of display device, including but not limited to a liquid crystal display device (LCD), a light-emitting diode (LED) display device, an organic light emitting (OLED) display device, plasma display device, a cathode ray tube (CRT) display device or other types of display devices.

The local system 100 may also include the camera device 110. The camera device 110 may be configured to capture and/or record visual information (e.g., images, video), hereinafter referred to "visual imagery information", within a visual range of the camera device 110, hereinafter referred to as the "visual imagery range". The camera device 110 may be incorporated directly into/with other components of the local system 100 (e.g., the computing device 120), or may separate from but communicably connected to the other components of the local system 100.

In one example, the visual imagery range of the camera device 110 may be configured via any device operated by the service provider. In one example, the visual imagery range of the camera device 110 may be a range require to capture a predetermined number (e.g., one hundred) of individual subjects. In another example, the visual imagery range of the camera device 110 may be based on a predetermined numerical distance within the camera device 160. In yet another example, the visual imagery range of the camera device 110 may be an entirety of a location, such as the location 800.

The camera device 110 may implement various camera technologies. In one example, the camera device 110 may utilize a visual/optical (i.e., visible light) camera, such as a high-resolution digital camera. In another example, the camera device 110 may also incorporate other camera technologies, such as an infrared camera configured to capture infrared radiation. As will be discussed further below, the information gathered by the camera device 110 may be utilized (e.g., by the local system 100) to, for example, determine an identity of one or more individual subjects in a viewing audience (e.g., via facial recognition) or determine related settings or context information that may be utilized to create and deliver personalized and context-aware display content for the viewing audience. In other examples, the camera device 110 may incorporate other types of visual/optical cameras, such as a digital movie camera, a movie camera, a stereo/3-dimensional camera or other type of visual/optical cameras. In still other examples, the camera device 110 may incorporate one or more other types of camera technologies, such as a thermographic camera, an acoustic camera, a magnetic resonance imaging camera, an ultrasonic camera or other type of camera.

The local system 100 may also include the sensor device 115, which may be a device, module or other machine configured to detect events or changes in the location 800 and to send the detected information for processing (e.g., to the computing device 120). The sensor device 115 may be incorporated directly into/with other components of the local system 100 (e.g., the computing device 120), or may separate from but communicably connected to the other components of the local system 100.

In one example, the sensor device 115 may include a thermometer to measure temperature. The temperature information measured by the thermometer may be utilized (e.g., by the local system 100) to, in one example, determine that the temperature at the location 800 is higher than usual. Accordingly, the display device 105 may then be directed to corresponding display content (e.g., an advertisement for bottled water). In another example, the sensor device 115 may include a photometer to detect ambient light. The ambient light temperature from the photometer may be captured to determine, for example, that the light is minimal and may be associated with nighttime, which may be utilized to display corresponding digital content (e.g., an advertisement) on the display device 105 as well. In other examples, the sensor device 115 may incorporate one or more other types of sensor technologies, such as a proximity sensor, an accelerometer, a pressure sensor, a color sensor, a touch sensor, a humidity sensor or other type of sensor.

As discussed above, the computing device 120 of local system 100 may include the processor 125 and the memory 130. In one example, the processor 125 may be configured to execute the machine-readable instructions stored in the memory 130. It should be appreciated that the processor 125 may be a semiconductor-based microprocessor, a central processing unit (CPU), an application specific integrated circuit (ASIC), a field-programmable gate array (FPGA), and/or other suitable hardware device.

In one example, the memory 130 may have stored thereon machine-readable instructions (which may also be termed computer-readable instructions) that the processor 125 may execute. The memory 130 may be an electronic, magnetic, optical, or other physical storage device that contains or stores executable instructions. The memory 130 may be, for example, Random Access memory (RAM), an Electrically Erasable Programmable Read-Only Memory (EEPROM), a storage device, an optical disc, or the like. The memory 130, which may also be referred to as a computer-readable storage medium, may be a non-transitory machine-readable storage medium, where the term "non-transitory" does not encompass transitory propagating signals.

Reference will now be made to FIG. 1B. It should be appreciated that the memory 130 depicted in FIG. 1B may be provided as an example. Thus, the memory 130 may or may not include additional features, and some of the features described herein may be removed and/or modified without departing from the scope of the memory 130 outlined herein.

In one example, the memory 130 may store instructions, which when executed by the processor 125, may cause the processor to: receive 135 visual imagery information; gather 140 audience identification information; identify 145 a context; and identify 150 a setting. In addition, the memory 130 may also store instructions, which when executed by the processor 125, may cause the processor to: transmit visual content information 155; receive and transmit 160 digital content, capture 165 audience interest information and communicate 170 (e.g., with the system 200) periodically to gain further information. It should be appreciated that, in some examples, the instructions on the memory 130, including the instructions 135, 140, 145, 150, 155, 160, 165 and/or 170 may be configured to incorporate artificial intelligence or deep learning techniques.

It should be appreciated that, and as described further below, the processing performed via the instructions on the memory 130 may or may not be performed, in part or in total, with the aid of other information and data, such as information and data provided by the system 200 and/or the storage device 400. Moreover, and as described further below, it should be appreciated that the processing performed via the instructions on the memory 130 may or may not be performed, in part or in total, with the aid of or in addition to processing provided by other devices, including for example, the system 200 and/or the storage device 400.

Furthermore, in one example, the processor 125 may be configured to execute instructions on the memory 130 to receive 135 visual imagery information; gather 140 audience identification information; identify 145 a context; and identify 150 a setting. The processor 125, as instructed by the machine-readable instructions stored in the memory 130, may also be configured to transmit 155 visual content information; display 160 digital content, capture 165 audience interest information and communicate 175 (e.g., with the system 200) periodically to gain further information.

In one example, the memory 130 may include instructions 135 configured to receive and analyze (e.g., utilizing computer vision technology) visual imagery information from the camera device 110 relating to the location 800. In one example, the visual imagery range of the camera device 110 may be a range required to capture a viewing audience of one hundred individual subjects at any time.

In one example, the memory 130 may also include instructions 140 configured to gather audience identification information. As used herein, audience identification information may include, among other things, any information relating to identifying, classifying and/or categorizing one or more individual subjects in the visual imagery information. In a first example, to gather the audience identification information, the instructions 140 may be configured to perform facial recognition to identify one or more of the individual subjects in the visual imagery information (e.g., the first individual 800*a*, the second individual 800*b*). In a second example, the instructions 140 may be configured to detect and analyze facial expressions of individual subjects in the visual imagery information. In a third example, the instructions 140 may further be configured to detect and analyze physical characteristics (e.g., small/large, tall/short, etc.) of one or more of the individual subjects in the visual imagery information. And in a fourth example, the instructions 140 may also be configured to gather demographic information (e.g., gender, age, etc.) relating to the one or more individual subjects in the visual imagery information.

In one example, the memory 130 may also include instructions 145 configured to identify a context associated with the visual imagery information. To identify a context, the instructions 145 may be configured to gather and analyze one or more descriptive characteristics in the visual imagery information that may be associated with a context. In one example, to identify a context, the instructions 145 may be configured to analyze a background in the visual imagery. To analyze the background, in a first example, the instructions 145 may be configured to detect an object in the background (e.g., a landmark, a building, etc.), and then associate a context based on the detected object. In a second example, the instructions 145 may be configured to detect an event (i.e., a spontaneous gathering, an event, etc.), and then associate a context based on the detected event.

In one example, the memory 130 may also include instructions 150 configured to identify a setting associated with the visual imagery information. To identify a setting, the instructions 150 may be configured to gather and analyze one or more circumstantial characteristics in the visual imagery information that may be associated with a setting. Examples of such circumstantial characteristics may include, among other things, a location (e.g., an address), a time or weather conditions that may be associated with the visual imagery information.

In another example, the instructions 150 may be configured to receive and analyze information from the sensor device 115 to identify a setting. In a first example, the instructions 150 may be configured to receive temperature information from a thermometer located on the sensor device 115, and may utilize the temperature information to identify a setting. In a second example, the instructions 150 may be configured to receive sound information from a sound level meter located on the sensor device 115, and may utilize the sound information to a noise level (e.g., loud, quiet, etc.) and noise type (e.g., celebration, concert, etc.) to identify a setting. In one example, the instructions 150 may be further configured to analyze the visual imagery information to determine an "ambiance" (e.g., mood, atmosphere) for the location (i.e., the location 800).

The memory 130 may also include instructions 155 configured to transmit visual content information. As used herein, visual content information may include any information available to the local system 100 that may be utilized to generate display content for a viewing audience. Examples of visual content information may include, but are not limited to, the visual imagery information captured by the camera device 110 (e.g., via the instructions 135), the gathered audience identification information (e.g., via the instructions 140), the gathered context information (e.g., via the instructions 145), and gathered setting information (e.g., via the instructions 150).

The instructions 155 may be configured to transmit the visual content information to any device on the network 300. In one example, the instructions 155 may be configured to transmit the visual content information from the local system 100 to the system 200 for processing.

The memory 130 may also include instructions 160 configured to receive and transmit display content. In one example and as will be discussed further below, the instructions 160 may be configured to receive the display content from the system 200, and may transmit the received display content to the display device 105 for display to a viewing audience (e.g., including the individual 800a and the individual 800b).

The memory 130 may also include instructions 165 configured to capture audience interest information. As used herein, audience interest information may include any information relating to a reaction of an individual subject in a viewing audience to display content being displayed. The reaction of the individual subject may be analyzed to modify, improve or determine effectiveness of display content being displayed.

In one example, the instructions 165 may be configured to analyze the visual imagery information to determine reactions from individual subjects in a viewing audience. In a first example, the instructions 165 may be configured to analyze facial expressions of individual subjects in the viewing audience to determine interest or disinterest. In a second example, the instructions 165 may be configured to determine an amount of time spent viewing the advertising content to determine interest or disinterest. In yet another example, the instructions 165 may be configured to determine whether an individual subject watched a piece of individual content to the end or turned/walked away.

In addition, the memory 130 may also include instructions 170 configured to communicate periodically with other devices to receive and transmit additional information. The additional information may include any information that may be utilized to analyze, monitor and/or modify an aspect of display content being displayed to a viewing audience.

So, in one example and as will be described further below, the instructions 170 may be configured to transmit visual content information periodically to the system 200 for analysis. In a second example, the instructions 170 may be configured to transmit a request to the system 200 for additional analysis. In a third example, the visual content information may include information relating to the individual 800a, but may be lacking a particular classification or attribute. In one example, the instructions 170 may be configured to transmit the visual content information relating to the individual 800a to the system 200 for processing.

Reference is now made to FIG. 1C. In one example, the system 200 may be configured by a service provider to create and deliver personalized and context-aware digital content via intelligent detection and analysis of a viewing audience. It should be appreciated that the system 200 depicted in FIG. 1C may be provided as an example. Thus, the system 200 may or may not include additional features and some of the features described herein may be removed and/or modified without departing from the scope of the system 200 outlined herein. Details of the system 200 and its operation within the system environment 1000 will be described in more detail below.

The system 200 may include a processor 205 and a memory 210. In one example, the processor 205 may be configured to execute the machine-readable instructions stored in the memory 210. It should be appreciated that the processor 205 may be a semiconductor-based microprocessor, a central processing unit (CPU), an application specific integrated circuit (ASIC), a field-programmable gate array (FPGA), and/or other suitable hardware device.

In one example, the memory 210 may have stored thereon machine-readable instructions (which may also be termed computer-readable instructions) that the processor 205 may execute. The memory 210 may be an electronic, magnetic, optical, or other physical storage device that contains or stores executable instructions. The memory 210 may be, for example, Random Access memory (RAM), an Electrically Erasable Programmable Read-Only Memory (EEPROM), a storage device, an optical disc, or the like. The memory 210, which may also be referred to as a computer-readable storage medium, may be a non-transitory machine-readable storage medium, where the term "non-transitory" does not encompass transitory propagating signals. The processing and analysis performed by the instructions on the system 200 may be performed with the aid of other information and data, such as the information discussed with respect to FIG. 1B (e.g., transmitted from the local system 100).

Accordingly, in one example, the memory 210 may store instructions, which when executed by the processor 205, may cause the processor to: receive 215 visual content information; identify 220 audience characteristics; identify 225 attribute information; and determine 230 circumstantial information. In addition, the memory 210 may also store instructions, which when executed by the processor 205, may cause the processor 205 to: analyze 235 digital content; deliver 240 display content and communicate 245 periodically to gain further information. The processing performed via the instructions on the memory 210 may or may not be performed, in part or in total, with the aid of other information and data such as information provided by the local system 100 and/or the storage device 400. It should be appreciated that, in some examples, the instructions on the memory 210, including the instructions 215, 220, 225, 230, 235, 240, and 245 may be configured to incorporate artificial intelligence or deep learning techniques.

Furthermore, in one example, the processor 205 may be configured to receive 215 visual content information; identify 220 audience characteristics; identify 225 attribute information; and determine 230 circumstantial information. The processor 205, as instructed by the machine-readable instructions stored in the memory 210, may also be configured to analyze 235 digital content; deliver 240 display content and communicate 245 periodically to gain further information.

In one example, the memory 210 may include instructions 215 configured to receive visual content information. In one example, the instructions 215 may receive the visual content information transmitted by the local system 100 (e.g., via the instructions 155) for processing. As discussed above, the visual content information may include, but is not limited to, the visual imagery information captured by the camera device 110 (e.g., via the instructions 135), the gathered audience identification information (e.g., via the instructions 140), the gathered context information (e.g., via the instructions 145), and the gathered setting information (e.g., via the instructions 150).

In one example, in addition to receiving the visual content information, the instructions 215 may also be configured analyze the visual content information to determine if an associated action (e.g., a modification, a notification, etc.) is necessary. So, in a first example, the instructions 215 may analyze the visual content information to determine if a visual imagery range of the camera device 110 should be modified. In a second example, the instructions 215 may analyze the visual content information from the local system 100 and recommend (e.g., via a notification) that the location of a display device 105 be changed.

In one example, the instructions 220 may be configured to identify audience characteristics. As used herein, audience characteristics may include any information relating to identifying aspects of an individual subject captured in the visual content information. In one example, the instructions 220 may be configured to analyze the visual content information to determine audience characteristics of individual subjects in a viewing audience (e.g., the first individual 800*a*, the second individual 800*b*).

In one example, identifying the audience characteristics may include identifying demographic information. As used herein, demographic information may include any information relating to a classification of individual subject by a demographic category. Examples of demographic information may include, but is not limited to height, weight, age, and gender. So, in one example, the instructions 220 may be configured to analyze the visual content information to determine that the first individual 800*a* is likely tall, (i.e., height), young (i.e., age) and male (i.e., gender), while the second individual 800*b* is likely a short, middle-aged and female.

In one example, identifying the audience characteristics may include performing various methods of facial analysis. As used herein, facial analysis may include analysis of facial features to determine information associated with an individual subject. Examples of facial analysis may include, but is not limited to, facial recognition, facial expression analysis and facial tagging. It should be appreciated that, in some examples, to perform facial analysis on the individual subjects captured in the visual content information, the instructions 220 may be configured to incorporate artificial intelligence or deep learning techniques.

Figure 2:
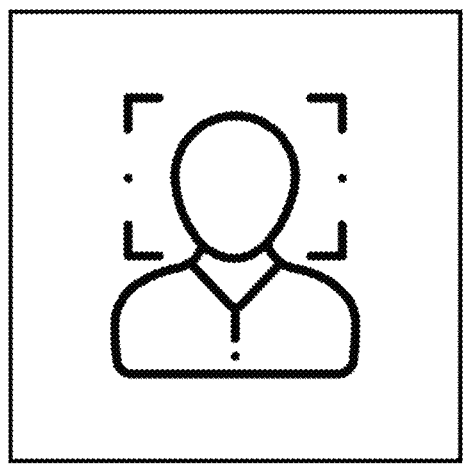
FIG. 2 illustrates a diagram of facial recognition methods techniques that may be utilized, according to an example.
Figure 2:
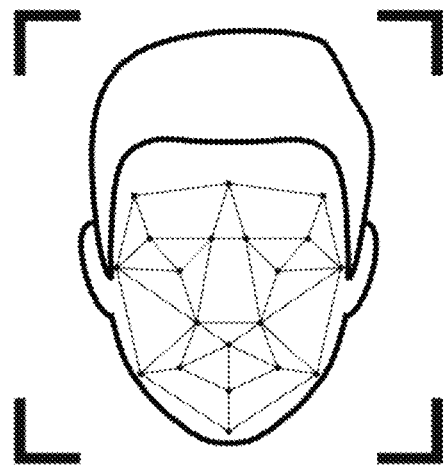
Figure 2:
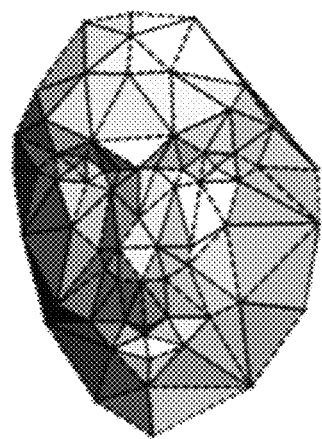
Figure 2:
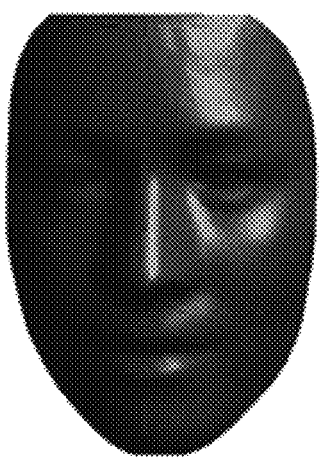

In one example, to perform facial analysis, the instructions 220 may implement facial recognition to determine an identity of an individual subject. FIG. 2 illustrates a diagram of facial recognition methods techniques that may be utilized, according to an example. In one example, the instructions 220 may be configured to analyze and compare captured images 20 in the visual content information to other photos of known persons to determine an identity of an individual subject in the visual content information. In one example, determining the identity of the individual via facial recognition may include scoring one or more comparisons of captured images, and taking a highest ranked (i.e., scored) comparison as a likeliest match to a known person's identity.

In a second example, to perform facial analysis, the instructions 220 may implement facial expression analysis to determine a state or status of an individual subject. In a first example, the instructions 220 may be configured to analyze the captured images 20 to determine a "mood" (e.g., happy, sad, etc.) of an individual subject in the visual content information. In a second example, the instructions 220 may be configured to analyze activity of an individual subject in the visual content information to determine an attention level. For example, the instructions 220 may be configured to determine if the individual subject is in conversation with another person or determine if the individual subject is reading a book. Furthermore, in one example, the facial expression analysis relating to the individual subject may be combined with facial expression analysis for other individual subjects to determine a mood or attention level for the viewing audience.

In a third example, to perform facial analysis, the instructions 220 may implement facial tagging to maintain a determined identity of an individual subject throughout various (i.e., changing) circumstances. In a first example, the instructions 220 may be configured to determine if a known individual subject is moving in or out of the visual imagery range of the camera device 110. In a second example, the instructions 220 may be configured to utilize face tagging to determine if two figures captured at two different points in time are the same individual.

In one example, the instructions 225 may be configured to identify attribute information. As used herein, attribute information may include any definable characteristic that may be associated with visual content information. In one example, to identify attribute information, the instructions 225 may be configured to define an attribute classifier and to analyze the visual content information to assess a likelihood that the attribute classifier applies. It should be appreciated that, in some examples, to identify attribute information, the instructions 225 may be configured to incorporate artificial intelligence or deep learning techniques.

In one example, the instructions 225 may be configured to define an attribute classifier for any classification that may apply to visual content information to be analyzed. Examples of definable attribute classifiers may include whether the individual subject is male, whether the individual subject is wearing long pants, and whether the individual subject is wearing a hat. Attributes classifiers may be defined according to a number of levels, including a "person" level, a "context" level and a "poselet" level. In one example, the instructions 225 may assess a likelihood that an attribute classifier applies by training (i.e., targeting and isolating) portions of the visual content information, hereinafter referred to as "poselets".

Figure 3A:
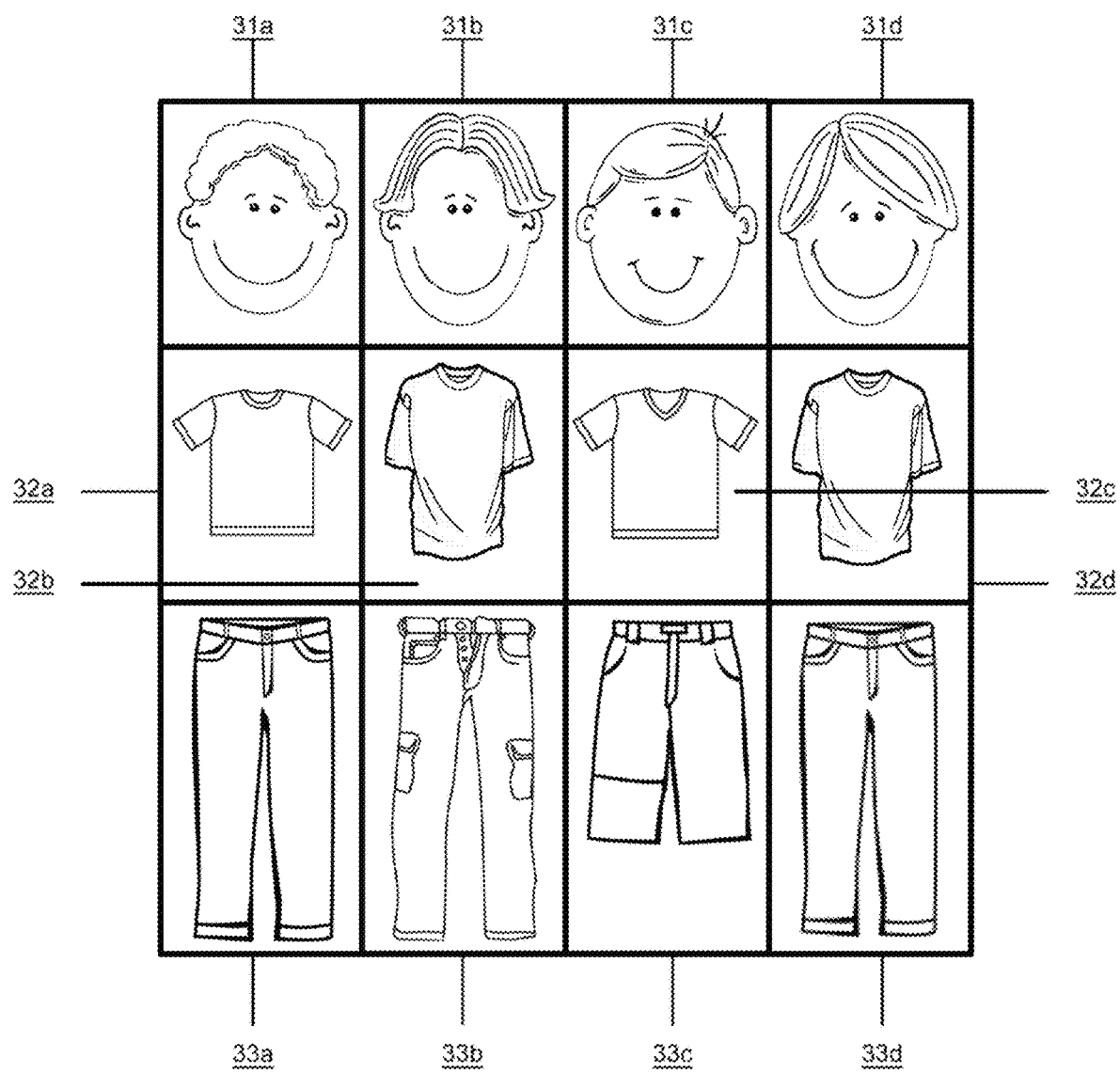
FIGS. 3A-B illustrate diagrams of attribute classification techniques that may be utilized, according to an example.
Figure 3B:
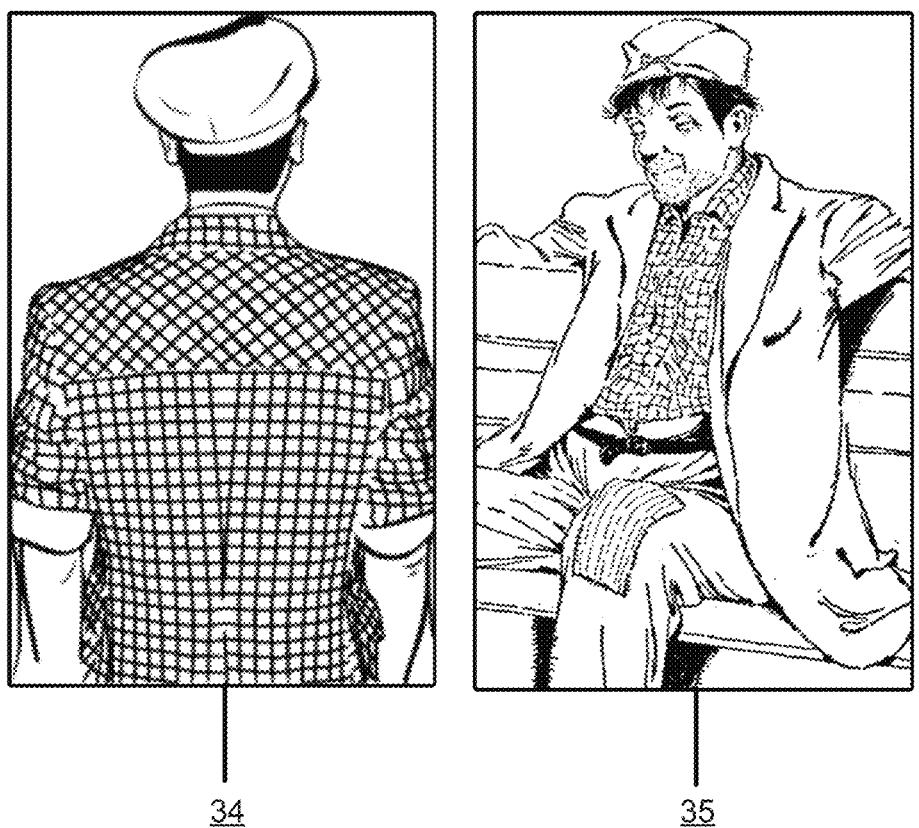

FIGS. 3A-B illustrate diagrams of attribute classification techniques that may be utilized, according to an example. In one example, in FIG. 3A, the poselets 31*a-d* may be trained to determine whether the individual subject is male (i.e., a first attribute classifier), the poselets 32*a-d* may be trained to determine whether the individual subject is wearing a hat (i.e., a second attribute classifier), and the poselets 33*a-d* may be trained to determine whether the individual subject is wearing long pants (i.e., a third attribute classifier). In this example, each of the trained poselets 31*a-d*, 32*a-d* and 33*a-d* may be analyzed to determine a likelihood (e.g., a numerical probability) that the first, second and/or third attribute classifiers is applicable. In some examples, there may be an array of classifiers each specialized in particular use case, and each one trained with a specialized data set.

FIG. 3B illustrates poselets 34-35 as examples, wherein the poselets 34-35 may be analyzed to determine a plurality of attribute classifications for each poselet. In this example, the poselet 34 may be analyzed to determine that the poselet 34 is likely of a man (i.e., a first attribute classifier) with short hair (i.e., a second attribute classifier) and long sleeves (i.e., a third attribute classifier). Also, in this example, the poselet 35 may be analyzed to determine that the poselet 35 is likely of a man (i.e., a first attribute classifier) with short hair (i.e., a second attribute classifier), glasses (i.e., a third attribute classifier), short sleeves (a fourth attribute classifier) and shorts (i.e., a fifth attribute classifier).

Moreover, to determine each likelihood, the instructions 230 may be configured to "weight" a first poselet more with respect to a particular attribute classifier than a second poselet. For example, in the case of the attribute classifier of gender, the instructions 230 may be configured to place greater weight on a poselet depicting an individual subject's head (i.e., face) than a second poselet depicting the individual subject's legs. As will be described further below, a likelihood that each defined attribute classifier is applicable to one or more poselets may be utilized to determine display content for a viewing audience. In some examples, weighting may be assigned based on maximizing an objective function. For instance, this may include a number of times content is being shown to the viewing audience.

Figure 4:
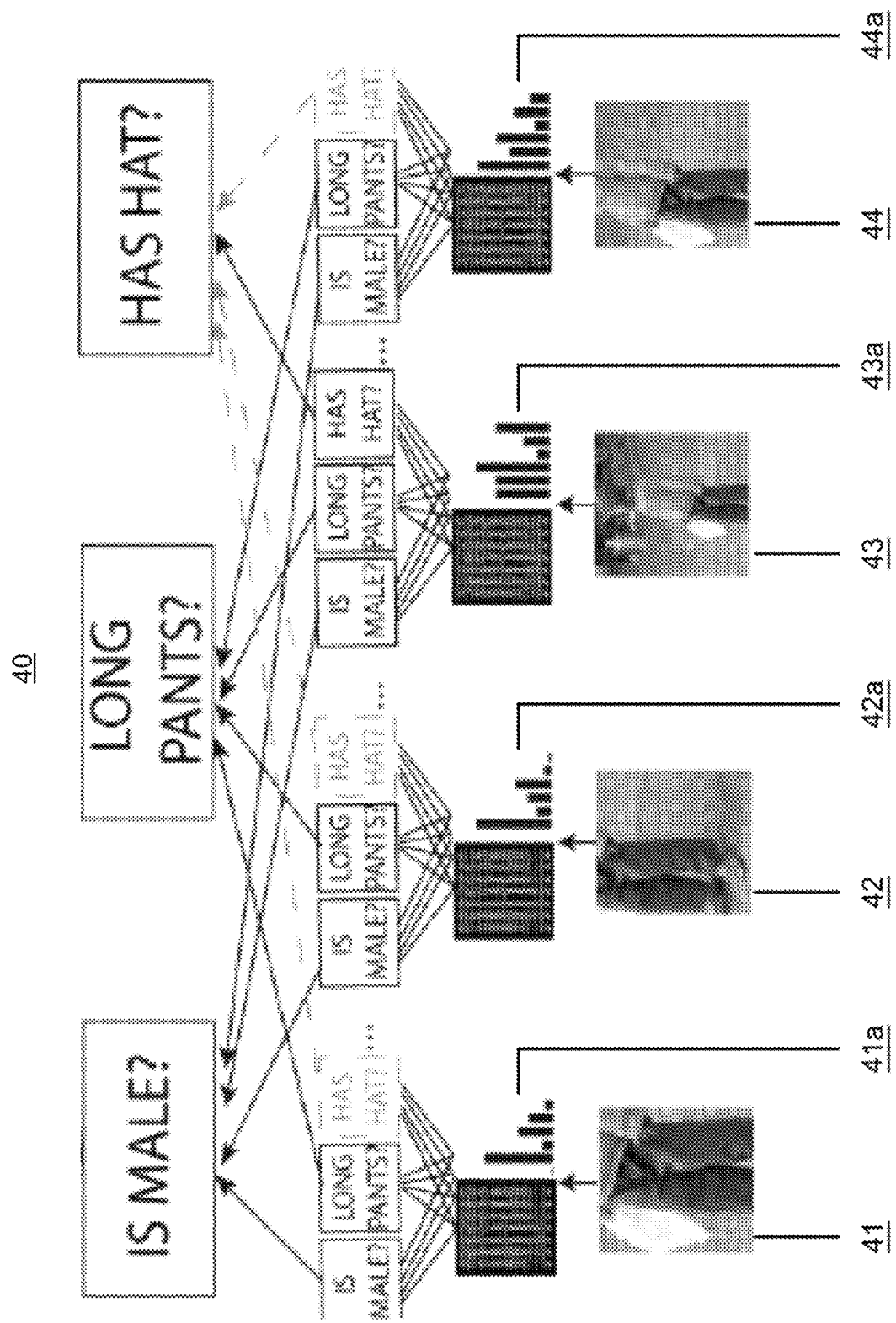
FIG. 4 illustrates a diagram of gathering and selecting attribute viewpoints techniques that may be utilized, according to an example.

FIG. 4 illustrates a diagram of techniques for gathering and analyzing attribute classifier information, according to an example. In this example, poselets 41-44 may be classified according to a first attribute classifier whether the individual subject is male, a second attribute classifier whether the individual subject is wearing long pants and a third attribute classifier whether the individual subject is wearing a hat.

Furthermore, in one example, the likelihood information with respect to each the first, second and third attribute classifiers may be gathered to determine a combination likelihood. A combination likelihood, as used herein, may include a likelihood that a plurality of attribute classifiers is applicable to a trained poselet. So, in this example, combination likelihoods 41a, 42a, 43a, and 44a may be utilized to determine a likelihood that a combination of the first, the second and the third attribute apply to the poselets 41-44. Furthermore, in one example, combination likelihoods analyzed from the visual content information may be utilized to determine an "audience viewpoint", which may be a collective assessment of the viewing audience utilizing the first, second and third attribute classifiers. As will be described further below, one or more combination likelihoods and/or audience viewpoints may be utilized to determine display content for a viewing audience.

In one example, the instructions 230 may further be configured to determine circumstantial information. As used herein, circumstantial information may include any information relating to circumstances associated with visual content information being analyzed. Examples of circumstantial information may include settings or context information. So, in a first example, the instructions 230 may be configured to analyze a background (e.g., object detection) to determine a context. In a second example, the instructions 230 may be configured to analyze noise level and noise type from a sensor device (e.g., the sensor device 115) to determine a setting.

In one example, the instructions 230 may be configured to determine circumstantial information to supplement the analysis done by the local device 100. That is, in a first example, the instructions 230 may receive the context information from the local system 100 (i.e., the instructions 145), and utilize this information to supplement a context analysis. In a second example, the instructions may receive the settings information from the local system 100 (i.e., the instructions 150), and utilize this information to supplement a settings analysis. And in another example, the instructions 230 may also be configured to determine circumstantial information if the local device 100 does not perform a similar analysis at all.

In one example, the instructions 235 may be configured to analyze digital content. To analyze digital content, the instructions 235 may be configured to analyze any information relating to the viewing audience to determine one or more ranking characteristics related to the viewing audience. Examples of information relating to the viewing audience that the instructions 235 may analyze may include, but is not limited to, audience identification information (e.g., as gathered via instructions 140), context information (e.g., as identified via instructions 145), settings information (e.g., as identified via instructions 150), and/or visual content information (e.g., as identified via instructions 155). In one example, the instructions 235 may further utilize ranking characteristics information (e.g., as identified via instructions 220), attribute information (e.g., as identified via instructions 225) and circumstantial information (as determined via instructions 230).

So, in one example, the instructions 235 may analyze the information relating to the viewing audience to determine a first ranking characteristic that 65% of the viewing audience is male, a second ranking characteristic that 32% of the viewing audience is wearing long pants and a third ranking characteristic that temperature for a location associated with the viewing audience is 48 degrees Fahrenheit (i.e., cold). One or more of the determined ranking characteristics related to the viewing audience may be combined to generate an assessment relating to the viewing audience.

In one example, the instructions 235 may be configured to generate model to filter (i.e., analyze) a store of digital content (e.g., on the storage device 400) to generate a ranking of individual items of digital content (e.g., an advertisement) likely to be of interest to a viewing audience. So, in the example, above the instructions 235 may utilize the ranking characteristics (e.g., male, long pants and cold) and the associated assessments to determine that an advertisement for outdoor/cold weather clothing may likely to be of interest to the viewing audience. It should be appreciated that to generate the ranking of display content, the instructions 235 may be configured to incorporate various mathematical and modeling techniques, including one or more of machine learning, artificial intelligence and heuristics techniques.

In another example, to generate the ranking of display content, the instructions 235 may further be configured to incorporate a bidding system, wherein the ranking of individual items of digital content may be adjusted according to a bid associated with each of the individual items. Information relating to the bidding system used in the ranking of individual items, including the bid amount associated with each of the individual items, may be available on a storage device (e.g., the storage device 400).

In another example, to generate a ranking of display content, the instructions 235 may be configured to incorporate information to personalize the display content for individual subjects in a viewing audience. In one example, the instructions 235 may be configured to personalize the display content utilizing information gathered from an associated service (e.g., a social media application) associated with the service provider.

So, in one example, the instructions 235 may gather, via the instructions 220 (i.e., facial recognition) that an individual subject is a user of the associated service of the service provider. User information associated with the individual subject's interaction with the associated service (hereinafter "user information") may be available on a device accessible by the service provider (e.g., the storage device 400).

In one example, to utilize the user information, the service provider may utilize an option to enable the individual subject (user) to "opt-in", thereby enabling a service provider to access user information to personalize display content. If the individual subject elects to opt-in, the instructions 235 may be configured to personalize the display content by training a personalized model configured to utilize the user information to filter a store of digital content and arrange the individual items of digital content to generate a personalized ranking of display content. In one example, the instructions 235 may be configured to train one or more personalized models for one or more individual subjects in the viewing audience to generate one or more personalized rankings of display content, which may also be utilized to generate display content that is most likely to be of interest to a viewing audience. In another example, the instructions 235 may be configured to access the user information to generate one or more personalized rankings of display content without an opt-in option.

The memory 210 may also include instructions 240 configured to transmit display content. The instructions 240 may be configured to, for example, transmit display content that generated by the instructions 235 as most likely to be of interest to a viewing audience. In one example, the instructions 240 may be configured to, for example, transmit the display content to the local system 100 for display on the display device 105. In one example, the instructions 240 may be configured to transmit the display content continuously, and in another example, the instructions 240 may be configured to transmit the display content periodically.

In one example, the instructions 245 may be configured to communicate periodically to transmit additional information to or receive additional information from other devices. In a first example, the instructions 245 may receive additional information from the local system 100, which may be utilized to modify the display content transmitted to the local system 100 (e.g., via instructions 240) for display on the display device 105. In a second example, where the local system 100 may be unable to process an aspect of the visual content information, the local system 100 may transmit the visual content information to the system 200 for further processing. The system 200 (e.g., via the instructions 225) may determine that, for example, an individual subject is a "man wearing glasses", and the instructions 245 may transmit the additional information to the local system 100.

Figure 5:
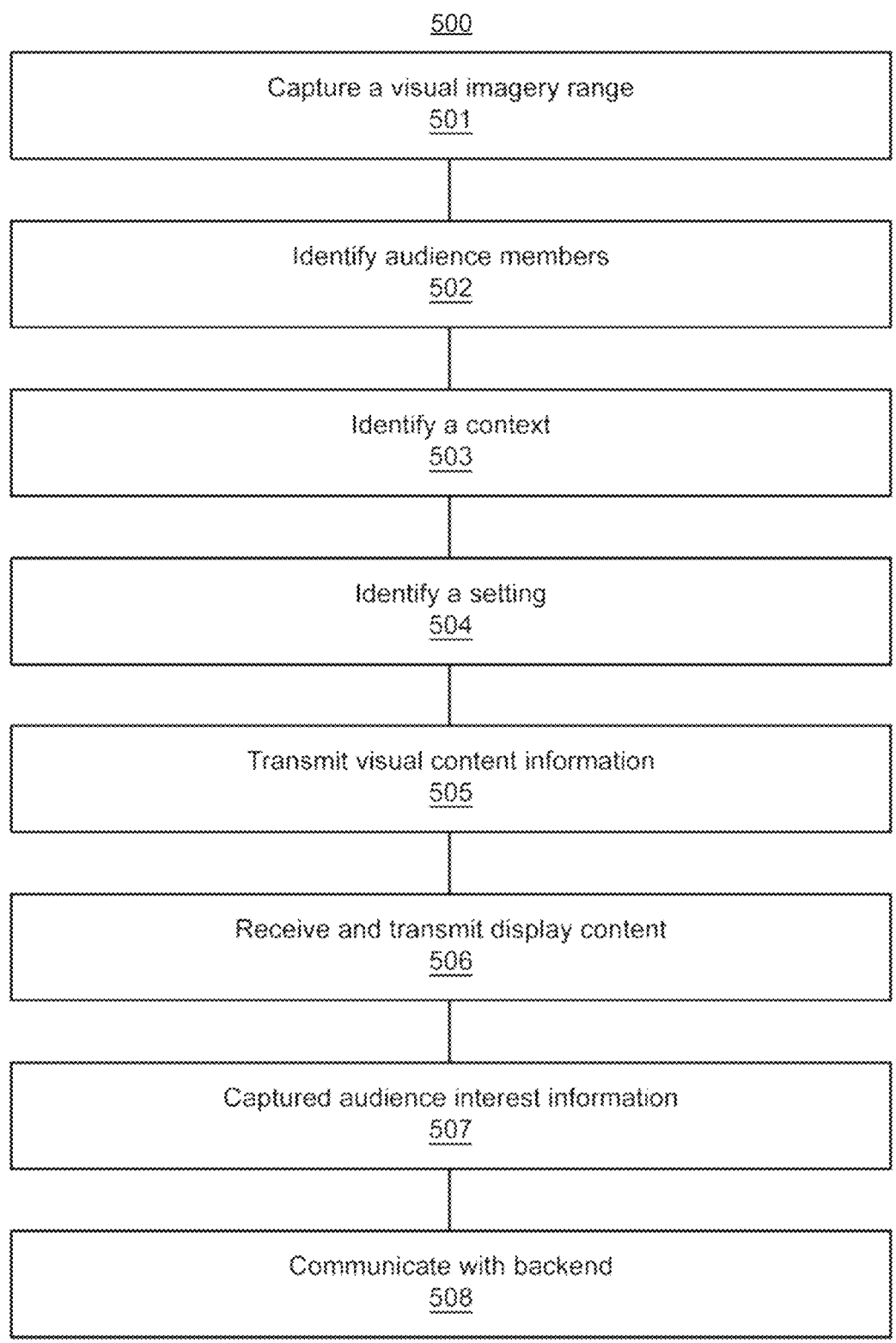
FIG. 5 illustrates a method for utilizing audience detection to deliver customized digital content over a communications device, according to an example.

FIG. 5 illustrates a method for utilizing audience detection to deliver customized digital content over a communications device, according to an example. The method 500 is provided by way of example, as there may be a variety of ways to carry out the method described herein. Although the method 500 is primarily described as being performed by local system 100 as shown in FIGS. 1A, 1B and 1D, the method 500 may be executed or otherwise performed by other systems, or a combination of systems. Each block shown in FIG. 5 may further represent one or more processes, methods, or subroutines, and one or more of the blocks may include machine-readable instructions stored on a non-transitory computer-readable medium and executed by a processor or other type of processing circuit to perform one or more operations described herein. It should be appreciated that, in some examples, the method 500 may be configured to incorporate artificial intelligence or deep learning techniques.

At 501, the processor 125 may receive and analyze visual imagery information (e.g., image and/or video data) from the camera device 110 relating to the location 800. In one example, a visual imagery range of the camera device 110 may be a range required to capture a viewing audience of one hundred individual subjects at any time.

At 502, the processor 125 may gather audience identification information. In some examples, this may include performing facial recognition, detecting and analyzing facial expressions, detecting and analyzing physical characteristics, and gathering demographic information for one or more of individual subjects in visual imagery information.

At 503, the processor 125 may identify a context. In some examples, this may include analyzing a background by detecting an object and/or detecting an event.

At 504, the processor 125 may identify a setting. In some examples, this may include gathering location information, gathering time of day information, and utilizing sound information from a sound level meter on a sensor device to identify a setting.

At 505, the processor 125 may transmit visual content information. In some examples, the visual content information transmitted may include visual imagery information captured by a camera device, audience identification information, context information, and settings information.

At 506, the processor 125 may receive and transmit display content. In some examples, this may include receiving display content from another system, and transmitting the received display content to a display device for display to a viewing audience.

At 507, the processor 125 may capture audience interest information. In some examples, this may include analyzing visual imagery information to determine reactions from individual subjects in a viewing audience.

At 508, the processor 125 may communicate periodically with other devices to receive and transmit additional information. In some examples, this may include transmitting a request to another system for additional analysis.

Figure 6:
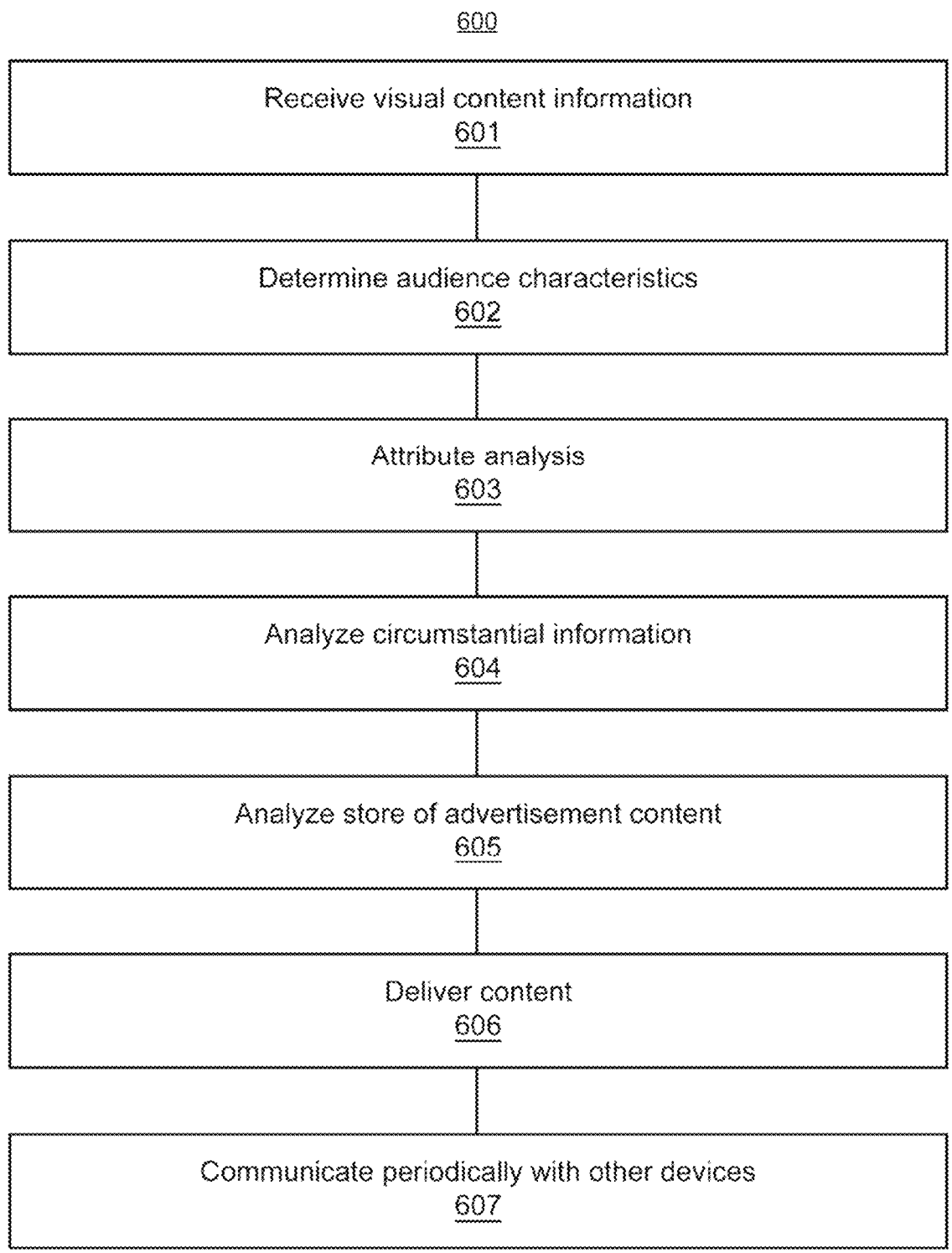
FIG. 6 illustrates a method for utilizing audience detection to deliver customized digital content over a communications device, according to an example.

FIG. 6 illustrates a method for utilizing audience detection to deliver customized digital content over a communications device, according to an example. The method 600 is provided by way of example, as there may be a variety of ways to carry out the method described herein. Although the method 600 is primarily described as being performed by system 200 as shown in FIGS. 1C and 1D, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein. It should be appreciated that, in some examples, the method 600 may be configured to incorporate artificial intelligence or deep learning techniques.

At 601, the processor 205 may receive visual content information. In some examples, the visual content information may include one or more of visual imagery information captured by a camera device, audience identification information, context information, and settings information.

At 602, the processor 205 may identify audience characteristics. In some examples, this may include one or more of identifying demographic information, implementing facial recognition, implementing facial expression analysis and implementing facial tagging.

At 603, the processor 205 may identify attribute information. In some examples, this may include defining an attribute classifier and analyzing visual content information to assess a likelihood that the attribute classifier applies.

At 604, the processor 205 may analyze circumstantial information. In some examples, this may include determining one or more of settings or context information associated with visual content information.

At 605, to generate display content for a viewing audience, the processor 205 may analyze a store of digital content (e.g., advertising content). In some examples, the store of digital content may be analyzed to generate a ranking of individual items of digital content utilizing information relating to a viewing audience.

At 606, the processor 205 may transmit display content. In some examples, this may include continuously transmitting the display content to a local system for display on an associated display device. In other examples, this may include transmitting the display content periodically.

At 607, the processor 205 may communicate periodically to transmit additional information to or receive additional information from other devices. In some examples, this may include receiving additional information from a local system, and utilizing the additional information to optimize display content transmitted to the local system.

By delivering personalized and context-aware digital content via intelligent detection and analysis of a viewing audience as described herein, the systems and methods described herein may determine and analyze characteristics (e.g., preferences) relating to audience members and other related information (e.g., context, location) to create and deliver display content that is personalized and context-specific. Moreover, the system and methods may further provide advertisers targeted delivery of their digital content to audience members predetermined to likely to have interest.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the local systems 100, 100a, the system 200, the client devices 600, 700, the storage device 400, and/or the third-party device 500 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the local systems 100, 100a, the system 200, the client devices 600, 700, the storage device 400, the third-party device 500, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the local systems 100, 100a, the system 200, the client devices 600, 700, the storage device 400, the third-party device 500, or shared with other systems. Although this disclosure describes using particular privacy settings in a particular manner, this disclosure contemplates using any suitable privacy settings in any suitable manner.

In particular examples, the local systems 100, 100a, the system 200, the client devices 600, 700, the storage device 400, the third-party device 500 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the local systems 100, 100a, the system 200, the client devices 600, 700, the storage device 400, and/or the third-party device 500 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the local systems 100, 100a, the system 200, the client devices 600, 700, the storage device 400, and/or the third-party device 500 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the local systems 100, 100a, the system 200, the client devices 600, 700, the storage device 400, and/or the third-party device 500 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The local systems 100, 100a, the system 200, the client devices 600, 700, the storage device 400, and/or the third-party device 500 may access such information in order to provide a particular function or service to the first user, without the local systems 100, 100a, the system 200, the client devices 600, 700, the storage device 400, and/or the third-party device 500 having access to that information for any other purposes. Before accessing, storing, or using such objects or information, the local systems 100, 100a, the system 200, the client devices 600, 700, the storage device 400, and/or the third-party device 500 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the local systems 100, 100a, the system 200, the client devices 600, 700, the storage device 400, and/or the third-party device 500.

In particular examples, a user may specify whether particular types of objects or information associated with the first user may be accessed, stored, or used by the local systems 100, 100a, the system 200, the client devices 600, 700, the storage device 400, and/or the third-party device 500. As an example and not by way of limitation, the first user may specify that images sent by the first user through the local systems 100, 100a, the system 200, the client devices 600, 700, the storage device 400, and/or the third-party device 500 may not be stored by the local systems 100, 100a, the system 200, the client devices 600, 700, the storage device 400, and/or the third-party device 500. As another example and not by way of limitation, a first user may specify that messages sent from the first user to a particular second user may not be stored by the local systems 100, 100a, the system 200, the client devices 600, 700, the storage device 400, and/or the third-party device 500. As yet another example and not by way of limitation, a first user may specify that all objects sent via a particular application may be saved by the local systems 100, 100a, the system 200, the client devices 600, 700, the storage device 400, and/or the third-party device 500.

In particular examples, privacy settings may allow a first user to specify whether particular objects or information associated with the first user may be accessed from the local systems 100, 100a, the system 200, the client devices 600, 700, the storage device 400, and/or the third-party device 500. The privacy settings may allow the first user to opt in or opt out of having objects or information accessed from a particular device (e.g., the phone book on a user's smart phone), from a particular application (e.g., a messaging app), or from a particular system (e.g., an email server). The local systems 100, 100a, the system 200, the client devices 600, 700, the storage device 400, and/or the third-party device 500 may provide default privacy settings with respect to each device, system, or application, and/or the first user may be prompted to specify a particular privacy setting for each context. As an example and not by way of limitation, the first user may utilize a location-services feature of the local systems 100, 100a, the system 200, the client devices 600, 700, the storage device 400, and/or the third-party device 500 to provide recommendations for restaurants or other places in proximity to the user. The first user's default privacy settings may specify that the local systems 100, 100a, the system 200, the client devices 600, 700, the storage device 400, and/or the third-party device 500 may use location information provided from one of the client devices 600, 700 of the first user to provide the location-based services, but that the local systems 100, 100a, the system 200, the client devices 600, 700, the storage device 400, and/or the third-party device 500 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The local systems 100, 100a, the system 200, the client devices 600, 700, the storage device 400, and/or the third-party device 500 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the local systems 100, 100a, the system 200, the client devices 600, 700, the storage device 400, and/or the third-party device 500 may use a user's previous activities and calculated moods, emotions, or sentiments to determine a present mood, emotion, or sentiment. A user who wishes to enable this functionality may indicate in their privacy settings that they opt in to the local systems 100, 100a, the system 200, the client devices 600, 700, the storage device 400, and/or the third-party device 500 receiving the inputs necessary to determine the mood, emotion, or sentiment. As an example and not by way of limitation, the local systems 100, 100a, the system 200, the client devices 600, 700, the storage device 400, and/or the third-party device 500 may determine that a default privacy setting is to not receive any information necessary for determining mood, emotion, or sentiment until there is an express indication from a user that the local systems 100, 100a, the system 200, the client devices 600, 700, the storage device 400, and/or the third-party device 500 may do so. By contrast, if a user does not opt in to the local systems 100, 100a, the system 200, the client devices 600, 700, the storage device 400, and/or the third-party device 500 receiving these inputs (or affirmatively opts out of the local systems 100, 100a, the system 200, the client devices 600, 700, the storage device 400, and/or the third-party device 500 receiving these inputs), the local systems 100, 100a, the system 200, the client devices 600, 700, the storage device 400, and/or the third-party device 500 may be prevented from receiving, collecting, logging, or storing these inputs or any information associated with these inputs. In particular examples, the local systems 100, 100a, the system 200, the client devices 600, 700, the storage device 400, and/or the third-party device 500 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the local systems 100, 100a, the system 200, the client devices 600, 700, the storage device 400, and/or the third-party device 500 may use the user's mood, emotion, or sentiment to provide newsfeed items, pages, friends, or advertisements to a user. The user may specify in their privacy settings that the local systems 100, 100a, the system 200, the client devices 600, 700, the storage device 400, and/or the third-party device 500 may determine the user's mood, emotion, or sentiment. The user may then be asked to provide additional privacy settings to indicate the purposes for which the user's mood, emotion, or sentiment may be used. The user may indicate that the local systems 100, 100a, the system 200, the client devices 600, 700, the storage device 400, and/or the third-party device 500 may use his or her mood, emotion, or sentiment to provide newsfeed content and recommend pages, but not for recommending friends or advertisements. The local systems 100, 100a, the system 200, the client devices 600, 700, the storage device 400, and/or the third-party device 500 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the local systems 100, 100a, the system 200, the client devices 600, 700, the storage device 400, and/or the third-party device 500 may be restricted in its access, storage, or use of the objects or information. The local systems 100, 100a, the system 200, the client devices 600, 700, the storage device 400, and/or the third-party device 500 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the local systems 100, 100a, the system 200, the client devices 600, 700, the storage device 400, and/or the third-party device 500 may temporarily store the message in a content data store until the second user has viewed or downloaded the message, at which point the local systems 100, 100a, the system 200, the client devices 600, 700, the storage device 400, and/or the third-party device 500 may delete the message from the data store. As another example and not by way of limitation, continuing with the prior example, the message may be stored for a specified period of time (e.g., 2 weeks), after which point the local systems 100, 100a, the system 200, the client devices 600, 700, the storage device 400, and/or the third-party device 500 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the local systems 100, 100a, the system 200, the client devices 600, 700, the storage device 400, and/or the third-party device 500 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the local systems 100, 100a, the system 200, the client devices 600, 700, the storage device 400, and/or the third-party device 500. The user's privacy settings may specify that such information may be used only for particular processes, such as authentication, and further specify that such information may not be shared with any external system or used for other processes or applications associated with the local systems 100, 100a, the system 200, the client devices 600, 700, the storage device 400, and/or the third-party device 500. As another example and not by way of limitation, the local systems 100, 100a, the system 200, the client devices 600, 700, the storage device 400, and/or the third-party device 500 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the local systems 100, 100a, the system 200, the client devices 600, 700, the storage device 400, and/or the third-party device 500. As another example and not by way of limitation, the local systems 100, 100a, the system 200, the client devices 600, 700, the storage device 400, and/or the third-party device 500 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the local systems 100, 100a, the system 200, the client devices 600, 700, the storage device 400, and/or the third-party device 500.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The local systems 100, 100a, the system 200, the client devices 600, 700, the storage device 400, and/or the third-party device 500 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the local systems 100, 100a, the system 200, the client devices 600, 700, the storage device 400, and/or the third-party device 500 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the local systems 100, 100a, the system 200, the client devices 600, 700, the storage device 400, and/or the third-party device 500 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the local systems 100, 100a, the system 200, the client devices 600, 700, the storage device 400, and/or the third-party device 500 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the local systems 100, 100a, the system 200, the client devices 600, 700, the storage device 400, and/or the third-party device 500 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the local systems 100, 100a, the system 200, the client devices 600, 700, the storage device 400, and/or the third-party device 500 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the local systems 100, 100a, the system 200, the client devices 600, 700, the storage device 400, and/or the third-party device 500 may send a reminder to the user to confirm his or her privacy settings every six months or after every ten photo posts. In particular examples, privacy settings may also allow users to control access to the objects or information on a per-request basis. As an example and not by way of limitation, the local systems 100, 100a, the system 200, the client devices 600, 700, the storage device 400, and/or the third-party device 500 may notify the user whenever an external system attempts to access information associated with the user, and require the user to provide verification that access should be allowed before proceeding.

Advances in content management and media distribution are causing users to engage with content on or from a variety of content platforms. As used herein, a "user" may include any user of a computing device or digital content delivery mechanism who receives or interacts with delivered content items, which may be visual, non-visual, or a combination thereof. Also, as used herein, "content", "digital content", "digital content item" and "content item" may refer to any digital data (e.g., a data file). Examples include, but are not limited to, digital images, digital video files, digital audio files, and/or streaming content. Additionally, the terms "content", "digital content item," "content item," and "digital item" may refer interchangeably to themselves or to portions thereof.

With the proliferation of different types of digital content delivery mechanisms (e.g., mobile phone, portable computing devices, tablet devices, etc.), it has become crucial that content providers engage users with content of interest. For example, one arena where delivery of engaging content may be crucial is in the field of advertising (e.g., online). Advertisers may often compete intensely to gain attention from users by providing content that may be engaging.

As a result, content providers may continuously be looking for ways to deliver more appealing content. One way may be to deliver content of higher visual quality (i.e., resolution). For example, content presented in high-definition (HD) may typically be more appealing than a content presented in standard definition (SD). Another way may be to deliver content that is qualitatively more interesting, which may often come with longer runtimes (i.e., duration). It should be appreciated that content items of higher image quality and with longer runtimes may typically come with additional storage requirements.

Service providers trafficking in content distribution (e.g., social media platform providers) may be reluctant to assume the costs associated with additional storage needs. Consequently, in many instances, service providers may not accommodate a content item of any size on their platform, and may impose storage limits (e.g., 5 mega-bytes) for content items made available on their platform.

In general, storage limits such as these may typically lead to less appealing content. For content providers, providing less appealing content may lead to less engagement from users. For example, for advertisers delivering content to inform users of a product or service, such storage limits may lead to less conversions. For service providers, less appealing content resulting may lead to less engagement from users, which may limit the service provider's ability to gather information (i.e., "signals") relating to user preferences and deliver more appealing content in the future. For users, time spent consuming content may likely be less enjoyable and immersive.

In addition, another issue that may arise in generation and delivery of content may be associated with limitations of a user device. As used herein, a "user device" may include any device capable of publishing content for a user. Examples may include a mobile phone, a tablet, or a personal computer. As used herein, "publish" may include any manner of making content available for consumption by a user, including but not limited to, "displaying", "playing", "broadcasting", "streaming" or "stream-casting".

In some examples, a user device may not be able to process enhanced content, such as content that may be interactive, customized and/or of high resolution or fidelity. As used herein, "enhanced content" may include any content that may require supplemental processing by a remote device to be published at a local device. One example of enhanced content may be high-resolution gaming content. In many instances, video games providing high-resolution gaming content may require real-time, complex graphics processing. As used herein, transmitting content in "real-time" may include any transmission of data associated with an enhanced content item immediately upon processing.

Such enhanced content may often necessitate use of one or more dedicated graphics processing units (GPUs). Often however, a typical user device (e.g., a smartphone) may not include a sufficient graphics processing unit (GPU), and therefore may be unable provide the intense processing necessary. As a result, a user utilizing the user device may miss out the enhanced content, and a content provider (i.e., a video game maker) may be unable to reach an interested user customer. Systems and methods for providing generation and delivery of enhanced content to a user via remote rendering and real-time streaming are described. In some examples, the systems and methods described may overcome storage and device limitations described above by providing remote content storage and processing. Also, in some examples, the processed content may be streamed directly from a remote device to a user's device for consumption. As used herein, "stream", "streaming" and "stream-casting" may be used interchangeably to refer to any continuous transmission of data to a device.

In addition, in some examples, the systems and methods described may enable low-latency delivery of content, in that time associated with content processing and delivery may be minimized. Moreover, in some examples, the systems and methods described may display streamed content via use of any number of browser varieties and may be platform-agnostic, in that they may be implementable over various platforms without restriction or limitations.

By offloading content storage and processing to remote devices and streaming processed content directly to a user's device, the systems and methods described herein may remove or greatly reduce storage limitations for content providers and may provide generation and delivery of enhanced content that otherwise may not have been feasible. Moreover, by enabling provision of content items of higher quality and longer runtimes, the systems and methods may decrease friction in conversion funnels for content providers (e.g., advertisers) and may increase signal quality for service providers.

The systems and methods described herein may be implemented in various contexts. In some examples, the systems and methods described may provide interactive content previews (e.g., movie trailers) to a viewing user. In other examples, the systems and methods may be implemented to provide previews of video games in a native (i.e., higher) resolution and/or provide enhanced, interactive previews of software applications. Also, in some examples, the systems and methods described may enable a "procedural" advertisement", which in addition to informing a user of existence of a product may also show the user how to use the product. In still other examples, the systems and methods described may enable immersive storytelling, which may include storytelling that may facilitate a first-person experience (i.e., of "being there") and/or interactive experience for users. In addition, the systems and methods described may also enable users to conduct interactive transactions (e.g., purchases, auctions, etc.) in real-time, and also may enable users to select and/or configure products according to their preferences (e.g., virtual try-ons).

Figure 7A:
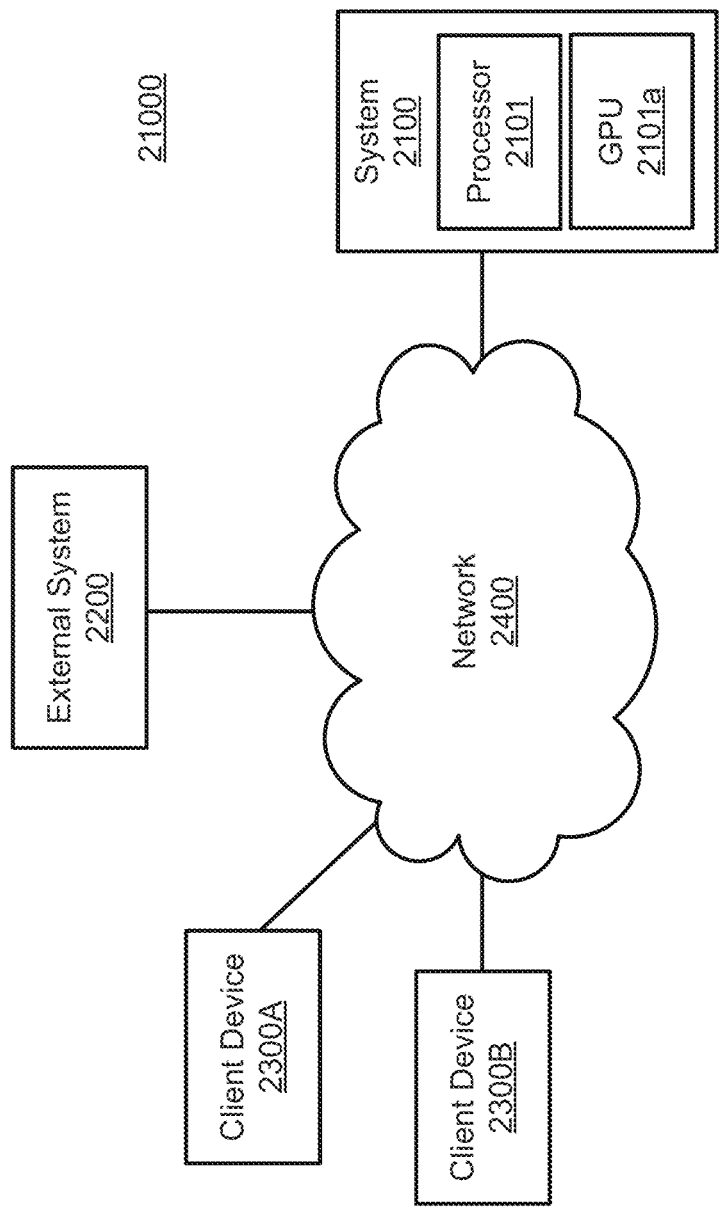
FIGS. 7A-C illustrates a block diagram of a system environment, including a system, that may be implemented to generate and deliver of content via remote rendering and data streaming, according to an example.
Figure 7B:
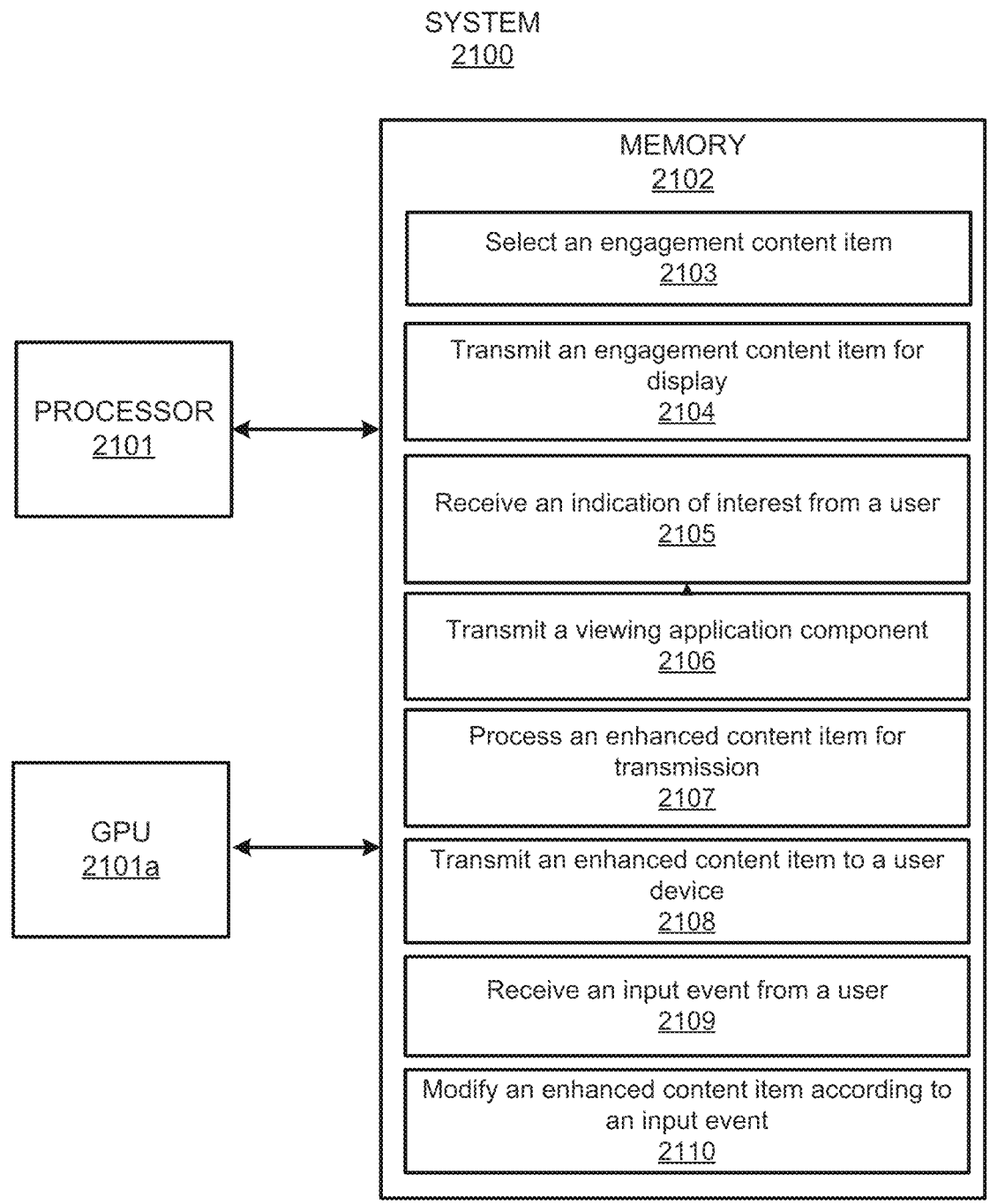
Figure 7C:
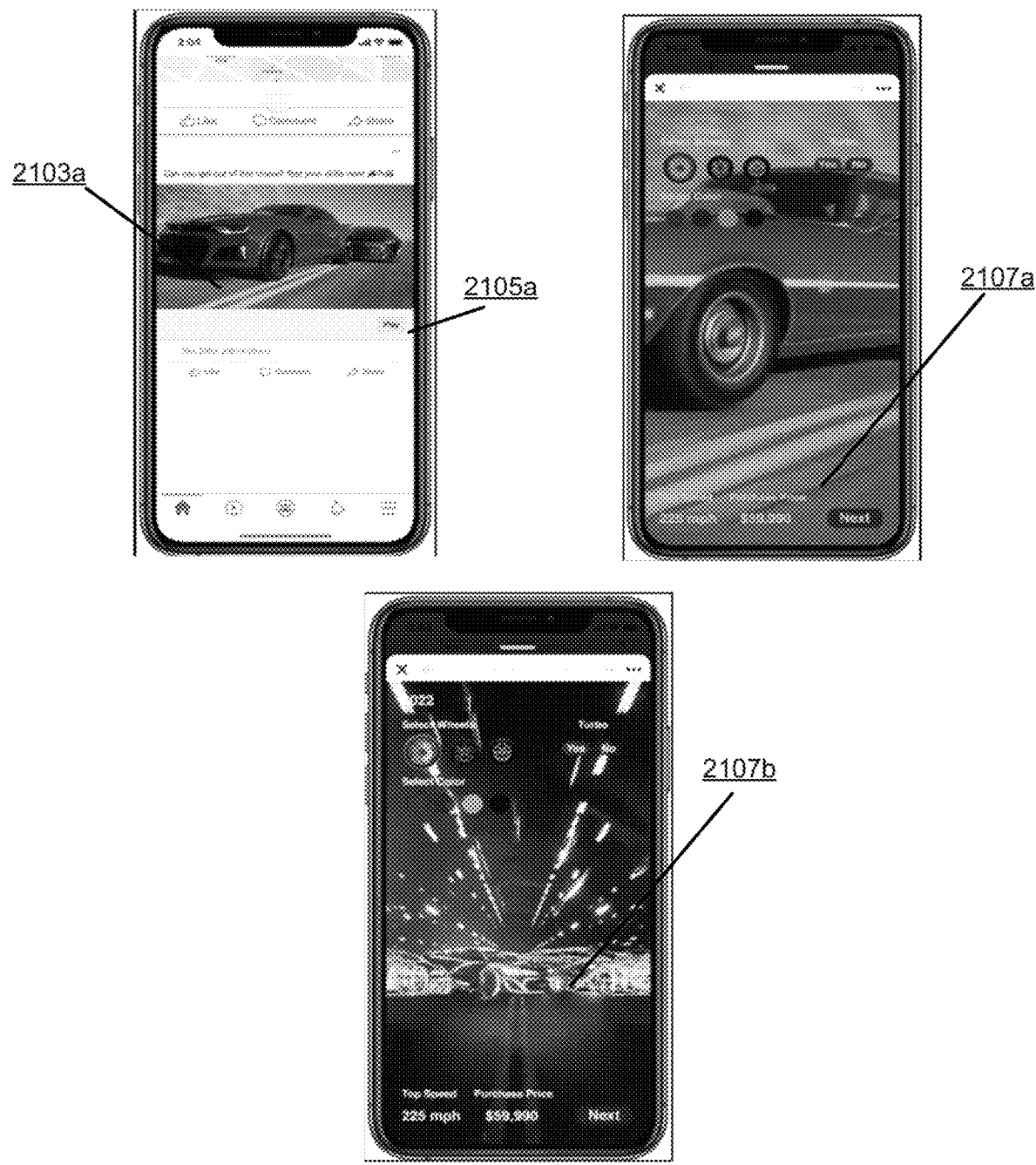

Reference is now made to FIGS. 7A-C. FIG. 7A illustrates a block diagram of a system environment, including a system, that may be implemented to generate and deliver of content via remote rendering and data streaming, according to an example. FIG. 7B illustrates a block diagram of the system that may be implemented to generate and deliver of content via remote rendering and data streaming, according to an example. FIG. 7C illustrates examples of engagement content items and enhanced content items, according to examples.

As will be described in the examples below, one or more of system 2100, external system 2200, client devices 2300A-B and system environment 21000 shown in FIGS. 7A-7B may be operated by a service provider to generate and deliver of content via remote rendering and data streaming. It should be appreciated that one or more of the system 2100, the external system 2200, the client devices 2300A-2300B and the system environment 21000 depicted in FIGS. 7A-7B may be provided as examples. Thus, one or more of the system 2100, the external system 2200 the client devices 2300A-2300B and the system environment 21000 may or may not include additional features and some of the features described herein may be removed and/or modified without departing from the scopes of the system 2100, the external system 2200, the client devices 2300A-2300B and the system environment 21000 outlined herein. Moreover, in some examples, the system 2100, the external system 2200, and/or the client devices 2300A-B may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 7A-7B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 2100, the external system 2200, the client devices 2300A-2300B or the system environment 21000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 2200 may include any number of servers, hosts, systems, and/or databases that store data to be accessed by the system 2100, the client devices 2300A-2300B, and/or other network elements (not shown) in the system environment 21000. In addition, in some examples, the servers, hosts, systems, and/or databases of the external system 2200 may include one or more storage mediums storing any data. In some examples, and as will be discussed further below, the external system 2200 may be utilized to store any information (e.g., marketing information, budgeting information, advertising content/information, etc.) that may relate to generation and delivery of content via remote rendering and data streaming. As will be discussed further below, in other examples, the external system 2200 may be utilized by a service provider distributing content (e.g., a social media application provider) to store any information relating to one or more users and a library of one or more content items (e.g., advertisements).

In some examples, and as will be described in further detail below, the client devices 2300A-2300B may be utilized to, among other things, receive content via generated and delivered via remote rendering and data streaming. In some examples, the client devices 2300A-2300B may be electronic or computing devices configured to transmit and/or receive data. In this regard, each of the client devices 2300A-2300B may be any device having computer functionality, such as a television, a radio, a smartphone, a tablet, a laptop, a watch, a desktop, a server, or other computing or entertainment device or appliance. In some examples, the client devices 2300A-2300B may be mobile devices that are communicatively coupled to the network 2400 and enabled to interact with various network elements over the network 2400. In some examples, the client devices 2300A-2300B may execute an application allowing a user of the client devices 2300A-2300B to interact with various network elements on the network 2400. Additionally, the client devices 2300A-2300B may execute a browser or application to enable interaction between the client devices 2300A-2300B and the system 2100 via the network 2400. In some examples, and as will described further below, a client may utilize the client devices 2300A-2300B to access a browser and/or an application interface for use in receiving content via generated and delivered via remote rendering and data streaming. Moreover, in some examples and as will also be discussed further below, the client devices 2300A-2300B may be utilized by a user viewing content (e.g., advertisements) distributed by a service provider (e.g., a social media application provider), wherein information relating to the user may be stored and transmitted by the client devices 2300A-2300B to other devices, such as the external system 2200.

The system environment 21000 may also include the network 2400. In operation, one or more of the system 2100, the external system 2200 and the client devices 2300A-2300B may communicate with one or more of the other devices via the network 2400. The network 2400 may be a local area network (LAN), a wide area network (WAN), the Internet, a cellular network, a cable network, a satellite network, or other network that facilitates communication between, the system 2100, the external system 2200, the client devices 2300A-2300B and/or any other system, component, or device connected to the network 2400. The network 2400 may further include one, or any number, of the exemplary types of networks mentioned above operating as a stand-alone network or in cooperation with each other. For example, the network 2400 may utilize one or more protocols of one or more clients or servers to which they are communicatively coupled. The network 2400 may facilitate transmission of data according to a transmission protocol of any of the devices and/or systems in the network 2400. Although the network 2400 is depicted as a single network in the system environment 21000 of FIG. 7A, it should be appreciated that, in some examples, the network 2400 may include a plurality of interconnected networks as well.

It should be appreciated that in some examples, and as will be discussed further below, the system 2100 may be configured to utilize artificial intelligence (AI) based techniques and mechanisms to generate and deliver of content via remote rendering and data streaming. Details of the system 2100 and its operation within the system environment 21000 will be described in more detail below.

As shown in FIGS. 7A-7B, the system 2100 may include processor 2101, a graphics processor unit (GPU) 101a, and the memory 2102. In some examples, the processor 2101 may be configured to execute the machine-readable instructions stored in the memory 2102. It should be appreciated that the processor 2101 may be a semiconductor-based microprocessor, a central processing unit (CPU), an application specific integrated circuit (ASIC), a field-programmable gate array (FPGA), and/or other suitable hardware device.

In some examples, the graphics processor unit (GPU) 2101a may be configured to process image and/or video data. In some examples, the graphics processor unit (GPU) 2101a may implement a parallel structure for processing various instructions simultaneously, and may, in some cases, be particularly suited to implement two-dimensional (2D) or three-dimensional (3D) image and video processing. In should be appreciated that in the examples described herein the graphic processor unit (GPU) 2101a may be utilized in conjunction with one or more other graphics processing units (GPUs). In some examples, the GPU 2101a may be utilized to process image and/or video data that another processor, such as the processor 2101, may be unable to process.

In some examples, the memory 2102 may have stored thereon machine-readable instructions (which may also be termed computer-readable instructions) that the processor 2101 may execute. The memory 2102 may be an electronic, magnetic, optical, or other physical storage device that contains or stores executable instructions. The memory 2102 may be, for example, Random Access memory (RAM), an Electrically Erasable Programmable Read-Only Memory (EEPROM), a storage device, an optical disc, or the like. The memory 2102, which may also be referred to as a computer-readable storage medium, may be a non-transitory machine-readable storage medium, where the term "non-transitory" does not encompass transitory propagating signals. It should be appreciated that the memory 2102 depicted in FIGS. 7A-7B may be provided as an example. Thus, the memory 2102 may or may not include additional features, and some of the features described herein may be removed and/or modified without departing from the scope of the memory 2102 outlined herein.

It should be appreciated that, and as described further below, the processing performed via the instructions on the memory 2102 may or may not be performed, in part or in total, with the aid of other information and data, such as information and data provided by the external system 2200 and/or the client devices 2300A-2300B. Moreover, and as described further below, it should be appreciated that the processing performed via the instructions on the memory 2102 may or may not be performed, in part or in total, with the aid of or in addition to processing provided by other devices, including for example, the external system 2200 and/or the client devices 2300A-2300B.

The memory 2102 may store instructions, which when executed by the processor 2101, may cause the processor to: select 2103 an engagement content item; transmit 2104 an engagement content item for display; receive 2105 an indication of interest from a user; transmit 2106 a viewing application component. In addition, the memory 2102 may also store instructions, which when executed by the processor 2125, may cause the processor to: process 2107 an enhanced content item for transmission; and transmit 2108 an enhanced content item to a user device; receive 2109 an input event from a user; and modify 2110 an enhanced content item according to an input event.

In some examples, the instructions 2103-2110 on the memory 2102 may be executed alone or in combination by the processor 2101 to generate and deliver of content via remote rendering and data streaming. In some examples, the instructions 2103-2110 may be implemented in association with a content platform configured to provide content for users. Furthermore, although not depicted, it should be appreciated that instructions on the instructions 2103-2110 may also be configured to utilize various artificial intelligence (AI) based machine learning (ML) tools.

In some examples, the instructions 2103 may be configured to select an engagement content item for a user. As used herein, an engagement content item may include any item of content that may be presented to a user for the purpose of engagement, such as engagement content item 2103a. In some examples, the engagement content item may include a "call-to-action", which may invite a user to engage via a selection mechanism. Examples of selection mechanisms presented by an engagement item may include thumbnails, banners or buttons.

In some examples, to select an engagement content item, the instructions 2103 may access a library of content items (e.g., a plurality of advertisements) available to a service provider (e.g., a social media application provider). In one example, the library of content items may be accessed by the instructions 2103 from an external system, such as the external system 2200.

Also, in some examples, to select an engagement content item, the instructions 2103 may analyze a library of content items according to any relevant information, including information associated with a user. Examples of information that may be associated with the user may include the user's interests, browsing history and demographic information. In some examples, the instructions 2103 may analyze the library of content items and the information associated with the user to determine an engagement content item most likely to be of interest.

In some examples, to select the engagement content item, the instructions 2103 may to generate a ranking. In some examples, each of the content items in the library of content items may be assigned a ranking value and ranked accordingly, wherein a highest (or lowest) ranked content item in the library may correspond to the engagement content item most likely to be of interest to a user. It should be appreciated that to generate the ranking of content items in the library of content items, the instructions 2103 may be configured to incorporate various mathematical and modeling techniques, including one or more of machine learning, artificial intelligence and heuristics techniques.

In some examples, the instructions 2104 may transmit an engagement content item for display. In some examples, the instructions 2104 may transmit the engagement content item to a user device, such as the client device 2300A (e.g., a smartphone). Also, in some examples, the engagement content item may be transmitted for display in a content feed, such as a content feed made available on a social media application.

As discussed below, in some examples, an engagement content item may be associated with an enhanced content item of similar subject matter. So, in one example, an engagement content item (e.g., a banner) relating to a luxury automobile company may be associated with an enhanced content item relating to a particular model of luxury car offered by the company. In another example, an engagement content item (e.g., a thumbnail) relating to a video game may be associated with an enhanced content item providing an interactive preview of the video game. In some examples, the receipt of the indication of interest may "activate" publishing of an enhanced content item, as described below.

In some examples, the instructions 2105 may receive an indication of interest from a user. In some examples, the indication of interest may be based on an interaction with the engagement content item. So, in one example, the user may (manually) select a "play" button on an engagement content item shown in the user's feed on a social media platform, such as button 2105a.

In some examples, an indication of interest may be accompanied by additional information that may be utilized to select an enhanced content item for a user. For example, in an example where the engagement content item may be a poll displayed in the user's feed, the additional information may include the user's poll selection. In some examples, as discussed below, the additional information received from the user's indication of interest may be utilized to select an enhanced content item to be shown.

In some examples, upon receipt of an indication of interest (e.g., via the instructions 2105), the instructions 2106 may transmit a viewing application component to a user device. As used herein, a "viewing application component" may include any software component or application that may enable viewing of an enhanced content item as described. In some examples, the viewing application component may include a web browser, which may enable a user to view an enhanced content item in a typical web view via a browser window.

As discussed below, in some examples, a web browser provided by a viewing application component may be utilized to access a website originating a stream of content data associated with the enhanced content item. In some examples, the viewing application component may include a custom decoder, which may be utilized to decode stream data associated with the enhanced content item.

In some examples, the instructions 2107 may select an enhanced content item for transmission, such as enhanced content item 2107a, 2107b. In some examples, to select an enhanced content item for transmission, the instructions 2107 may analyze a library of content items. In one examples, the library of content items may be accessed by the instructions 2107 from an external system, such as the external system 2200.

In some examples, the enhanced content item may be selected according to information associated with a user. Examples of the types of information that may be associated with the user may include the user's interests, browsing history and demographic information. In some examples, the instructions 2107 may analyze the information associated with the user to select an enhanced content item likely to be of interest.

As discussed above, in some examples, the instructions 2107 may utilize an association between an enhanced content item and an engagement content item that a user has indicated interest in. So, in one example, if a user has indicated interest in an engagement content item associated with a luxury vehicle, the instructions 2107 may analyze a library of enhanced content items associated with luxury vehicles to select an enhanced content item to deliver to the user.

In some examples, to select the enhanced content item, the instructions 2107 may to generate a ranking of enhanced content items. In some examples, each of the enhanced content items in the library of content items may be assigned a ranking value and ranked accordingly, wherein a highest (or lowest) ranked content item in the library may correspond to the content item most likely to be of interest to the user. It should be appreciated that to generate the ranking of enhanced content items, the instructions 2107 may be configured to incorporate various mathematical and modeling techniques, including one or more of machine learning (ML), artificial intelligence (AI) and heuristics techniques. For instance, these AI-based machine learning (ML) tools may be used to generate models that may include a neural network, a generative adversarial network (GAN), a tree-based model, a Bayesian network, a support vector, clustering, a kernel method, a spline, a knowledge graph, or an ensemble of one or more of these and other techniques. It should also be appreciated that the system 2100 may provide other types of machine learning (ML) approaches, such as reinforcement learning, feature learning, anomaly detection, etc.

In some examples, upon selection of an enhanced content item, the instructions 2107 may initiate processing of the enhanced content item for transmission to a user device. In some examples, to process the enhanced content item for transmission, the instructions 2107 may utilize various methods and techniques of image and video processing. For example, the methods and techniques implemented via the instructions 2107 may include, but are not limited to, feature extraction, image restoration, pattern recognition, and aspect-ratio control.

In addition, the instructions 2107 may also utilize various rendering methods and techniques as well. As used herein, "rendering" may include any process for generating images from two-dimensional and three-dimensional models. In some examples, the instructions 2107 may render an enhanced content item by implementing real-time raytracing. In these examples, real-time raytracing may be utilized to provide shadows and reflections in the enhanced content item. Also, in some examples, the instructions 2107 may render an enhanced content item by implementing surface scattering of materials. In these examples, surface scattering may be utilized to display light that may penetrate a surface of a translucent object, scatter the light to mimic its interaction with an object, and to indicate exit of the scattered light from an object surface at a different point.

In addition, in some examples, the instructions 2107 may render an enhanced content item by implementing processing of subdivision surfaces. In these examples, processing of subdivision surfaces may include representing a smooth surface via specification of a polygon mesh. In other examples, the rendering implemented via the instructions 2107 may include lighting/shading (i.e., how color and brightness of a surface may vary with lighting), texture-mapping (i.e., applying detail to surfaces), bump-mapping (i.e., simulating small-scale bumpiness on a surface), fogging (i.e., dimming light while passing though surfaces), and implementation of shadows/shadowing. In still other examples, the rendering implemented via the instructions 2107 may include reflection processing, transparency, translucency, refraction, diffraction, indirect illumination (i.e., illuminating surface by reflected light), depth of field processing and motion blurring.

As discussed above, to implement the above techniques and methods in processing an enhanced content item for transmission, the instructions 2107 may utilize one or more graphics processing units (GPUs), similar to the GPU 2101a. In some examples, the instructions 2107 may utilize the one or more graphics processing units (GPUs) to stream processed data to user device for publication. Also, in some examples, the one or more graphics processing units (GPUs) may be located on a device (e.g., a server) that may be remote from a user device where a related enhanced content item may be published, and also may be remote from a device where the instructions 2107 may be stored.

In one example, the instructions 2107 may utilize the techniques and methods above to enable processing of a video game preview in a native (i.e., higher) resolution format, and may also enable a user to "play" the video game. In another example, the instructions 2108 may enable processing of a "procedural" advertisement" that may inform a user about a product, show the user how to use the product, and interactively simulate use of the product. So, in one such example relating to a clothing item (e.g., a dress), the instructions 108 may utilize the techniques and methods above to enable a user to view an enhanced content item that may describe the clothing item, describe the design process for the clothing item, and enable the user to interactively "see" themselves wearing the clothing item.

In some examples, the instructions 2108 may transmit an enhanced content item to a user device. In some examples, to transmit the enhanced content item, the instructions 2108 may stream content data associated with the enhanced content item from a remote device continuously and in real-time (i.e., with low latency) utilizing various technologies, including established protocols (e.g., web sockets), audio and video file formats, codecs and software development kits (SDKs). In some examples, the content data associated with the enhanced content item to be streamed may be encoded, and may be decoded utilizing a decoder, such as the decoder included with an application viewing component (as described above).

Also, in some examples, the instructions 2108 transmit data associated with an enhanced content item for access by a viewing application component on a user device. As discussed above, in some examples, the viewing application component may include a browser component that may publish streamed data associated with the enhanced content item via a typical web view. Also, in some examples, to receive the streamed data associated with the enhanced content item, the browser may access a web address from which the enhanced content item may be streamed. Furthermore, as discussed above, the viewing application component may include a custom decoder that may be utilized to decode the encoded streamed data associated with the enhanced content item.

In some examples, the instructions 2109 may receive an input event associated with an enhanced content item. As used herein, an "input event" may include any interaction that a user may have with an enhanced content item. In some examples, an input event may take place when a user may manipulate an interface component or mechanism provided by the enhanced content item. In one such example involving a video game preview, the input event may take place when a user may manipulate a controller mechanism during gameplay. In other examples, an input event may take place when a user may utilize a selection mechanism provided by the enhanced content item. In one such example involving an enhanced content item displaying athletic wear worn by a user running on a trail, the input event may take place when the user may select a different clothing item to be shown.

In some examples, the instructions 2110 may, upon receipt of an input event from a user, modify an enhanced content item according to the input event. That is, in some examples, upon receipt of the input event, the instructions 2110 may responsively and/or correspondingly modify content of an enhanced content item according to the input event. In one example involving a preview for a video game for racing cars, the instructions 2110 may receive an input event from a user attempting to "drive" the car and may responsively change direction. In another example involving an enhanced content item displaying athletic wear worn by a user running on a trail, the instructions 2110 may receive an input event from a user seeking to change a color of a clothing item (e.g., via selection of images corresponding to different colors), and may responsively change the color.

Figure 8:
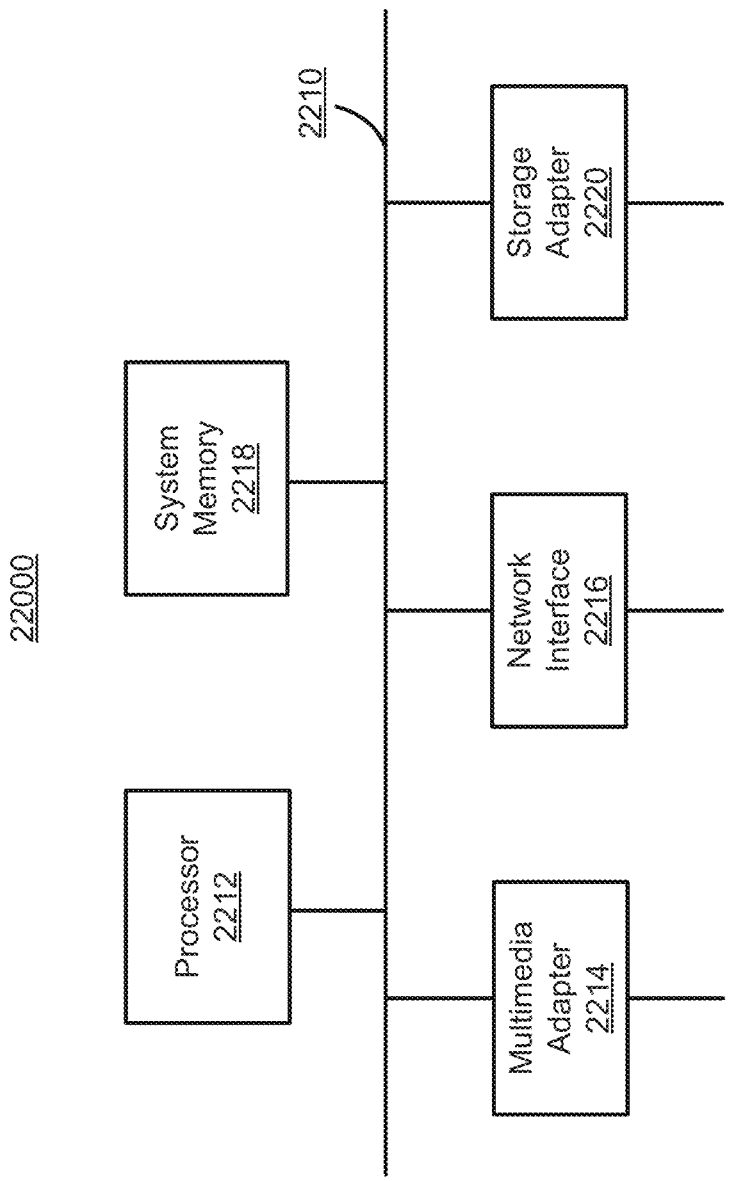
FIG. 8 illustrates a block diagram of a computer system to generate and deliver of content via remote rendering and data streaming, according to an example.

FIG. 8 illustrates a block diagram of a computer system for customized outreach plan generation and optimization based on virtual structures, according to an example. In some examples, the system 2100 may be associated the system 2100 to perform the functions and features described herein. The system 2100 may include, among other things, an interconnect 2210, a processor 2212, a multimedia adapter 2214, a network interface 2216, a system memory 2218, and a storage adapter 2220.

The interconnect 2210 may interconnect various subsystems, elements, and/or components of the external system 2200. As shown, the interconnect 2210 may be an abstraction that may represent any one or more separate physical buses, point-to-point connections, or both, connected by appropriate bridges, adapters, or controllers. In some examples, the interconnect 2210 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 2210 may allow data communication between the processor 2212 and system memory 2218, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 2212 may be the central processing unit (CPU) of the computing device and may control overall operation of the computing device. In some examples, the processor 2212 may accomplish this by executing software or firmware stored in system memory 2218 or other data via the storage adapter 2220. The processor 2212 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 2214 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 2216 may provide the computing device with an ability to communicate with a variety of remote devices over a network (e.g., network 2400 of FIG. 7A) and may include, for example, an Ethernet adapter, a Fibre Channel adapter, and/or other wired- or wireless-enabled adapter. The network interface 2216 may provide a direct or indirect connection from one network element to another, and facilitate communication and between various network elements.

The storage adapter 2220 may connect to a standard computer-readable medium for storage and/or retrieval of information, such as a fixed disk drive (internal or external).

Many other devices, components, elements, or subsystems (not shown) may be connected in a similar manner to the interconnect 2210 or via a network (e.g., network 400 of FIG. 7A). Conversely, all of the devices shown in FIG. 8 need not be present to practice the present disclosure. The devices and subsystems can be interconnected in different ways from that shown in FIG. 8. Code to implement the dynamic approaches for payment gateway selection and payment transaction processing of the present disclosure may be stored in computer-readable storage media such as one or more of system memory 2218 or other storage. Code to implement the dynamic approaches for payment gateway selection and payment transaction processing of the present disclosure may also be received via one or more interfaces and stored in memory. The operating system provided on system 2100 may be MS-DOS, MS-WINDOWS, OS/2, OS X, IOS, ANDROID, UNIX, Linux, or another operating system.

Figure 9A:
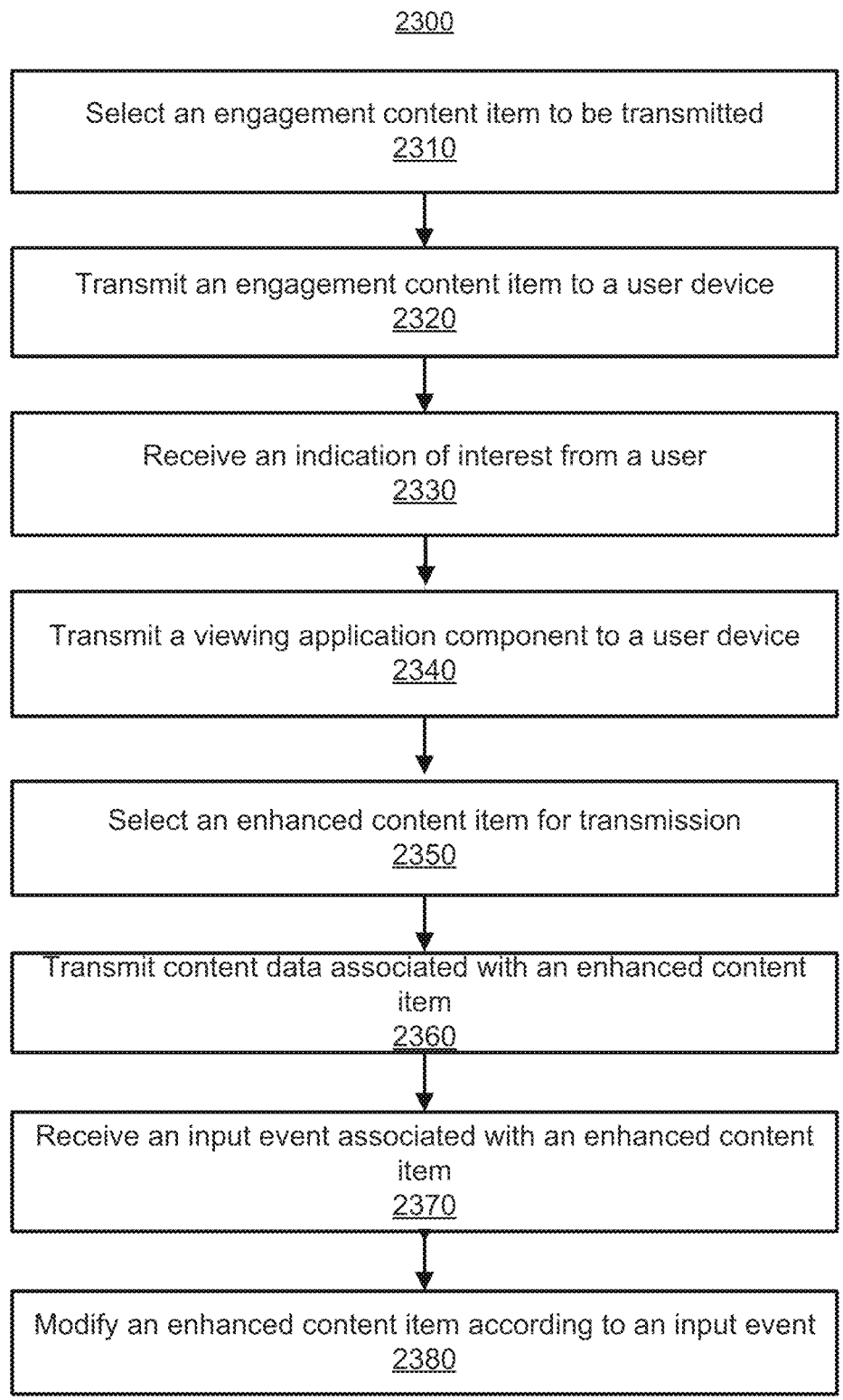
FIGS. 9A-B illustrate a method for generating and delivering content to a user via remote rendering and real-time streaming, according to an example.
Figure 9B:
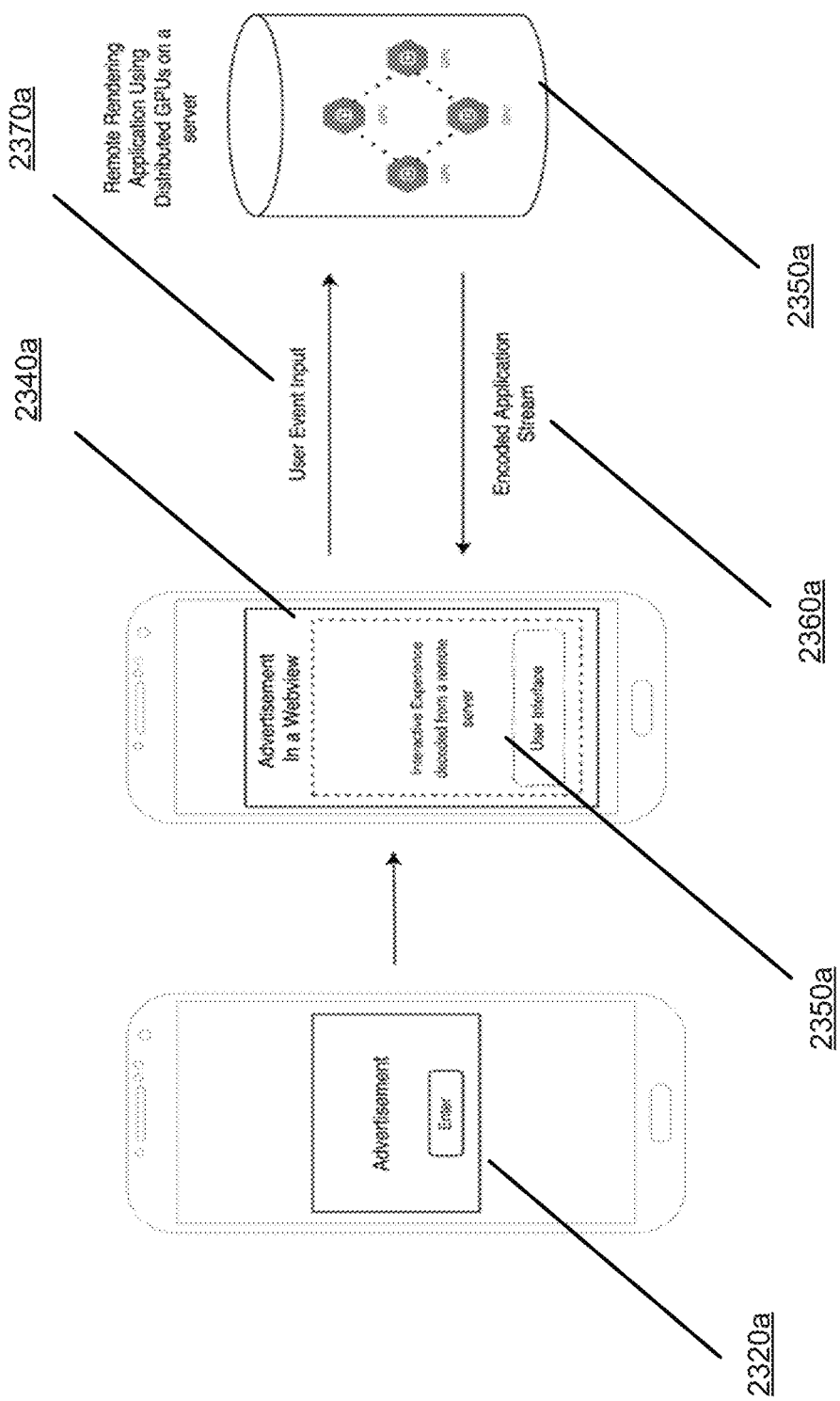

FIGS. 9A-9B illustrate a method 2300 for generating and delivering content to a user via remote rendering and real-time streaming, according to an example. The method 2300 is provided by way of example, as there may be a variety of ways to carry out the method described herein. Each block shown in FIGS. 9A-9B may further represent one or more processes, methods, or subroutines, and one or more of the blocks may include machine-readable instructions stored on a non-transitory computer-readable medium and executed by a processor or other type of processing circuit to perform one or more operations described herein.

Although the method 2300 is primarily described as being performed by system 2100 as shown in FIGS. 7A-7B, the method 2300 may be executed or otherwise performed by other systems, or a combination of systems. It should be appreciated that, in some examples, to generate and deliver content to a user via remote rendering and real-time streaming, the method 2300 may be configured to incorporate artificial intelligence (AI) or deep learning techniques, as described above. It should also be appreciated that, in some examples, the method 2300 may be implemented in conjunction with a content platform (e.g., a social media platform) to generate and deliver content to a user via remote rendering and real-time streaming.

Reference is now made with respect to FIGS. 9A-9B. At 2310, the processor 2101 may select an engagement content item for transmission to a user device (e.g., a smartphone), such as engagement content item 2310a. In some examples, the processor may access and analyze a library of content items, generate a ranking of content items, and select an engagement content item for transmission to a user device.

At 2320, the processor 2101 may transmit an engagement content item to a user device for engagement by a user. In some examples, the engagement content item may be transmitted for display in a content feed, such as a content feed made available on a social media platform.

At 2330, the processor 2101 may receive an indication of interest from a user. In some examples, the indication of interest may be based on a user interaction with an engagement content item. In some examples, the indication of interest may be the result of a user selection of a button (e.g., a "play" button) available on the engagement content item.

At 2340, the processor 2101 may transmit a viewing application component to a user device. In some examples, the viewing application component may include a web browser that may publish an enhanced content item streamed from a website in a typical web view, such as web browser 340a. Also, in some examples, the viewing application component may include a decoder that may decode an encoded stream of content data, such as content data associated with an enhanced content item.

At 2350, the processor 2101 may select an enhanced content item for transmission to a user device. In some examples, to select the enhanced content item, the processor 2101 may analyze information associated with a user to select an enhanced content item most likely to be of interest. Also, in some examples, to select the enhanced content item, the processor 2101 may analyze a library of available content item and generating a ranking.

In addition, the processor 2101 may also initiate processing of content data associated with an enhanced content item. In some examples, the processor 2101 may utilize various processing methods and techniques. For example, the processor may utilize various rendering techniques, including real-time raytracing, surface scattering of materials and processing of subdivision surfaces. In some examples, to process the content data, the processor 101 may be utilized in conjunction with one or more graphics processing units (GPUs), such as the plurality of graphics processing units 2350a. In one example, the one or more graphics processing units (GPUs) may be distributed on a server located remotely from a device housing the processor 2101.

At 2360, the processor 2101 may transmit content data associated with an enhanced content item to a user device. In some examples, the processor 2101 may stream processed and encoded content data associated with the enhanced content item continuously and in real-time to a user device. Also, in some examples, the processor 2101 may stream the processed and encoded content data 2360a to a viewing application component, wherein a decoder may decode the encoded stream data and a browser may display the enhanced content via a typical web view, such as enhanced content item 2350a displayed in the web browser 2340a.

At 2370, the processor 2101 may receive an input event associated with an enhanced content item. In some examples, the input event (such as the input event 2370a) may be a result of a user manipulating an interface component available on the enhanced content item.

At 2380, the processor 2101 may modify an enhanced content item according to the input event. In some examples, upon receipt of the input event, the processor 2101 may responsively and/or correspondingly modify content of an enhanced content item according to the input event.

By enabling offloading of content storage and processing to remote devices and streaming processed content directly to a user's device, the systems and methods described herein may remove or greatly reduce storage limitations for content providers and may provide content to users that otherwise may not have been accessible. Moreover, by enabling provision of content items of higher quality and longer runtimes, the systems and methods may decrease friction in conversion funnels for content providers (e.g., advertisers) and may increase signal quality for service providers.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 2100, the external system 2200, and the client devices 2300 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 2100, the external system 2200, and the client devices 2300, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 2100, the external system 2200, and the client devices 2300, or shared with other systems. Although this disclosure describes using particular privacy settings in a particular manner, this disclosure contemplates using any suitable privacy settings in any suitable manner.

In particular examples, the system 2100, the external system 2200, and the client devices 2300 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 2100, the external system 2200, and the client devices 2300 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 2100, the external system 2200, and the client devices 2300 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 2100, the external system 2200, and the client devices 2300 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 2100, the external system 2200, and the client devices 2300 may access such information in order to provide a particular function or service to the first user, without the system 2100, the external system 2200, and the client devices 2300 having access to that information for any other purposes. Before accessing, storing, or using such objects or information, the system 2100, the external system 2200, and the client devices 2300 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 2100, the external system 2200, and the client devices 2300.

In particular examples, a user may specify whether particular types of objects or information associated with the first user may be accessed, stored, or used by the system 2100, the external system 2200, and the client devices 2300. As an example and not by way of limitation, the first user may specify that images sent by the first user through the system 2100, the external system 2200, and the client devices 2300 may not be stored by the system 2100, the external system 2200, and the client devices 2300. As another example and not by way of limitation, a first user may specify that messages sent from the first user to a particular second user may not be stored by the system 2100, the external system 2200, and the client devices 2300. As yet another example and not by way of limitation, a first user may specify that all objects sent via a particular application may be saved by the system 2100, the external system 2200, and the client devices 2300.

In particular examples, privacy settings may allow a first user to specify whether particular objects or information associated with the first user may be accessed from the system 2100, the external system 2200, and the client devices 2300. The privacy settings may allow the first user to opt in or opt out of having objects or information accessed from a particular device (e.g., the phone book on a user's smart phone), from a particular application (e.g., a messaging app), or from a particular system (e.g., an email server). The system 2100, the external system 2200, and the client devices 2300 may provide default privacy settings with respect to each device, system, or application, and/or the first user may be prompted to specify a particular privacy setting for each context. As an example and not by way of limitation, the first user may utilize a location-services feature of the system 2100, the external system 2200, and the client devices 2300 to provide recommendations for restaurants or other places in proximity to the user. The first user's default privacy settings may specify that the system 2100, the external system 2200, and the client devices 2300 may use location information provided from one of the client devices 2300 of the first user to provide the location-based services, but that the system 2100, the external system 2200, and the client devices 2300 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 2100, the external system 2200, and the client devices 2300 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 2100, the external system 2200, and the client devices 2300 may use a user's previous activities and calculated moods, emotions, or sentiments to determine a present mood, emotion, or sentiment. A user who wishes to enable this functionality may indicate in their privacy settings that they opt in to the system 2100, the external system 2200, and the client devices 2300 receiving the inputs necessary to determine the mood, emotion, or sentiment. As an example and not by way of limitation, the system 2100, the external system 2200, and the client devices 2300 may determine that a default privacy setting is to not receive any information necessary for determining mood, emotion, or sentiment until there is an express indication from a user that the system 2100, the external system 2200, and the client devices 2300 may do so. By contrast, if a user does not opt in to the system 2100, the external system 2200, and the client devices 2300 receiving these inputs (or affirmatively opts out of the system 2100, the external system 2200, and the client devices 2300 receiving these inputs), the system 2100, the external system 2200, and the client devices 2300 may be prevented from receiving, collecting, logging, or storing these inputs or any information associated with these inputs. In particular examples, the system 2100, the external system 2200, and the client devices 2300 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 2100, the external system 2200, and the client devices 2300 may use the user's mood, emotion, or sentiment to provide newsfeed items, pages, friends, or advertisements to a user. The user may specify in their privacy settings that the system 2100, the external system 2200, and the client devices 2300 may determine the user's mood, emotion, or sentiment. The user may then be asked to provide additional privacy settings to indicate the purposes for which the user's mood, emotion, or sentiment may be used. The user may indicate that the system 2100, the external system 2200, and the client devices 2300 may use his or her mood, emotion, or sentiment to provide newsfeed content and recommend pages, but not for recommending friends or advertisements. The system 2100, the external system 2200, and the client devices 2300 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 2100, the external system 2200, and the client devices 2300 may be restricted in its access, storage, or use of the objects or information. The system 2100, the external system 2200, and the client devices 2300 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 2100, the external system 2200, and the client devices 2300 may temporarily store the message in a content data store until the second user has viewed or downloaded the message, at which point the system 2100, the external system 2200, and the client devices 2300 may delete the message from the data store. As another example and not by way of limitation, continuing with the prior example, the message may be stored for a specified period of time (e.g., 2 weeks), after which point the system 2100, the external system 2200, and the client devices 2300 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 2100, the external system 2200, and the client devices 2300 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 2100, the external system 2200, and the client devices 2300. The user's privacy settings may specify that such information may be used only for particular processes, such as authentication, and further specify that such information may not be shared with any external system or used for other processes or applications associated with the system 2100, the external system 2200, and the client devices 2300. As another example and not by way of limitation, the system 2100, the external system 2200, and the client devices 2300 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the system 2100, the external system 2200, and the client devices 2300. As another example and not by way of limitation, the system 2100, the external system 2200, and the client devices 2300 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 2100, the external system 2200, and the client devices 2300.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 2100, the external system 2200, and the client devices 2300 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 2100, the external system 2200, and the client devices 2300 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 2100, the external system 2200, and the client devices 2300 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 2100, the external system 2200, and the client devices 2300 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"). However, if the user changes his or her relationship status, the system 2100, the external system 2200, and the client devices 2300 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 2100, the external system 2200, and the client devices 2300 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 2100, the external system 2200, and the client devices 2300 may send a reminder to the user to confirm his or her privacy settings every six months or after every ten photo posts. In particular examples, privacy settings may also allow users to control access to the objects or information on a per-request basis. As an example and not by way of limitation, the system 2100, the external system 2200, and the client devices 2300 may notify the user whenever an external system attempts to access information associated with the user, and require the user to provide verification that access should be allowed before proceeding.

Advances in content management and media distribution are causing users to engage with content on or from a variety of content platforms. As used herein, a "user" may include any user of a computing device or digital content delivery mechanism who receives or interacts with delivered content items, which may be visual, non-visual, or a combination thereof.

Often, a content item may be generated by a content provider (e.g., an advertiser) seeking to inform an audience of a product or service being offered. With the proliferation of different types of digital content delivery mechanisms (e.g., mobile phone devices, tablet devices, etc.), it has become crucial that content providers engage users with content that is of interest to them.

In many instances, the content generated by the content provider may be part of a larger outreach campaign. Examples of types of outreach campaigns may vary according any number of criteria. For example, an outreach campaign may vary by length of time. In some cases, outreach campaigns may be short-term (e.g., less than a year) campaigns to market a line of products, while in other cases outreach campaigns may be long-term (e.g., multi-year) campaigns to brand/rebrand a company or other organizational entity. An outreach campaign may also vary in scope, where examples of an outreach campaign may range from a single content item (e.g., a digital advertisement) to market a particular product or service to an entire campaign including a group of related advertisements to market an entire family of products and services. As used herein, "content item", "digital content", and "digital content item" may refer to any digital data (e.g., a data file). Examples of digital content items include, but are not limited to, digital images, digital video files, digital audio files, and/or streaming content. Additionally, the terms "content item", "digital content", and "digital content item" may refer interchangeably to the digital content items themselves or portions thereof.

A successful outreach campaign may be a result of a number of factors. A first such factor may be targeting of an interested audience. In some examples, targeting an interested audience may include analyzing audience members according to their personal characteristics (e.g., demographic information, interests, etc.) to determine members that may be interested in a content item. A second factor may be (effective) determination of an outreach campaign objective. Specifically, proper definition of an objective may offer a greater focus in execution and lead to more successful results. A third factor may be creative quality associated with a content item, in that the greater creative quality of a content item may be more likely it may be of interest to a user. Examples that may be evidence creative quality in a content item may include, among other things, subject matter, presentation or visual and/or audio effects.

To predict and/or increase effectiveness of outreach campaigns, content providers may rely on one or more quantitative metrics associated with these aspects. So, in targeting of an audience of users, one such quantifiable metric may be a probability associated with a click-through rate (CTR). A click-through-rate (CTR) may be a ratio indicating a likelihood (i.e., probability) that a user will engage a piece of content item to a number of total users who will engage the content item. Other examples of metrics that may be used to predict and/or increase effectiveness of outreach campaigns may include engagement rates or conversion rates.

Advertisers may often spend a large chunk of their budget on the services of creative professionals to enhance creative quality of their content items. However, greater spend in production and development of creative may not always lead to greater creative quality. This may be because evaluation of creative qualities of a content item may be based on a number of factors, such as who may be viewing the content and what context or platform they may be viewing the content item on.

Creative quality of a content item may often be highly subjective and difficult to quantify. Consequently, it may difficult to understand how the creative quality affected ad performance, separate from other aspects (e.g., targeting, budget, or objective). This has made measuring impact of creative qualities a persistent challenge.

Nevertheless, attempts have been made to measure creative quality. A first example of measuring creative quality may be surveys. Some examples, surveys may ask one or more audience members questions. Example questions may include: "Did you find [the content item] enjoyable?", "Why or why not?", and "How much did you like (or dislike) it?" In some examples, results from questions such as these may be gathered and aggregated to assess creative quality of a content item.

A second example of a survey-based method for measuring creative performance may be "A/B" testing. In some examples, A/B testing may compare two versions of a single variable (e.g., a creative aspect of a content item), typically by testing a subject's response to variant A against variant B, and determining which variant may be more effective. So, in one example, a group (i.e., an audience) may be presented with a first music score and a second music score to determine which music score may be preferred (i.e., more effective).

A third example may be a quality "ranking", wherein audience members' reactions may be ranked in order to correspond to effectiveness. Audience member reactions may be quantified using various signals, such as feedback from people viewing or hiding a content item and user assessments (e.g., "likes", "dislikes", etc.) from audience members viewing a content item. The signals may be compiled to determine a ranking, and a content item may be associated with a percentile that may indicate content quality for a content item.

A fourth example of a survey-based method may be a "lift test". In a "lift test", wherein a group of users (i.e., a "holdout" or "control group") may be withheld from seeing a content item in order to understand its causal impact on specific business objectives, such as brand recognition or conversion. That is, in some examples, lift tests may also include measuring reactions of audience members in test and control groups and comparing performance of the content item between the test and the control group. In some examples, administration of a lift test may include: choosing a business objective and campaign, dividing an intended audience randomly into test and holdout groups, and controlling delivery of an associated content item based on these randomized groups. In some cases, lift tests may be particularly effective since they may help to reveal a specific impact of a particular content item.

A "brand" lift test may be a particular type of lift test directed to audience associations with a brand (i.e., "brand polling"). A difference in performance between a test and a holdout group may represent a "lift" associated with a content item under test conditions. In some examples, the difference in performance may be represented by a lift "percentage", and may be referred to as lift "attribution". Results gathered of responses of audience to questions like these may be used to evaluate and enhance performance of content items. In a brand lift test, examples of the associated questions may be based on: 1) Are audiences able to recall (seeing or hearing) a content item? 2) Did audience members like what they saw or heard in a content item? 3) Are audience members more aware of a brand after seeing a content item? 4) Did a content item influence audience members into considering a brand or brand product? 5) Are audience members more likely to purchase a product or brand after seeing the ad?

However, there may be a number of drawbacks to utilizing survey-based methods in measuring effectiveness of creative for a content item. First, in many instances, sample sizes associated with survey-based methods may be limited. Limited sample sizes may often lead to biased results. Furthermore, survey-based methods may not be done at scale, since time and costs associated with gathering feedback at scale may be prohibitive. Another drawback may be impracticalities associated with targeting a particular audience. Typical survey-based methods may only enable targeting based on basic demographics like age and gender. However, a content item may perform quite differently (better or worse) when presented to a properly targeted audience. Yet another drawback may be that responses from audience members may not have any direct association with outcome (i.e., effectiveness). Specifically, in many instances, questions to audience members may be based on "execution" particulars, such as whether an audience member noticed a branding item in a content item or whether the audience member received a focal point or theme of the content item. And because the questions may not be linked to outcome directly, they may not necessarily help a content provider anticipate impact or effectiveness of creative quality in a content item.

Systems and methods may generally relate to generation and implementation of quantitative indicators to predict and measure impact of creative qualities of content items. In some examples, the systems and methods for gathering information relating to a content item, determining one or more input values associated with the content item, and iteratively adjust a model utilizing the one or more input values to generate a quantitative indicator to measure and predict impact of creative aspects of the content item.

In some examples, a generated quantitative indicator may quantify an impact of a creative experience offered by a content item in a scalable manner, and may be utilized to predict corresponding incremental business outcomes. As such, a generated quantitative indicator may provide a signal for content providers to use to identify significance of creative on a content items, identify effective creative practices and to improve a creative impact of content items. Furthermore, the quantitative indicators may also be used to quantify "room for improvement" and to generate information relating to optimized delivery of content items, such as favorable verticals and formats in which to deploy content items.

Figure 10A:
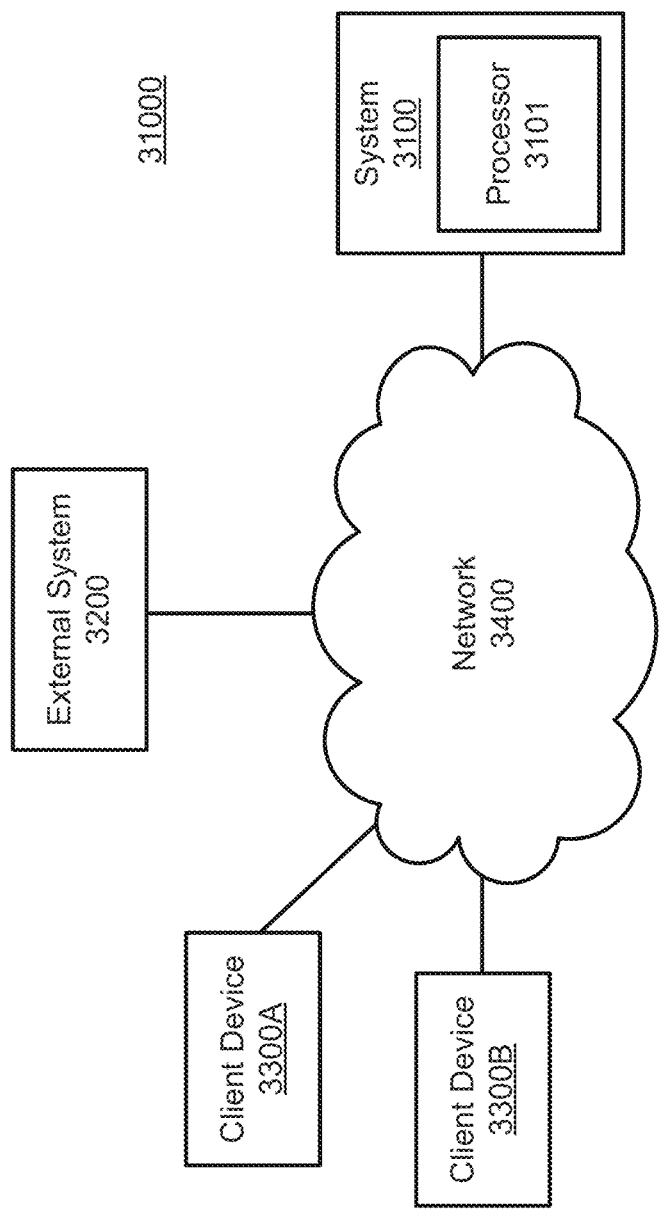
FIG. 10A illustrates a block diagram of a system environment, including a system, that may be implemented to generate and implement quantitative indicators to measure and predict impact of creative qualities of content items, according to an example.
Figure 10B:
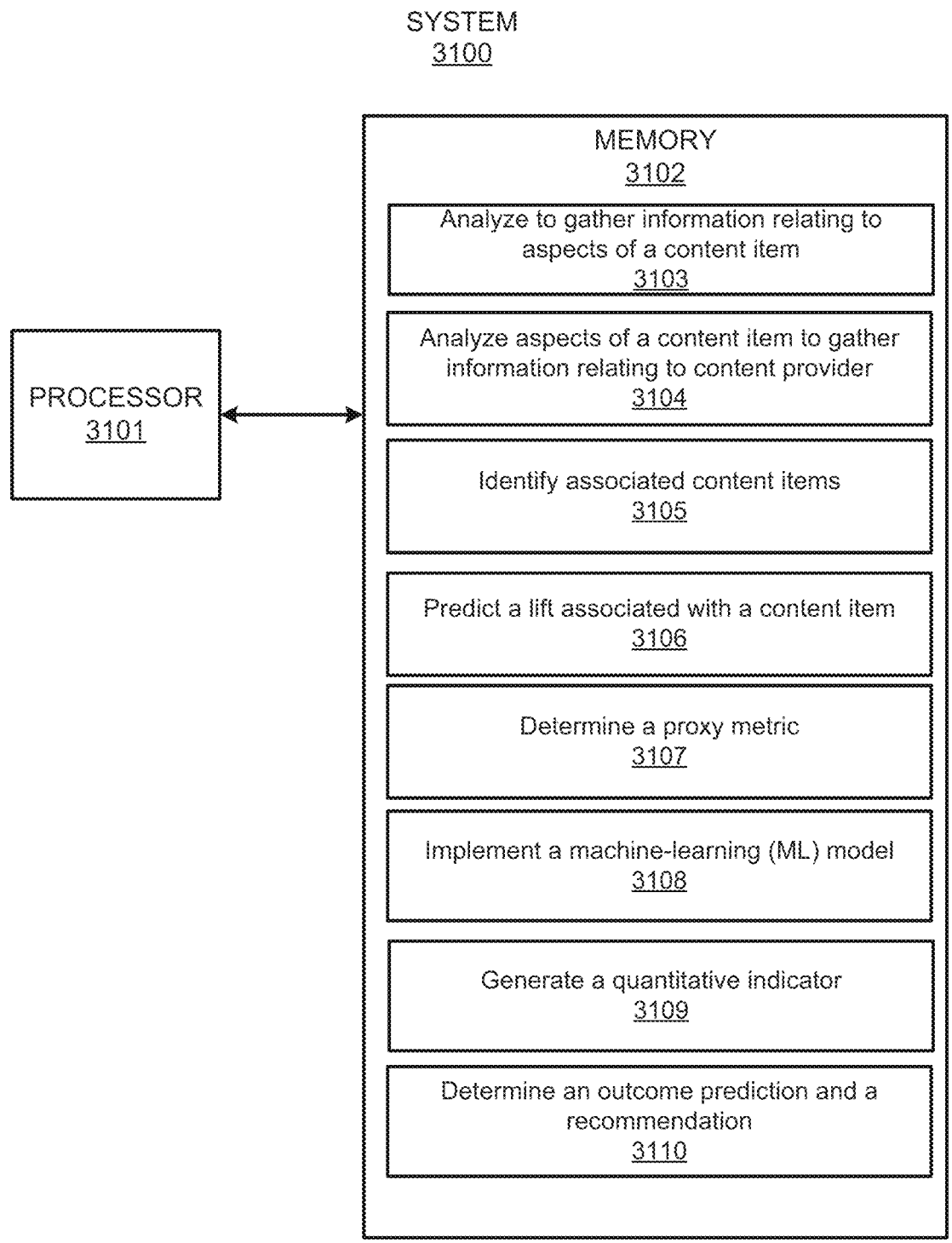
FIG. 10B illustrates a block diagram of the system that may be implemented to generate and implement quantitative indicators to measure and predict impact of creative qualities of content items, according to an example.

FIG. 10A illustrates a block diagram of a system environment, including a system, that may be implemented to generate and implement quantitative indicators to measure and predict impact of creative qualities of content items, according to an example. FIG. 10B illustrates a block diagram of the system that may be implemented to generate and implement quantitative indicators to measure and predict impact of creative qualities of content items, according to an example.

As will be described in the examples below, one or more of system 3100, external system 3200, client devices 3300A-B and system environment 31000 shown in FIGS. 10A-B may be operated by a service provider to, among other things, gather information relating to a content item, determine one or more input values associated with the content item, and iteratively adjust a model utilizing the one or more input values to generate an quantitative indicator to measure and predict impact of creative aspects of the content item.

It should be appreciated that one or more of the system 3100, the external system 3200, the client devices 3300A-B and the system environment 31000 depicted in FIGS. 1A-B may be provided as examples. Thus, one or more of the system 3100, the external system 3200 the client devices 3300A-B and the system environment 31000 may or may not include additional features and some of the features described herein may be removed and/or modified without departing from the scopes of the system 3100, the external system 3200, the client devices 3300A-B and the system environment 31000 outlined herein. Moreover, in some examples, the system 3100, the external system 3200, and/or the client devices 3300A-B may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 10A-B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 3100, the external system 3200, the client devices 3300A-B or the system environment 31000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 3200 may include any number of servers, hosts, systems, and/or databases that store data to be accessed by the system 3100, the client devices 3300A-B, and/or other network elements (not shown) in the system environment 31000. In addition, in some examples, the servers, hosts, systems, and/or databases of the external system 3200 may include one or more storage mediums storing any data. In some examples, and as will be discussed further below, the external system 3200 may store information (e.g., user information) that may relate to generating quantitative indicators to measure and predict impact of creative aspects of content items.

In some examples, and as will be described in further detail below, the client devices 3300A-B may be utilized to, among other things, generate and implement of quantitative indicators to measure and predict impact of creative qualities of content items. So, in one example, the client device 3300A may be utilized by a first user to provide feedback regarding a content item available on a content platform. Also, in one example, the client device 3300B may be utilized to provide to a second user a content item that may be recommended based on a qualitative indicator to measure and predict impact of creative qualities of the content item.

In some examples, the client devices 3300A-B may be electronic or computing devices configured to generate and implement quantitative indicators to measure and predict impact of creative qualities of content items. In this regard, each of the client devices 3300A-B may be any device having computer functionality, such as a television, a radio, a smartphone, a tablet, a laptop, a watch, a desktop, a server, or other computing or entertainment device or appliance. In some examples, the client devices 3300A-B may be mobile devices that are communicatively coupled to the network 3400 and enabled to interact with various network elements over the network 3400. In some examples, the client devices 3300A-B may execute an application allowing a user of the client devices 3300A-B to interact with various network elements on the network 3400. Additionally, the client devices 3300A-B may execute a browser or application to enable interaction between the client devices 3300A-B and the system 3100 via the network 3400.

The system environment 31000 may also include the network 3400. In operation, one or more of the system 3100, the external system 3200 and the client devices 3300A-B may communicate with one or more of the other devices via the network 3400. The network 3400 may be a local area network (LAN), a wide area network (WAN), the Internet, a cellular network, a cable network, a satellite network, or other network that facilitates communication between, the system 3100, the external system 3200, the client devices 3300A-B and/or any other system, component, or device connected to the network 3400. The network 3400 may further include one, or any number, of the exemplary types of networks mentioned above operating as a stand-alone network or in cooperation with each other. For example, the network 3400 may utilize one or more protocols of one or more clients or servers to which they are communicatively coupled. The network 3400 may facilitate transmission of data according to a transmission protocol of any of the devices and/or systems in the network 3400. Although the network 3400 is depicted as a single network in the system environment 31000 of FIG. 10A, it should be appreciated that, in some examples, the network 3400 may include a plurality of interconnected networks as well.

In some examples, and as will be discussed further below, the system 3100 may, among other things, generate and implement quantitative indicators to measure and predict impact of creative qualities of content items. More specifically, system 3100 may gather information relating to a content item, determine one or more input values associated with the content item, and iteratively adjust a model utilizing the one or more input values to generate a quantitative indicator to measure and predict impact of creative qualities of the content item. Details of the system 3100 and its operation within the system environment 31000 will be described in more detail below.

As shown in FIGS. 10A-D, the system 3100 may include processor 3101 and the memory 3102. In some examples, the processor 3101 may execute the machine-readable instructions stored in the memory 3102. It should be appreciated that the processor 3101 may be a semiconductor-based microprocessor, a central processing unit (CPU), an application specific integrated circuit (ASIC), a field-programmable gate array (FPGA), and/or other suitable hardware device.

In some examples, the memory 3102 may have stored thereon machine-readable instructions (which may also be termed computer-readable instructions) that the processor 3101 may execute. The memory 3102 may be an electronic, magnetic, optical, or other physical storage device that contains or stores executable instructions. The memory 3102 may be, for example, Random Access memory (RAM), an Electrically Erasable Programmable Read-Only Memory (EEPROM), a storage device, an optical disc, or the like. The memory 3102, which may also be referred to as a computer-readable storage medium, may be a non-transitory machine-readable storage medium, where the term "non-transitory" does not encompass transitory propagating signals. It should be appreciated that the memory 3102 depicted in FIG. 10B may be provided as an example. Thus, the memory 3102 may or may not include additional features, and some of the features described herein may be removed and/or modified without departing from the scope of the memory 3102 outlined herein.

It should be appreciated that, and as described further below, the processing performed via the instructions on the memory 3102 may or may not be performed, in part or in total, with the aid of other information and data, such as information and data provided by the external system 3200 and/or the client devices 3300A-B. Moreover, and as described further below, it should be appreciated that the processing performed via the instructions on the memory 3102 may or may not be performed, in part or in total, with the aid of or in addition to processing provided by other devices, including for example, the external system 3200 and/or the client devices 3300A-B.

In some examples, the memory 3102 may store instructions, which when executed by the processor 3101, may cause the processor to: analyze 3103 aspects of a content item to identify one or more identifying aspects, analyze 3104 aspects associated with a content item to gather information relating to the content provider, and identify 3105 one or more associated content items and content distributor. In addition, the instructions, when executed by the processor 3101, may further cause the processor to predict 3106 a lift associated with a content item, determine 3107 a proxy metric, and implement 3108 a machine-learning (ML) model to determine an impact of a creative experience associated with a content item. Also, the instructions, when executed by the processor 3101, may still further cause the processor to generate 3109 a quantitative indicator for a creative qualities of a content item and determine 3110 an outcome prediction driven by creative.

In some examples, and as discussed further below, the instructions 3103-3110 on the memory 3102 may be executed alone or in combination by the processor 3101 to generate and implement quantitative indicators to measure and predict impact of creative qualities of content items. In some examples, the instructions 3103-3110 may be implemented in association with a content platform configured to provide content for users.

Additionally, although not depicted, it should be appreciated that to generate and implement quantitative indicators to measure and predict impact of creative qualities of content items, instructions 3103-3110 may be configured to utilize various artificial intelligence (AI) based machine learning (ML) tools. For instance, these AI-based machine learning (ML) tools may be used to generate models that may include a neural network, a generative adversarial network (GAN), a tree-based model, a Bayesian network, a support vector, clustering, a kernel method, a spline, a knowledge graph, or an ensemble of one or more of these and other techniques. It should also be appreciated that the system 3100 may provide other types of machine learning (ML) approaches, such as reinforcement learning, feature learning, anomaly detection, etc.

In some examples, the instructions 3103 may analyze aspects of the content item to identify one or more aspects. Examples content item aspects may include, for example, a type of platform on which the content item may be available, and a category or type of the content item. Other example aspects of the content item may include auction and/or bid information (e.g., type, amount, etc.), content item format (e.g. static, video, etc.), targeting method type, business region (associated with the content item), and content item delivery metrics. Examples of content item delivery metrics may include CPM (cost per thousand impressions) or view rates. As discussed below, these content item aspects may be used to generate and implement quantitative indicators to predict and measure impact of creative aspects of a content item.

In some examples, the instructions 3104 may gather information relating to a content provider associated with a content item. Example aspects of the content provider may include a business vertical or sub-vertical that the content provider may be operating in and a relative size of the content provider's operation (e.g., small or medium-sized business).

In some examples, the instructions 3105 may utilize aspects of a content item to identify one or more associated content items. Specifically, in some examples, the instructions 3105 may utilize information relating to the content item (e.g., as gathered via the instructions 3103) and information relating to the content provider (e.g., as gathered via the instructions 3104) to identify the one or more associated content items. In some examples, the one or more associated content items may relate to similar subject matter and may be from a similar category. In addition, upon identification of the one or more content items, the instructions 3105 may gather information relating to content distributors associated with the one or more associated content items identified.

In some examples, the instructions 3106 may predict a lift associated with a content item. In particular, in some examples, the instructions 106 may access and analyze information relating to the content item (e.g., as gathered via the instructions 3103), an associated content provider (e.g., as gathered via the instructions 3104), one or more associated content items and content providers associated with the associated content items (e.g., as gathered via the instructions 3105) to determine and access one or more lift studies associated with the content item.

As discussed above, in some examples, the lift studies accessed via the instructions 3106 may be directed to audience associations with a brand (i.e., "brand lift" or "brand polling"). In one example, the instructions 3106 may access and gather information from thousands of (historical) brand lift studies relating to the content item. Examples of the questions to audience members may include: 1) are audience members able to recall (seeing or hearing) a content item?, 2) did audience members like what they saw or heard in a content item? and 3) are audience members more aware of a brand after seeing a content item?

Also as discussed above, the instructions 3106 may analyze brand lift studies to determine difference(s) in performance between a test and holdout groups. As discussed above, the difference(s) may represent one or more "lifts" associated with a content item under test conditions. In addition, the instructions 106 may determine a difference in performance represented by a lift "percentage" and may be referred to as lift "attribution".

Upon determining lift attribution(s) associated with brand lift studies, the instructions 3106 may determine one or more aspects associated with higher lift attribution(s). As will be discussed below, results gathered from this analysis may be used to train a model associated with a content item to evaluate, enhance and predict lift for the content item. In addition, in some instances, the model may be used to determine one or more features and input values, which may be used to measure and predict performance associated with creative qualities of the content item. It should be appreciated that, to access and gather and analyze information from one or more brand lift studies, the instructions 3106 may be configured to incorporate artificial intelligence (AI), machine learning (ML) or deep learning techniques, as described above.

Also, in some examples, the instructions 3107 may determine a proxy metric. In some examples, the proxy metric may be utilized to measure a "fit" of a content item to a viewing user, and may be utilized as an estimate of creative experience for the content item. In some examples, the proxy metric determined via the instructions 3107 may be based on rankings of similar content items. The instructions 3107 may analyze instances of publishing for the content item, and utilize associated information (e.g., bidding information) to rank the content item. In some examples, the instructions 3107 may utilize an average to determine an "average rank" over a plurality of instances. In some examples, an average rank determined by the instructions 3107 used to determine a percentile for the content item. Also, in some examples, the instructions 3107 may utilize other metrics to approximate a creative experience, such as vertical ranks, relevance scores, user well-being scores, view rates and cost-per-thousand impressions (CPM).

It should be appreciated that while the proxy metric determined by the instructions 3107 may be an approximation of the content qualities associated with the content item, the proxy metric may only measure a relative quality instead of absolute quality. That is, a proxy metric for a content item may be based on such factors, such as content quality of competing content items or effectiveness of audience targeting. Accordingly, it should be appreciated that the proxy metric may not capture all aspects a user's creative experience.

In some examples, the instructions 3108 may implement a machine-learning (ML) model to measure and predict impact of creative qualities associated with a content item. In some examples, to implement the machine-learning (ML) model, the instructions 3108 may build and implement a machine-learning (ML) model to capture non-linear relationships for inputs and feature interactions, which may be used to determine creative qualities of a content item. In some examples, the machine-learning (ML) model may be built at a "content item level" and a "placement level".

In some examples, to implement the machine-learning (ML) model, the instructions 3108 may enable "training" of the machine-learning (ML) model based on results gathered from analysis of one or more brand lift studies (e.g., provided via the instructions 3106). So, in some examples, the instructions 3108 may enable the machine-learning (ML) model to be trained according to one or more input values derived. A first example input value to be selected may be an associated dataset. To determine the associated dataset, the instructions 3108 may utilize one or more filtering criteria, such as number of impressions, cost-per-thousand (CPM) impressions and number of daily bidding auctions completed for the content item. A second example input to be selected may be a time window. Also, in some examples, the selected time window may be for a particular time span (e.g., two months) or time period (e.g., calendar range). In some examples, the time window may be selected to include a number of use cases (i.e., studies) and/or a number of published content items.

In some examples, to implement the machine-learning (ML) model, the instructions 3108 may enable implementation of Gradient Boosting Decision Trees (GBDT). In some examples, to implement GBDT, the instructions 3108 may build one decision tree based on one or more contributory decision trees. To utilize GBDT, the instructions 3108 may also enable selection of one or more features, such as a view rate (e.g., a three-second view rate), a business region associated with the content item, a cost-per-thousand (CPM) impressions, a creative format frequency optimization placement and a targeting type uniform organic rank vertical. In addition to GBDT, the instructions 108 may utilize Generalized Linear Models (GLM) or Support Vector Machines (SVM) as well.

In some examples, the instructions 3109 may generate one or more quantitative indicators to measure and predict impact of creative qualities of a content item. It should be appreciated that, to generate one or more quantitative indicators, the instructions 3109 may be configured to incorporate artificial intelligence (AI), machine learning (ML) or deep learning techniques, as described above. In particular, in association with a machine-learning (ML) model (e.g., such as the machine-learning (ML) model built via the instructions 3108), the instructions 3109 may generate the one or more quantitative indicators to isolate and measure an impact of creative qualities of a content item on performance.

In some examples, to generate one or more quantitative indicators, the instructions 3109 may enable refining and validating of a machine-learning (ML) model. In some examples, the instructions 3109 may implement counterfactual simulation in order to simulate and determine an impact of creative content (i.e., the creative experience) for a content item. In some examples, the instructions 3109 may implement counterfactual simulation by controlling (e.g., removing, isolating, etc.) drivers, such as features and inputs, gathered via the instructions 3106, and observing changes in outcome. So, in some examples, the instructions 3109 may incrementally adjust a creative experience metric (e.g., by one-percent each instance), such as the proxy metric generated via the instructions 107, to determine a corresponding prediction and associated variation in predicted outcome. In some examples, upon refining and validating the machine-learning (ML) model, the instructions 3109 may generate a dataset of proxy metrics and corresponding predicted outcomes.

In some examples, the instructions 3109 may generate an association between a proxy metric and a brand attribution metric. That is, in some examples, the instructions 3109 may generate an association between a proxy metric (i.e., a rank or average rank) for a content item and a brand attribution lift metric for the content item to determine a relationship. In some instances, there may be a non-linear relationship between the proxy metric and the brand attribution lift metric for the content item. In particular, in some cases, the brand attribution lift metric may not increase proportionally with an increase in the proxy metric. Instead, those two metrics have a stepwise-function style relationship with multiple organic rank jump points.

Moreover, in some instances, the instructions 3109 may determine that while a proxy metric for a content item may be low, the content item may still have a brand attribution lift that may be higher. This may indicate that other aspects associated with the content item, such as objective, audience, or placement (as discussed above) may have stronger relationships with brand attribution "recall" lift than the proxy metric.

In some examples, the instructions 3109 may determine a potential lift metric. So, in one example, the instructions 3109 may determine a potential lift metric by a calculating a difference between a maximum lift from the corresponding predicted outcomes and a minimum lift from the corresponding predicted outcomes. So, in one example, if a maximum lift from the corresponding predicted outcomes may be twenty (20%) and the minimum lift from the corresponding predicted outcomes may be ten percent (10%), the difference (10%) may be the potential lift metric. In some examples, the potential lift metric may represent how much of a difference a creative experience may have on performance of the content item.

In some examples, the instructions 3109 may also determine a creative attribution metric. In some examples, the creative attribution metric may indicate a degree of utilization of a creative experience associated with a content item. More particularly, the creative attribution metric may indicate a degree to which a creative experience has been achieved. In some example, the creative attribution metric may be generated utilizing a lift value associated with a content item, a maximum lift achieved in an associated content item, and a minimum lift achieved in an associated content item. The creative attribute metric may be generated by dividing the value of a difference between a lift value associated with a content item and a minimum lift with a difference between a maximum lift and a minimum lift. So, in one example, a difference (8%) between a lift value associated with a content item (18%) and a minimum lift (10%) may be divided by a difference (10%) between maximum lift (20%) and a minimum lift (10%) to reveal a creative attribution metric of 80%.

In some examples, the instructions 3110 may utilize one or more quantitative metrics to generate an outcome prediction and a recommendation for a content item. In one example, if a potential lift metric may be "high" (e.g., 10%) and a creative attribute metric for a content item may be "low" (e.g., 35%), this may indicate that the content item has room to improve, in that an improvement in creative may have a significant impact on performance. Accordingly, the instructions may be configured to provide a prediction that the performance of the content item may not be so successful, and may recommend that the content item may present a primary opportunity for improvement.

Figure 11A:
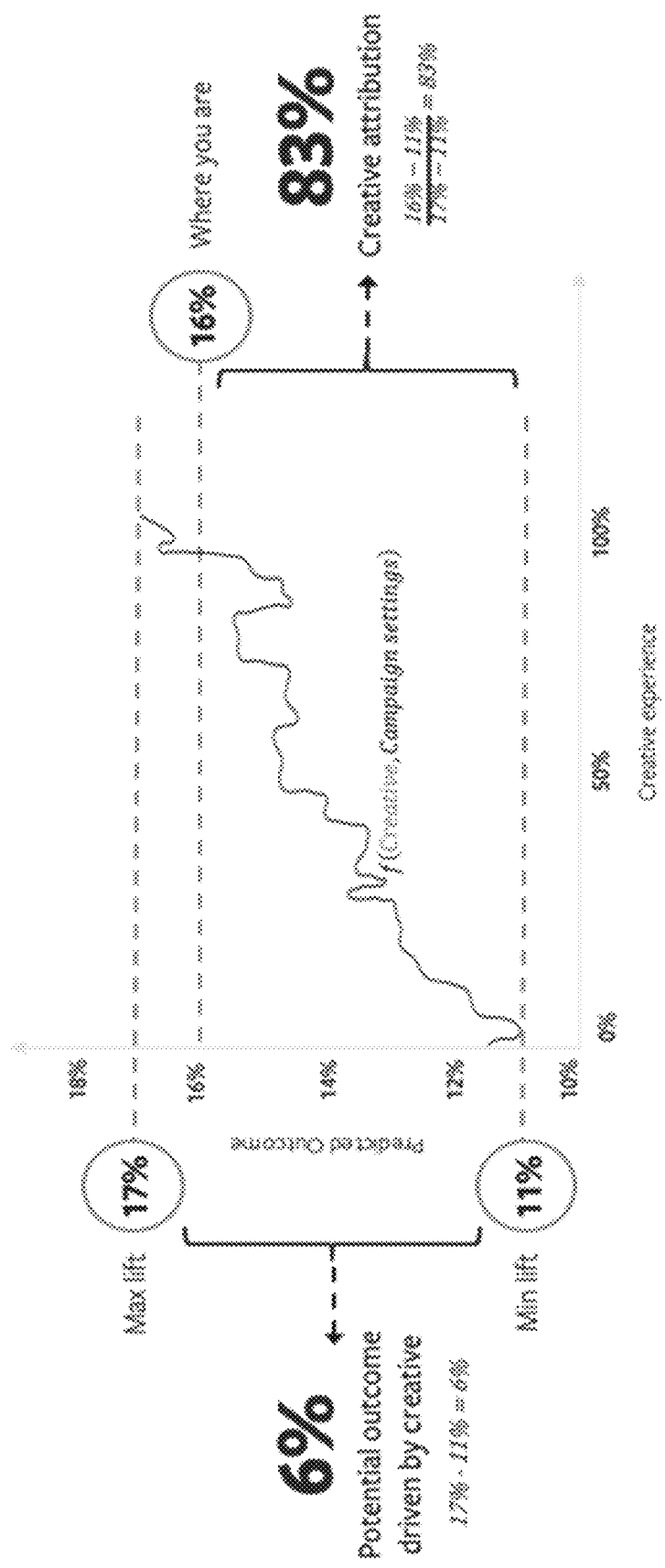
FIG. 11A illustrates a chart associated with generating and implementing quantitative indicators to measure and predict impact of creative qualities of content items, according to an example.

FIG. 11A illustrates a chart associated with generating and implementing quantitative indicators to measure and predict impact of creative qualities of content items, according to an example. More specifically, FIG. 11A illustrates an example of a relationship between creative experience metric and outcome prediction. As shown in FIG. 11A, a minimum outcome is shown to be 11% and a maximum outcome is shown to be 17%, and further shows a potential lift outcome metric (driven by creative) may be the difference between the maximum and minimum, for a potential lift outcome metric of 6%. Furthermore, as discussed above, a creative attribute metric may be generated by dividing the value of a difference between a potential lift outcome metric associated with a content item and a minimum lift with a difference between a maximum lift and a minimum lift. So, in the example in FIG. 11A, the value of a difference (5%) between a lift value associated with a content item (16%) and a minimum lift (11%) may be divided a difference (6%) between maximum lift (17%) and a minimum lift (11%), for a creative attribution metric of 83%.

Figure 11B:
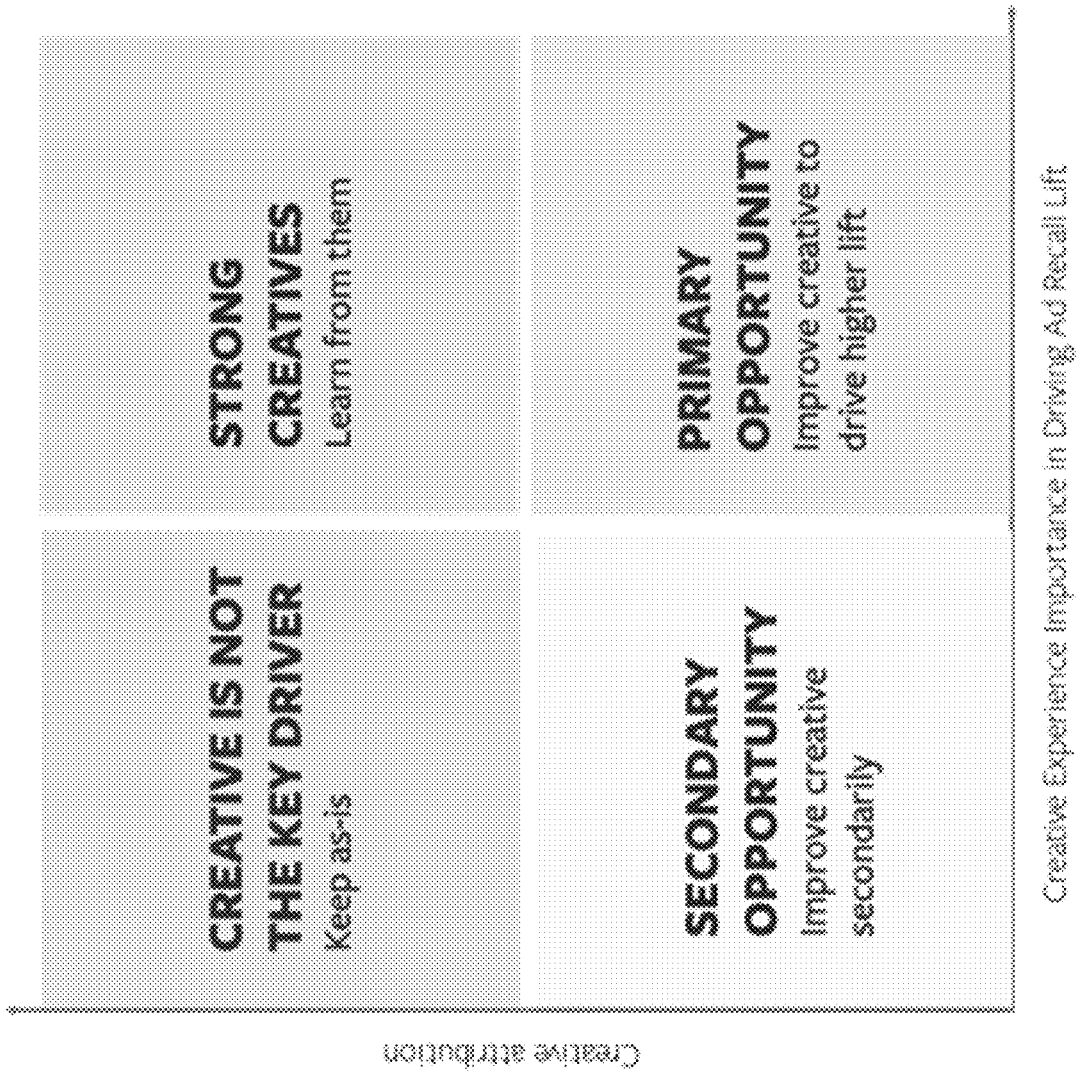
FIG. 11B illustrates a chart associated with generating and implementing quantitative indicators to measure and predict impact of creative qualities of content items, according to an example.

As discussed above, in some examples, a potential lift attribution metric and a creative attribution metric may be utilized to generate outcome recommendations. FIG. 11B illustrates a chart associated with generating and implementing quantitative indicators to measure and predict impact of creative qualities of content items, according to an example. More specifically, FIG. 11B illustrates a chart that may operate as a measurable "window" to indicate an impact that creative can have on performance of a content item, and how much of that impact may currently be being achieved or may be gained by improving the creative. In this example, the x-axis may be represented by a creative experience importance in driving lift (i.e., a potential lift outcome metric), while the y-axis may be represented by creative attribution (i.e., a creative attribution metric), thereby providing a quadrant-based analysis system for categorizing creatives of interest.

In the example shown in FIG. 11B, if the creative experience metric and the creative attribute metric for a content item may be "high", this may indicate that the content item is in a content environment where creative may have a significant impact on performance of a content item and the content item may be achieving a substantial portion of the possible impact. Content items in this category may be regarded as "strong creative(s)", and may be instructive in design of other creatives. In this example, if the creative experience metric may be "low" and the creative attribute metric for a content item may be "high", this may indicate that the content item has maximized the potential impact of creative and should be kept as-is. Content items in this category may be regarded as "creative is not the key driver". In this example, if the creative experience metric may be "high" and the creative attribute metric for a content item may be "low", this may indicate that the content item has room to improve, in that an improvement in creative may have a significant impact on performance. Content items in this category may be regarded as a "primary opportunity (to improve creative)". Finally, if the creative experience metric may be "low" and the creative attribute metric for a content item may be "low", this may indicate that while the content item has room to improve, an improvement in creative may not have a significant impact on performance. Content items in this category may be regarded as a "secondary opportunity (to improve creative)".

Figure 11C:
FIG. 11C illustrates a chart associated with generating and implementing quantitative indicators to measure and predict impact of creative qualities of content items, according to an example.

FIG. 11C illustrates a chart that may indicate aspect of content items with various quantitative indicators metric (also referred to as "Gamma signal") and average content item rank values. In the example, shown in FIG. 11C, a content item with a high quantitative indicator metric and a high organic rank may be feed-optimized, short and clearly indicate brand and product info. Also, a content item with a high quantitative indicator metric and a low organic rank may be feed-optimized, short and may provide interesting content, but may not include a lot of product info. A content item with low quantitative indicator metric and a high organic rank may utilize a photo/post format and may usually be optimized for engagement/conversation. Furthermore, a content item with a low quantitative indicator metric and a low organic rank may look like a photo with text animation and may be "busy" (i.e., crowded).

Figure 12:
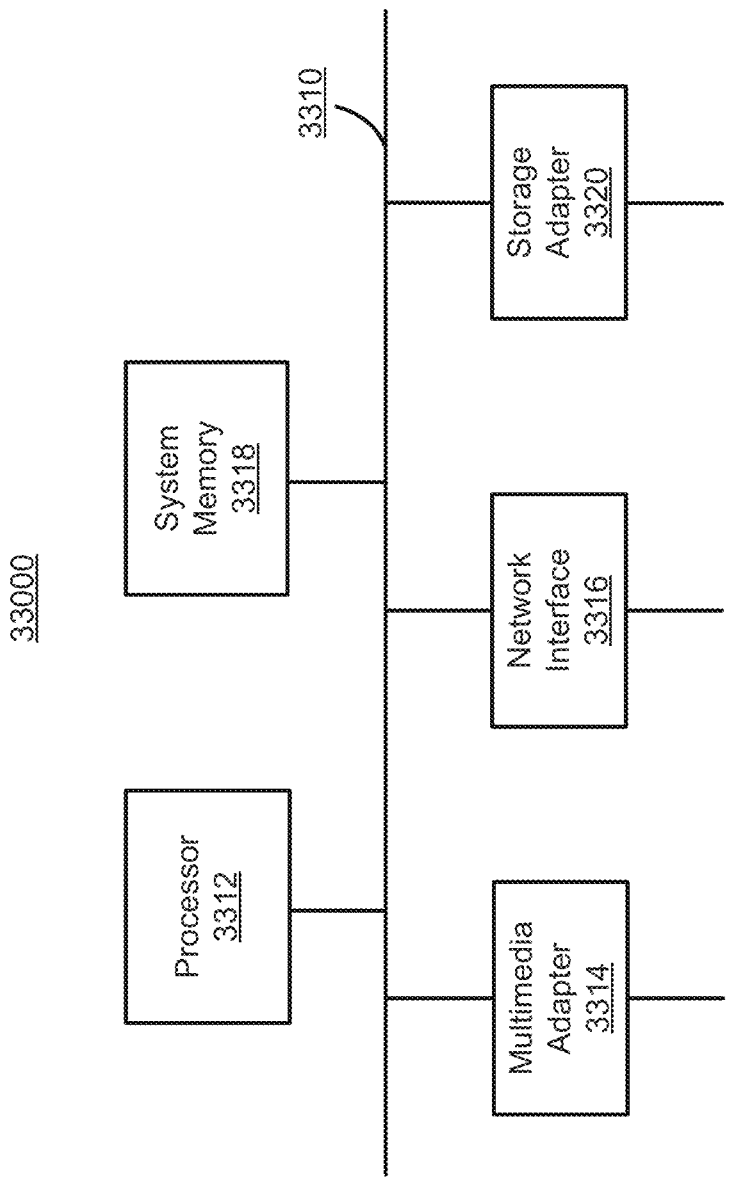
FIG. 12 illustrates a block diagram of a computer system to generate and implement quantitative indicators to measure and predict impact of creative qualities of content items, according to an example.

FIG. 12 illustrates a block diagram of a computer system 33000 to generate and implement quantitative indicators to measure and predict impact of creative qualities of content items, according to an example. In some examples, the computer system 33000 may be associated the system 33100 to perform the functions and features described herein. The computer system 33000 may include, among other things, an interconnect 3310, a processor 3312, a multimedia adapter 3314, a network interface 3316, a system memory 3318, and a storage adapter 3320.

The interconnect 3310 may interconnect various subsystems, elements, and/or components of the computer system 300. As shown, the interconnect 3310 may be an abstraction that may represent any one or more separate physical buses, point-to-point connections, or both, connected by appropriate bridges, adapters, or controllers. In some examples, the interconnect 3310 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 3310 may allow data communication between the processor 3312 and system memory 3318, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 3312 may be the central processing unit (CPU) of the computing device and may control overall operation of the computing device. In some examples, the processor 3312 may accomplish this by executing software or firmware stored in system memory 3318 or other data via the storage adapter 3320. The processor 3312 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 3314 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 3316 may provide the computing device with an ability to communicate with a variety of remote devices over a network (e.g., network 3400 of FIG. 10A) and may include, for example, an Ethernet adapter, a Fibre Channel adapter, and/or other wired- or wireless-enabled adapter. The network interface 3316 may provide a direct or indirect connection from one network element to another, and facilitate communication and between various network elements.

The storage adapter 3320 may connect to a standard computer-readable medium for storage and/or retrieval of information, such as a fixed disk drive (internal or external).

Many other devices, components, elements, or subsystems (not shown) may be connected in a similar manner to the interconnect 3310 or via a network (e.g., network 3400 of FIG. 10A). Conversely, all of the devices shown in FIG. 12 need not be present to practice the present disclosure. The devices and subsystems can be interconnected in different ways from that shown in FIG. 12. Code to implement the dynamic approaches for payment gateway selection and payment transaction processing of the present disclosure may be stored in computer-readable storage media such as one or more of system memory 3318 or other storage. Code to implement the dynamic approaches for payment gateway selection and payment transaction processing of the present disclosure may also be received via one or more interfaces and stored in memory. The operating system provided on computer system 33000 may be MS-DOS, MS-WINDOWS, OS/2, OS X, IOS, ANDROID, UNIX, Linux, or another operating system.

Figure 13:
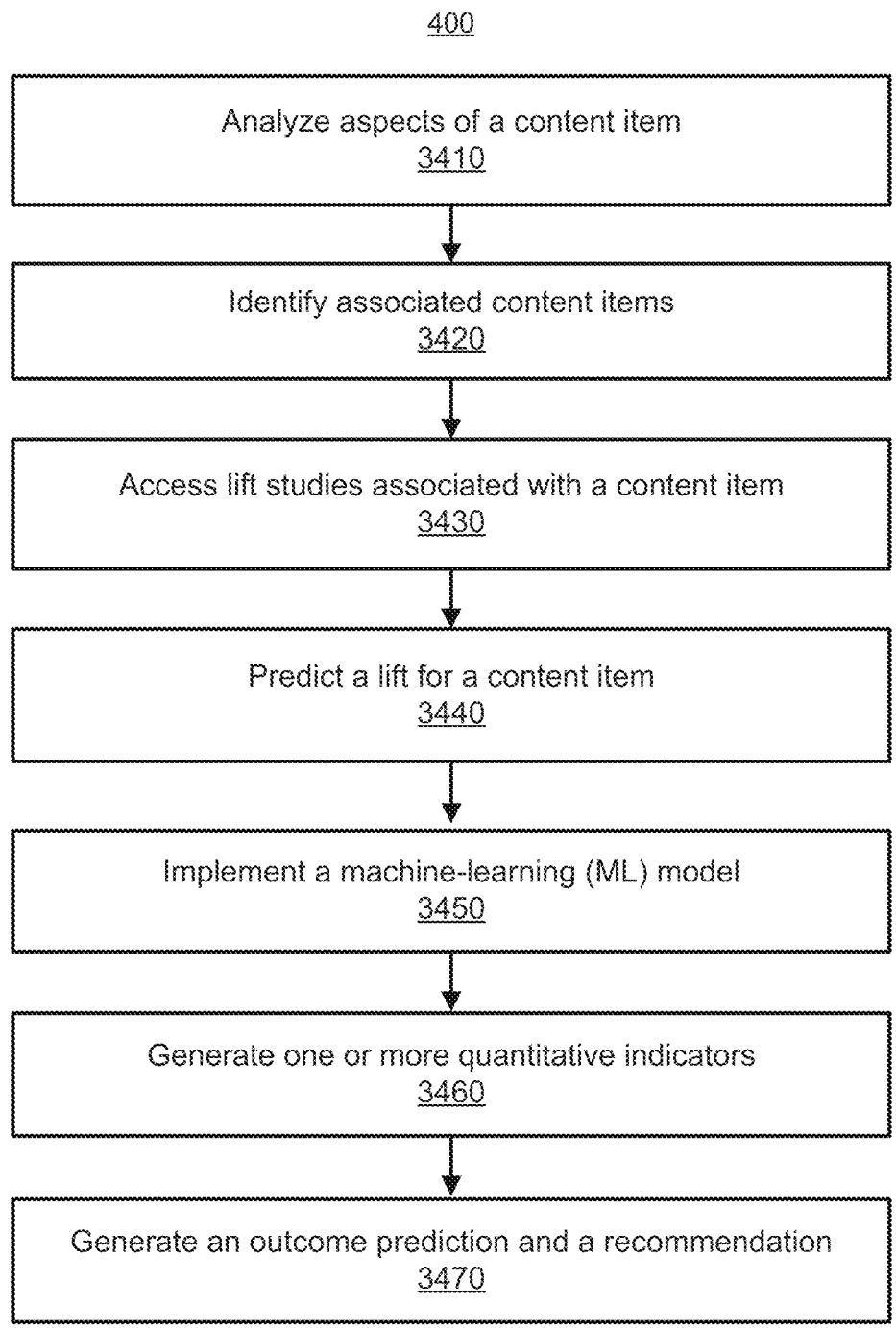
FIG. 13 illustrates a method for generate and implement quantitative indicators to measure and predict impact of creative qualities of content items, according to an example.

FIG. 13 illustrates a method 3400 for generating and implementing quantitative indicators to measure and predict impact of creative qualities of content items, according to an example. The method 3400 illustrated in FIG. 13 is provided by way of example, as there may be a variety of ways to carry out the method described herein. Each block shown in FIG. 13 may further represent one or more processes, methods, or subroutines, and one or more of the blocks may include machine-readable instructions stored on a non-transitory computer-readable medium and executed by a processor or other type of processing circuit to perform one or more operations described herein.

Although the method 3400 is primarily described as being performed by system 3100 as shown in FIGS. 10A-B, the method 3400 may be executed or otherwise performed by other systems, or a combination of systems. It should be appreciated that, in some examples, the method 3400 may be configured to incorporate artificial intelligence (AI) or deep learning techniques, as described above.

At 3410, the processor 3101 may analyze aspects of a content item to identify an associated content provider and one or more identifying aspects. Examples content item aspects may include, for example, a type of platform on which the content item may be available and a category or type of the content item. Example aspects of the content provider may include a business vertical or sub-vertical that the content provider may be operating in and a relative size of the content provider's operation (e.g., small or medium-sized business).

At 3420, the processor 3101 may utilize aspects of a content item to identify one or more associated content items. In some examples, the one or more associated content items may relate to similar subject matter and may be from a similar category. In addition, upon identification of the one or more content items, the processor 3101 may determine and gather information relating to one or more content distributors associated with the one or more associated content items.

At 3430, the processor 3101 may access one or more lift studies associated with a content item. As discussed above, in some examples, the processor may access thousands of (historical) brand lift studies directed to audience associations with a brand.

At 3440, the processor 3101 may predict a lift for a content item. In some examples, the predicted lift may be represented by a lift "percentage" or lift "attribute". In some examples, the processor 3101 may train a model associated with the content item based on one or more brand lift studies associated with the content item, such as the brand lift studies gathered at 3430.

At 3450, the processor 3101 may implement a machine-learning (ML) model to measure and predict impact of creative experience associated with a content item. In some examples, to implement the machine-learning (ML) model, the processor 3101 may build and implement a model to capture non-linear relationships for inputs and feature interactions, which may be utilized to determine a creative qualities of a content item. In some examples, to implement the machine-learning (ML) model, the processor 3101 may enable implementation of Gradient Boosting Decision Trees (GBDT).

At 3460, the processor 3101 may generate one or more quantitative indicators to measure and predict impact of creative qualities of a content item. In some examples, the processor 3101 may determine a potential lift metric and a creative attribution metric.

At 3470, the processor 3101 may utilize one or more quantitative metrics, such as a potential lift metric and a creative attribution metric, to generate an outcome prediction and a recommendation for a content item.

By utilizing artificial intelligence (AI) based techniques and mechanisms to generate and implement quantitative indicators for creative qualities of content items as described herein, the systems and methods described herein may provide a signal indicator that may, based on large sample sizes, measure creative performance identify creatively high-performing content items and may indicate area for improvement in low-performing content items at scale. Furthermore, the systems and methods may enable identification of optimal and/or effective creative considerations and approaches (i.e., "best practices").

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 3100, the external system 3200, and the client devices 3300 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 3100, the external system 3200, and the client devices 3300, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 3100, the external system 3200, and the client devices 3300, or shared with other systems. Although this disclosure describes using particular privacy settings in a particular manner, this disclosure contemplates using any suitable privacy settings in any suitable manner.

In particular examples, the system 3100, the external system 3200, and the client devices 3300 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 3100, the external system 3200, and the client devices 3300 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 3100, the external system 3200, and the client devices 3300 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 3100, the external system 3200, and the client devices 3300 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 3100, the external system 3200, and the client devices 3300 may access such information in order to provide a particular function or service to the first user, without the system 3100, the external system 3200, and the client devices 3300 having access to that information for any other purposes. Before accessing, storing, or using such objects or information, the system 3100, the external system 3200, and the client devices 3300 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 3100, the external system 3200, and the client devices 3300.

In particular examples, a user may specify whether particular types of objects or information associated with the first user may be accessed, stored, or used by the system 3100, the external system 3200, and the client devices 3300.

As an example and not by way of limitation, the first user may specify that images sent by the first user through the system 3100, the external system 3200, and the client devices 3300 may not be stored by the system 3100, the external system 3200, and the client devices 3300. As another example and not by way of limitation, a first user may specify that messages sent from the first user to a particular second user may not be stored by the system 3100, the external system 3200, and the client devices 3300. As yet another example and not by way of limitation, a first user may specify that all objects sent via a particular application may be saved by the system 3100, the external system 3200, and the client devices 3300.

In particular examples, privacy settings may allow a first user to specify whether particular objects or information associated with the first user may be accessed from the system 3100, the external system 3200, and the client devices 3300. The privacy settings may allow the first user to opt in or opt out of having objects or information accessed from a particular device (e.g., the phone book on a user's smart phone), from a particular application (e.g., a messaging app), or from a particular system (e.g., an email server). The system 3100, the external system 3200, and the client devices 3300 may provide default privacy settings with respect to each device, system, or application, and/or the first user may be prompted to specify a particular privacy setting for each context. As an example and not by way of limitation, the first user may utilize a location-services feature of the system 3100, the external system 3200, and the client devices 3300 to provide recommendations for restaurants or other places in proximity to the user. The first user's default privacy settings may specify that the system 3100, the external system 3200, and the client devices 3300 may use location information provided from one of the client devices 3300 of the first user to provide the location-based services, but that the system 3100, the external system 3200, and the client devices 3300 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 3100, the external system 3200, and the client devices 3300 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 3100, the external system 3200, and the client devices 3300 may use a user's previous activities and calculated moods, emotions, or sentiments to determine a present mood, emotion, or sentiment. A user who wishes to enable this functionality may indicate in their privacy settings that they opt in to the system 3100, the external system 3200, and the client devices 3300 receiving the inputs necessary to determine the mood, emotion, or sentiment. As an example and not by way of limitation, the system 3100, the external system 3200, and the client devices 3300 may determine that a default privacy setting is to not receive any information necessary for determining mood, emotion, or sentiment until there is an express indication from a user that the system 3100, the external system 3200, and the client devices 3300 may do so. By contrast, if a user does not opt in to the system 3100, the external system 3200, and the client devices 3300 receiving these inputs (or affirmatively opts out of the system 3100, the external system 3200, and the client devices 3300 receiving these inputs), the system 3100, the external system 3200, and the client devices 3300 may be prevented from receiving, collecting, logging, or storing these inputs or any information associated with these inputs. In particular examples, the system 3100, the external system 3200, and the client devices 3300 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 3100, the external system 3200, and the client devices 3300 may use the user's mood, emotion, or sentiment to provide newsfeed items, pages, friends, or advertisements to a user. The user may specify in their privacy settings that the system 3100, the external system 3200, and the client devices 3300 may determine the user's mood, emotion, or sentiment. The user may then be asked to provide additional privacy settings to indicate the purposes for which the user's mood, emotion, or sentiment may be used. The user may indicate that the system 3100, the external system 3200, and the client devices 3300 may use his or her mood, emotion, or sentiment to provide newsfeed content and recommend pages, but not for recommending friends or advertisements. The system 3100, the external system 3200, and the client devices 3300 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 3100, the external system 3200, and the client devices 3300 may be restricted in its access, storage, or use of the objects or information. The system 3100, the external system 3200, and the client devices 3300 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 3100, the external system 3200, and the client devices 3300 may temporarily store the message in a content data store until the second user has viewed or downloaded the message, at which point the system 3100, the external system 3200, and the client devices 3300 may delete the message from the data store. As another example and not by way of limitation, continuing with the prior example, the message may be stored for a specified period of time (e.g., 2 weeks), after which point the system 3100, the external system 3200, and the client devices 3300 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 3100, the external system 3200, and the client devices 3300 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 3100, the external system 3200, and the client devices 3300. The user's privacy settings may specify that such information may be used only for particular processes, such as authentication, and further specify that such information may not be shared with any external system or used for other processes or applications associated with the system 3100, the external system 3200, and the client devices 3300. As another example and not by way of limitation, the system 3100, the external system 3200, and the client devices 3300 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the system 3100, the external system 3200, and the client devices 3300. As another example and not by way of limitation, the system 3100, the external system 3200, and the client devices 3300 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 3100, the external system 3200, and the client devices 3300.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 3100, the external system 3200, and the client devices 3300 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 3100, the external system 3200, and the client devices 3300 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 3100, the external system 3200, and the client devices 3300 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 3100, the external system 3200, and the client devices 3300 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"). However, if the user changes his or her relationship status, the system 3100, the external system 3200, and the client devices 3300 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 3100, the external system 3200, and the client devices 3300 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 3100, the external system 3200, and the client devices 3300 may send a reminder to the user to confirm his or her privacy settings every six months or after every ten photo posts. In particular examples, privacy settings may also allow users to control access to the objects or information on a per-request basis. As an example and not by way of limitation, the system 3100, the external system 3200, and the client devices 3300 may notify the user whenever an external system attempts to access information associated with the user, and require the user to provide verification that access should be allowed before proceeding.

Page posts are generally used for rendering content previews such as advertisement previews of an unpublished ad. On some social media platforms, an advertisement may be created as any other post except that the advertisement post may include some additional metadata. Once the advertisement is generated and stored, it may be served to users based on relevance at opportune moments. However, during the content generation process, the user creating the content item may want to preview the content item at different instances as the user adds or removes content components. For example, the user may make major changes such as changing the image shown in the content item or the user may also make minor changes such as correcting a typo. However, each time the user makes a change be it a major change or a minor change, the user may have to wait for a considerable time for the content item preview to be displayed. For example, video or carousel advertisements may average 3-4 seconds while "simple" link advertisements may time at 1.5-2 seconds. Changing even one letter in a field may result in a blank screen lasting multiple seconds. This is because, each time a change is made to an existing page post corresponding to the content item, a new page post may be created. Such delays may lead to a bad user experience as the time taken to accomplish a task is increased due to machine delays in creating the page posts afresh. Different solutions are proposed herein to reduce the delays and speed up the content creation and preview process.

One reason for the delays in generating content previews may include the multiple trips that the server hosting the content item may make to data storage storing the content item during the content item creation and preview process. For example, if the content item is stored on a storage device such as an external memory, even a minor change such as amending the tag of the content item, may require the server processor to access the storage device to retrieve the content item, update the retrieved content item and to then provide a preview of the amended content item. Hence, one solution for speeding up the content item generation and preview process includes storing the content item to a cache of the server until the content item is finalized. Therefore, each time the user edits the content item during the content item generation process the intermediate form of the content item which was cached may be retrieved thereby mitigating the need for the processor to access the data store and hence speeding up the content item preview generation by several seconds. Caching posts, therefore, helps in reducing the page post creation time by around 40%.

Another improvement for the content item preview generation process may include using "template" posts. A template post may not contain actual assets to be rendered or content item components such as images, videos texts, links, etc. However, the assets to be rendered may be "planted" on top of the post at rendering time. The assets to be rendered for a particular advertisement may be specified in a "creative spec". Since the template post does not contain any data that is specific to a content item, it may be reused again and again to render different previews. The creative data or the content item components can be "planted" at rendering time thereby mitigating the need to create a post on every preview request.

Generating a preview from the template post may involve more than a simple substitution of the template post into the preview generation process without the template post as there are likely to be inconsistencies between the two forms of previews. Moreover, any code changes to the content item creation may introduce new inconsistencies. For example, tall images may be cropped on post creation. Hence, before launching the new preview stack with the template post, the existing inconsistencies need to be fixed while new inconsistencies need to be detected as soon as they are introduced into the preview generation process. A comparison framework may be built as detailed herein that can run both previews on samples of production data and raise an alert if the average different percentage suddenly spikes for a given creative type/content item format.

A further problem exists in the page post creation process wherein any changes to an existing content item such as an existing advertising page post may result in the creation of a new page post or a new content item. Even minor edits such as correction of typos may result in the new content item creation. If the previous content item contained feedback data such as likes, comments, and other reactions from users, they will not be visible on the new content item. In the case of content items such as advertisements, the older advertisements may be withdrawn to be replaced with the newer advertisements, the feedback data may therefore be completely lost. Such loss of data may negatively impact the engagement value of the edited advertisement and thereby affect the advertisement's performance.

The solution to mitigate the loss of data that occurs on editing content items such as advertisements may include creating a connection between the old and the new content items associated with the original and edited creatives as detailed infra. The new content item may fetch and store all comments and reactions on the old one, so they both "mirror" the likes and comments of each other.

Figure 14A:
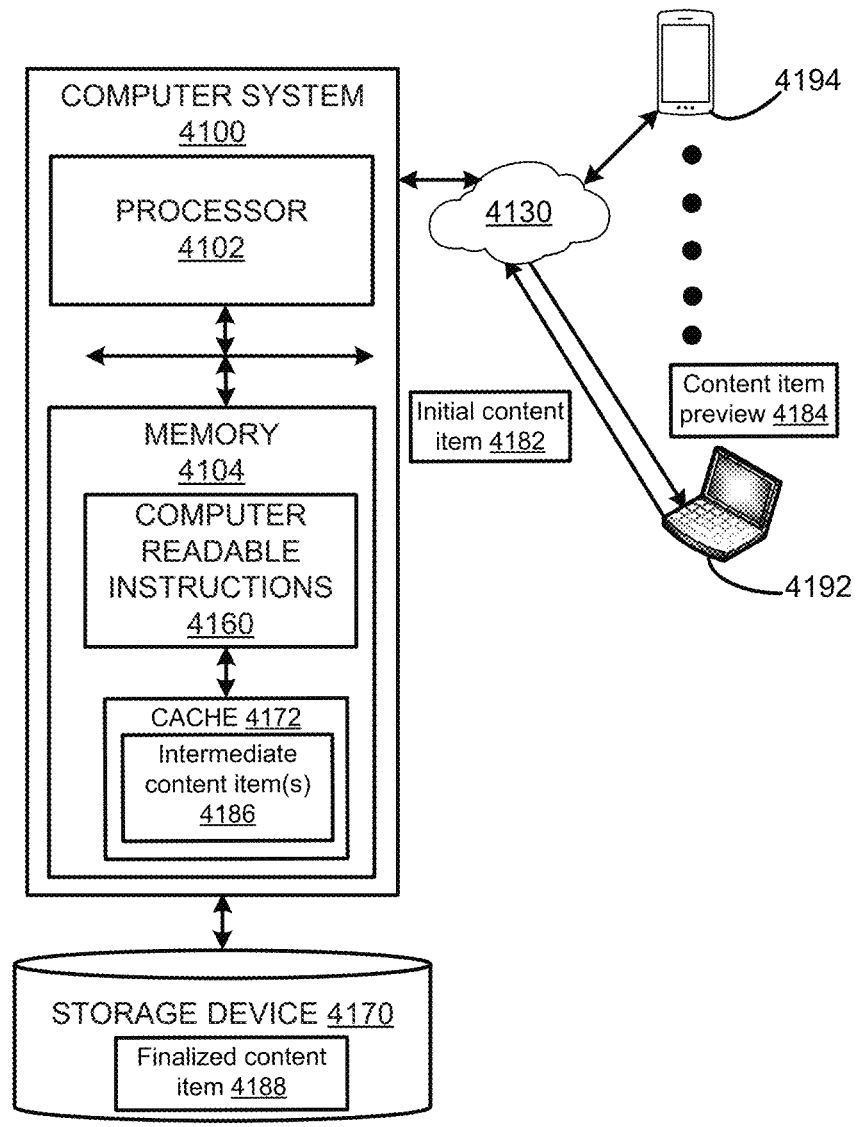
FIG. 14A illustrates a block diagram of a computer system used for the creation and presentation of content item previews, according to an example.
Figure 14B:
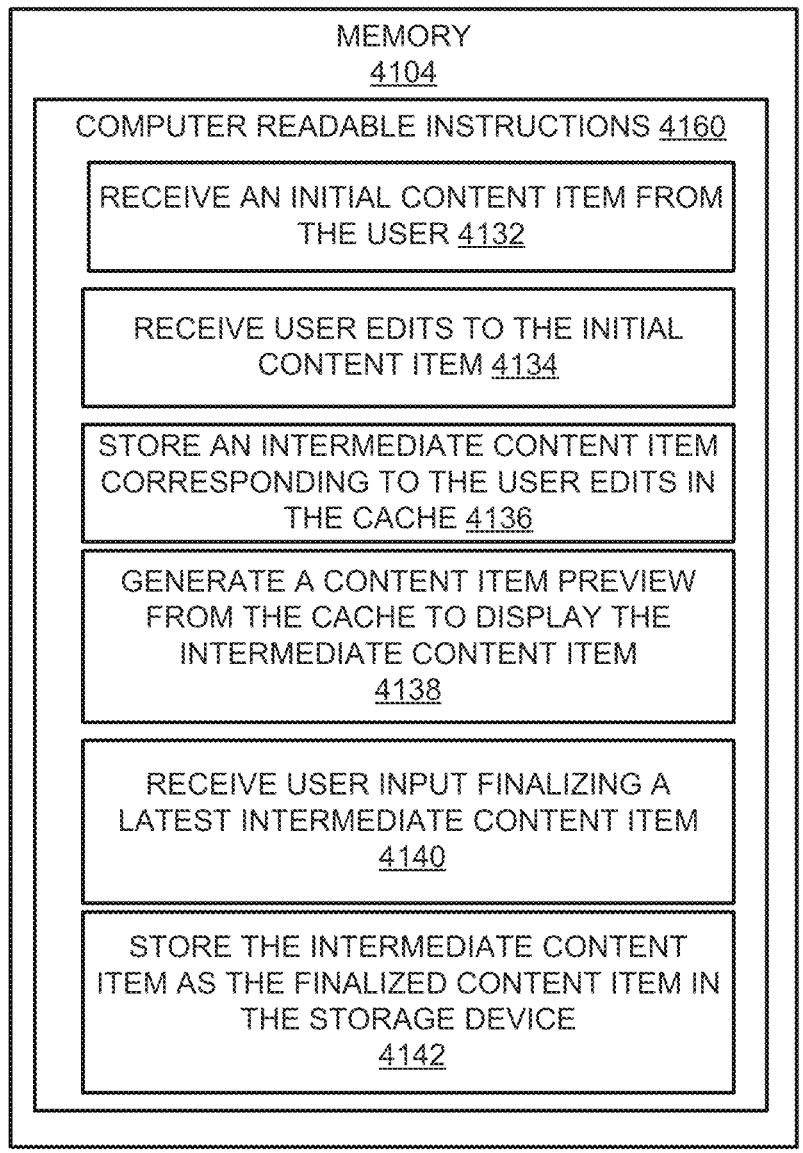
FIG. 14B illustrates a block diagram of a memory included in the computer system used for the creation and presentation of content item previews, according to an example.

Reference is now made with respect to FIGS. 14A-14B which illustrate a block diagram of a computer system 4100 and a memory 4104 included therein that is used for the creation and presentation of content item previews such as page posts, according to an example. As shown in FIG. 14A the computer system 4100 may include a processor 4102 and a memory 4104. FIG. 14B illustrates a block diagram of the memory 4104 including computer-readable instructions 4160, that when executed by the processor 4102 may be configured to provide for a series of optimizations for the performance of a social media website in speeding up the process of posting content such as advertisements on the social media platform according to an example. The computer system 4100 may be connected to a multitude of user communication devices which may be electronic or computing devices configured to transmit and/or receive data (e.g., advertisements via a social media application), and in one example, the user communication devices 4192, 4194 . . . , etc., may include a smartphone, a laptop, a smartwatch, etc.

The computer system 4100 can communicate with the user communication devices 4192, 4194, . . . etc., via a network 4130 that can be a local area network (LAN), a wide area network (WAN), the Internet, a cellular network, a cable network, a satellite network, or another network. Network 4130 may further include one, or any number, of the exemplary types of networks mentioned above operating as a stand-alone network or in cooperation with each other. For example, the network 4130 may utilize one or more protocols of one or more clients or servers to which they are communicatively coupled. Network 4130 may facilitate the transmission of data according to a transmission protocol of any of the devices and/or systems in the network 4130. Although network 4130 is depicted as a single network, it should be appreciated that, in some examples, the network 4130 may include a plurality of interconnected networks as well.

It should be appreciated that the systems and subsystems shown and described herein, may include one or more servers or computing devices. Each of these servers or computing devices may further include a platform and at least one application. An application may include software (e.g., machine-readable instructions) stored on a non-transitory computer-readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the computer system 4100 or the system environment including the computer system 4100, and the user communication devices 4192, 4194, . . . etc.

The computer system 4100 may further include the storage device 4170. In one example, the storage device 4170 may include any number of servers, hosts, systems, and/or databases that store data to be accessed by the computer system 4100 or other systems (not shown) that may be communicatively coupled thereto. Also, in one example, the servers, hosts, systems, and/or databases of the storage device 4170 may include one or more storage mediums storing any data, and may be utilized to store information (e.g., user information, demographic information, preference information, etc.) relating to users of a social media application facilitating the generation and display of content to a plurality of users.

The processor 4102 in the computer system 4100 accesses the computer-readable instructions 4160 from the memory 4104 to execute various processes that enable the optimizing content generation and preview processes as described herein. In one example, the memory 4104 may have stored thereon machine-readable instructions (which may also be termed computer-readable instructions) that the processor 4102 may execute. The memory 4104 may be an electronic, magnetic, optical, or another physical storage device that contains or stores executable instructions. The memory 4104 may be, for example, Random Access Memory (RAM), an Electrically Erasable Programmable Read-Only Memory (EEPROM), a storage device, an optical disc, or the like. The memory 4104, which may also be referred to as a computer-readable storage medium, maybe a non-transitory machine-readable storage medium, where the term "non-transitory" does not encompass transitory propagating signals.

In an example, the memory 4104 can include a cache 4172 which may be used to store content. As the cache 4172 forms a part of the computer system 4100, storage, and retrieval of content from the cache 4172 can be much faster than storage and retrieval of content from the storage device 4170.

More particularly, the processor 4102 may execute instructions 4132 to receive an initial content item 4182 such as an initial page post. For example, the initial content item 4182 may pertain to an advertisement on a social media platform. The initial content item 4182 can include one or more text, images, video, audio clips, links, etc.

As the user who generates or creates the post, edits the initial content item 4182, the processor 4102 may execute instructions 4134 to receive user edits to the initial content item 4182 to generate an intermediate content item such as intermediate content item 4186. In an example, if the user has already made one or more edits to the initial content item 4182, then further edits may be received by the processor 4102 on executing the instructions 4134 to make changes to a prior intermediate page post to generate a new intermediate page post. The user may edit or change one or more of the links, text, image, video, etc. included in the initial content item 4182. In an example, the user may include additional matter in the initial content item 4182 which was not previously included to generate the intermediate content item 4186. In an example, the user may delete material included in the initial content item 4182 to generate the intermediate content item 4186.

The processor 4102 may execute instructions 4136 to store the intermediate content item 4186 corresponding to the latest change made by the user. The processor 4102 stores the intermediate content item 4186 to the cache 4172 onboard the memory 4104.

The processor 4102 may execute instructions 4138 to generate a content item preview 4184 to display the intermediate content item 4186 or the intermediate page post to the user on a display of the user communication device 4192. Even minor edits such as changes to text or links can cause the computer system 4100 to generate the content item preview 4184 to reflect the changes. In an example, the intermediate content item 4186 that reflects the latest changes made by the user in the current editing session may be stored in the cache 4172. As the user continues to edit the page post, the processor 4102 may iteratively execute the instructions 4134 to receive user edits, the instructions 136 to store each new intermediate post corresponding to each of the edits in the cache 4172, and the instructions 4138 to provide for a display to the user, the content item preview 4184 generated based on the intermediate content item 4186 from the cache 4172 on the user communication device 4192.

After the user is satisfied with the edits, the processor 4102 may execute instructions 4140 to receive user input that finalizes the latest intermediate content item 4186/intermediate page post. The user input to finalize an intermediate page post may be received explicitly via a user gesture, e.g., clicking a button, or maybe received intrinsically when the user does not provide any further edits to a current intermediate page post for a predetermined length of time.

When the user input finalizing the intermediate content item 4186/page post is received, the processor 4102 may execute instructions 4142 to upload the current intermediate page post to the storage device 4170 as the finalized content item 4188 or a finalized page post or the finalized advertisement which may be displayed to viewers on the social media platform.

Figure 15A:
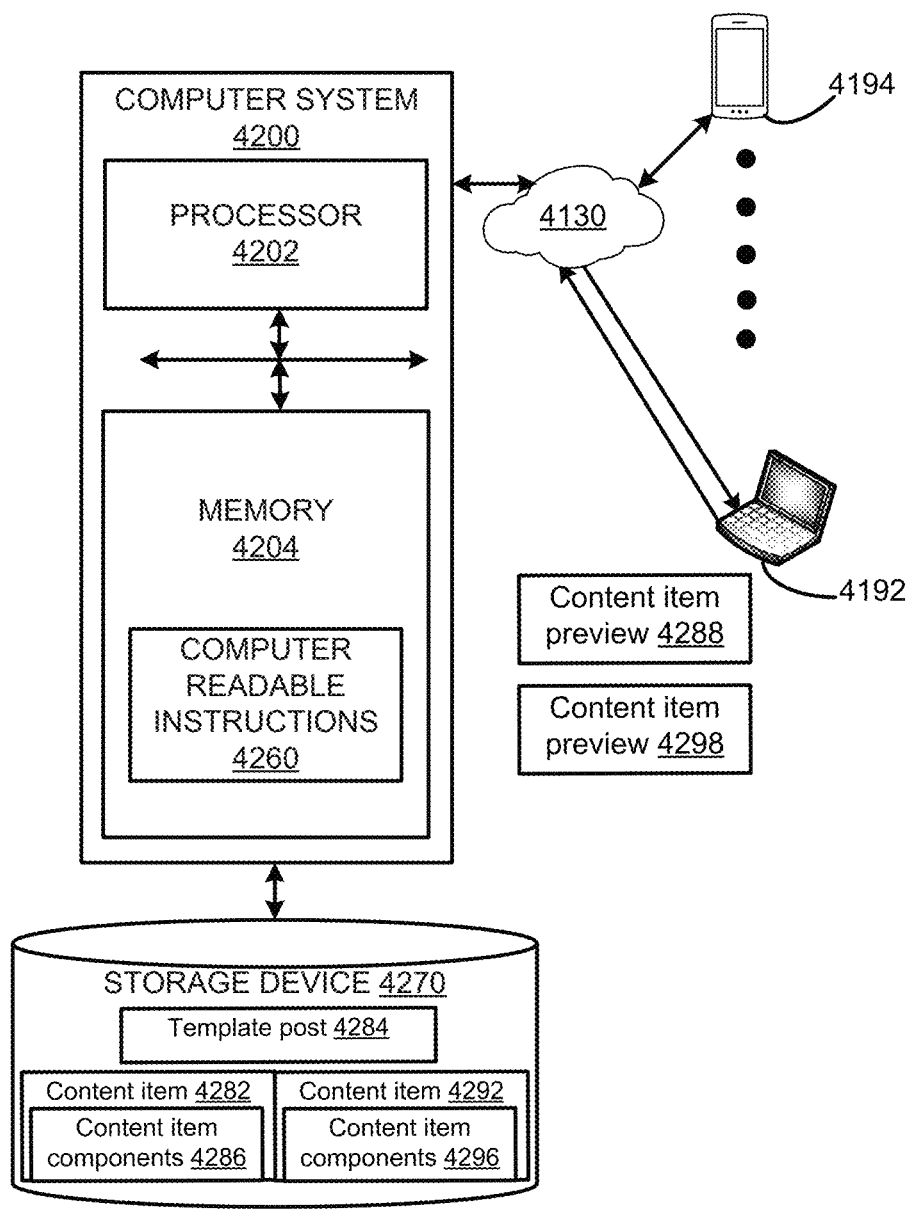
FIG. 15A illustrates a block diagram of a computer system used for the creation and presentation of content items, according to an example.
Figure 15B:
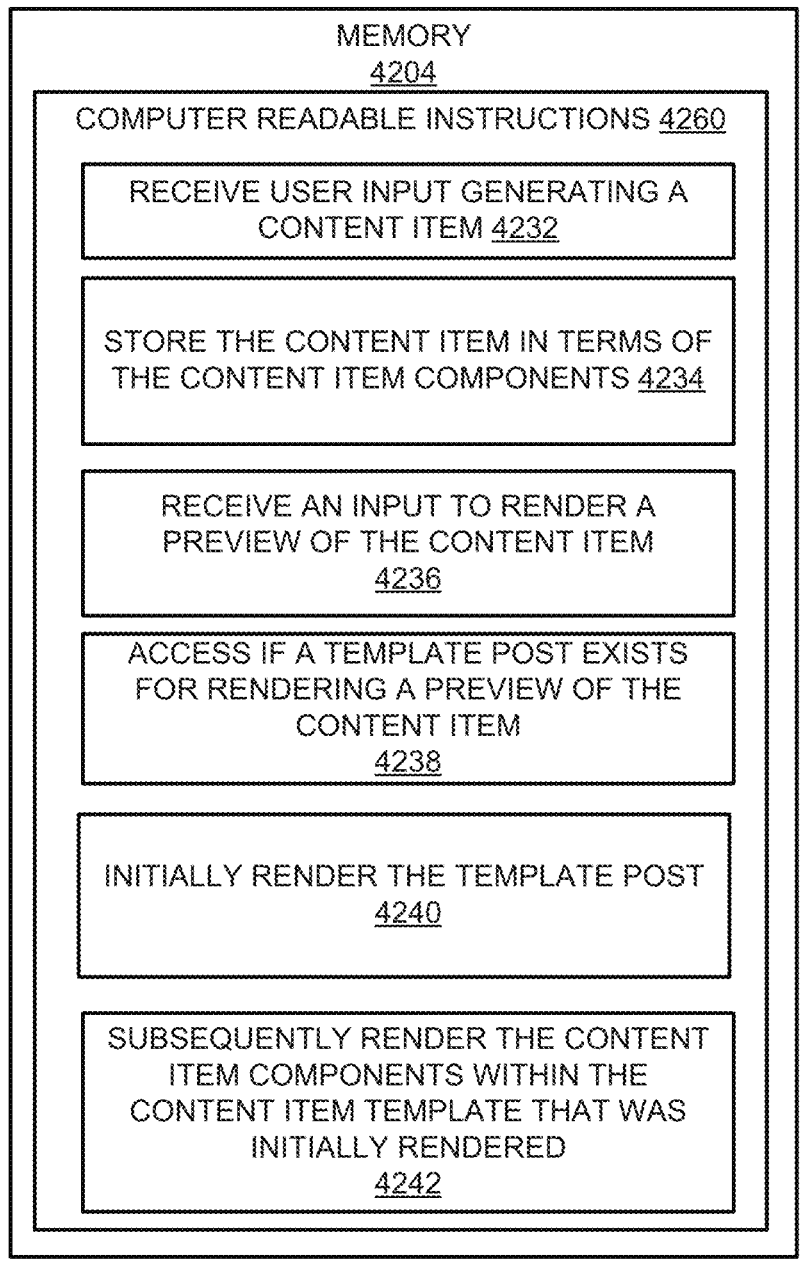
FIG. 15B illustrates a block diagram of a memory included in the computer system used for the creation and presentation of content items, according to an example.

FIGS. 15A-15B illustrate a block diagram of a computer system 3200 and a memory 4204 included therein that is used for the creation of content items such as page posts, according to an example. As shown in FIG. 15A the computer system 3200 may include a processor 4202 and a memory 4204.

FIG. 15B illustrates a block diagram of the memory 4204 including computer-readable instructions 4260, that when executed by the processor 4202 may be configured to provide for a series of optimizations for improving the performance of a social media website in terms of speeding up the process of posting content such as advertisements on the social media platform according to an example. In the interests of brevity, the description of similar components used in FIGS. 15A-15B are not repeated herein. Unless otherwise specified, it may be assumed that the descriptions for FIGS. 14A-14B for similar components are equally applicable to FIGS. 15A-15B.

The processor 4202 executes computer readable instructions 4260 from the memory 4204 to execute a process that enables a faster rendering of content item previews such as ad previews in webpages using a placeholder data structure such as a template post 4284. The template post 4284 may include a placeholder data structure that is generated using one or more of Hypertext Markup Language (HTML), JavaScript, eXtensible Markup Language (XML), etc. The processor may execute instructions 4232 to receive user input generating a content item 4282 such as an advertisement for a webpage. In an example, the advertisement may be a static advertisement wherein the content may be predetermined. The content may include text, images, video, audio, UI elements, etc.

In an example, each content item can be parsed and different elements or components of the content item such as the text, images, links, etc., may be identified using Artificial Intelligence (AI) techniques such as but not limited to classifiers. The arrangement or position metadata of each of the content item components 4286 within the content item 4282 may be also be identified. The processor 4202 may therefore execute instructions 4234 to store the content item 4282 in terms of the content item components 4286 or "creative specification".

During the content item creation process the processor 4202 may execute further instructions 4236 to receive an input to render a preview of the content item 4282. In an example, the input to render the content item preview 4288 may be received explicitly from the user who may want to further edit the content item 4282.

Upon receiving the input to render the content item preview 4288, the processor 4202 may execute instructions 4238 to access a template post 4284 to generate a content item preview 4288. Therefore, a placeholder for content item components is initially rendered at the user communication device 4192. The processor 4202 may execute instructions 4240 to initially render the template post 4284 at the user communication device 4192. In an example, the template post 4284 may have a predetermined validity period which may expire. If the validity period for the template post expires the content item preview 4288 may be rendered in entirety starting with a fresh template post which may delay the content item preview rendering. When the validity period expires, a new template post may replace the expired template post.

The processor 4202 may execute further instructions 4242 to subsequently render the content item components 4286 within the template post 4284 that was initially rendered. In an example, the template post 4284 can be stored for a predetermined amount of time to an onboard cache of the memory 4204 to further speed up the rendering of the content item preview 4288, especially when a user is editing the content item 4282.

When instructions are received to render a content item preview 4298 for another content item 4292, the processor 4202 may initially render the same template post 4284 used for the content item 4282 and then render the content item components 4296 or the data from a creative specification of the content item 4292 within the template post 4284 to generate the content item preview 4298 corresponding to the content item 4292.

Figure 15C:
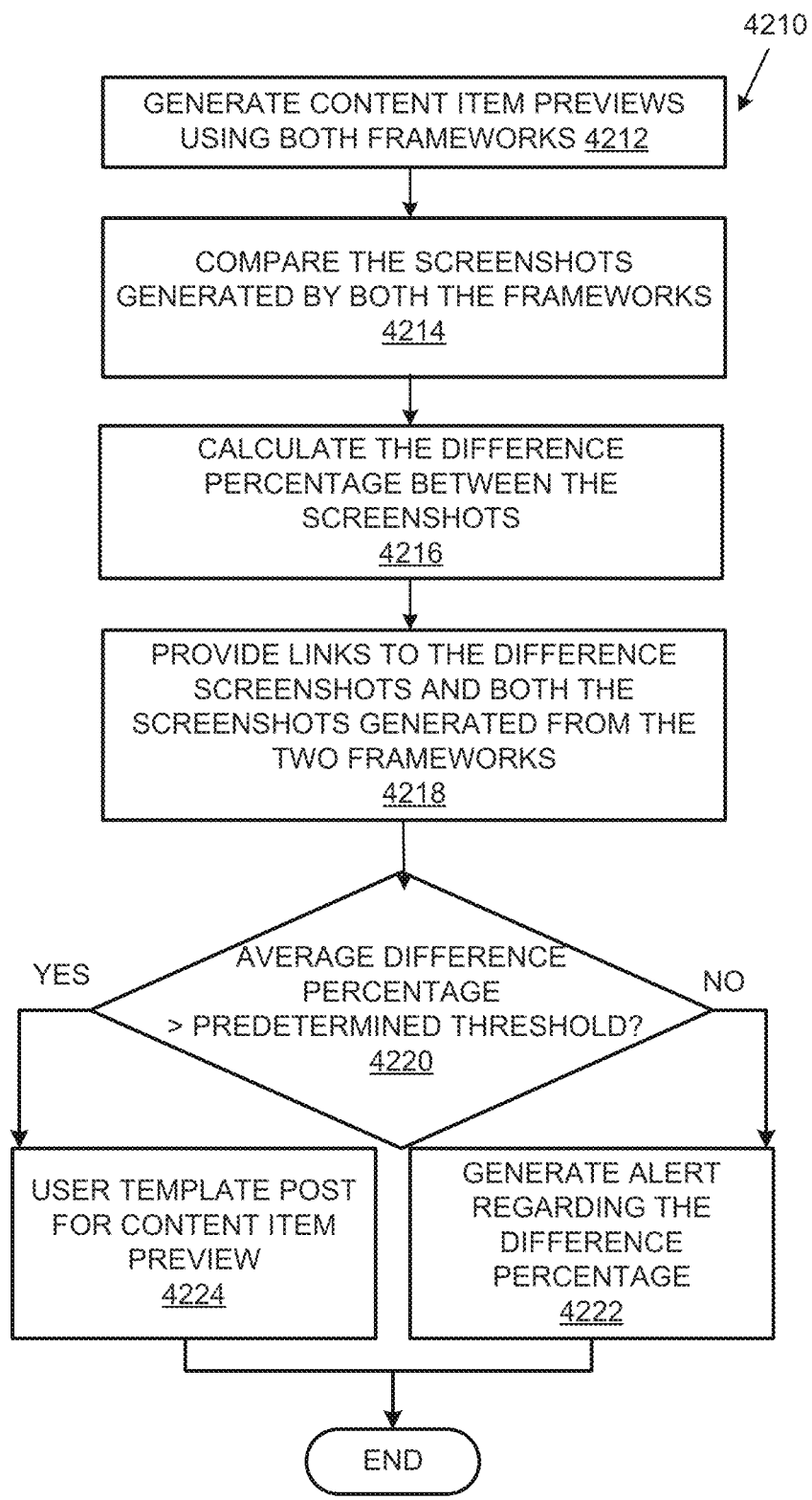
FIG. 15C shows a flowchart that details a method of addressing inconsistencies that may arise when a template post is used in accordance with some examples.

FIG. 15C shows a flowchart 4210 that details a method of addressing inconsistencies that may arise when a template post is used in accordance with some examples. Furthermore, the method also enables detecting new inconsistencies as soon as they are introduced. The method begins at 4212 wherein initially the computer system 3200 generates content item previews using both the frameworks, i.e., an original template post generated for a content item e.g., the content item 4282, and the reusable placeholder post, i.e., the template post 4284. The screenshots of the content item previews thus generated from both the frameworks are compared at 4214. The difference percentage between the screenshots generated from the frameworks is estimated at 4216. In an example, image comparison routines may be employed to obtain the difference percentage between the screenshots.

The links to the difference screenshot and the links to both the screenshots generated for both the previews are provided at 4218. At 4220 the average difference percentage of the screenshot generated from the template post 4284 and the screenshot generated from the page post of the content item 4282 is compared with a predetermined threshold to determine if the difference percentage is above the predetermined threshold. If yes, an alert is raised at 4222, else the template post 4284 may be used at 4224 for generating preview for the content item 4282. In an example, the method 4210 would be executed each time a new content item is generated in order to determine that there are no inconsistencies that are to be resolved.

Figure 16A:
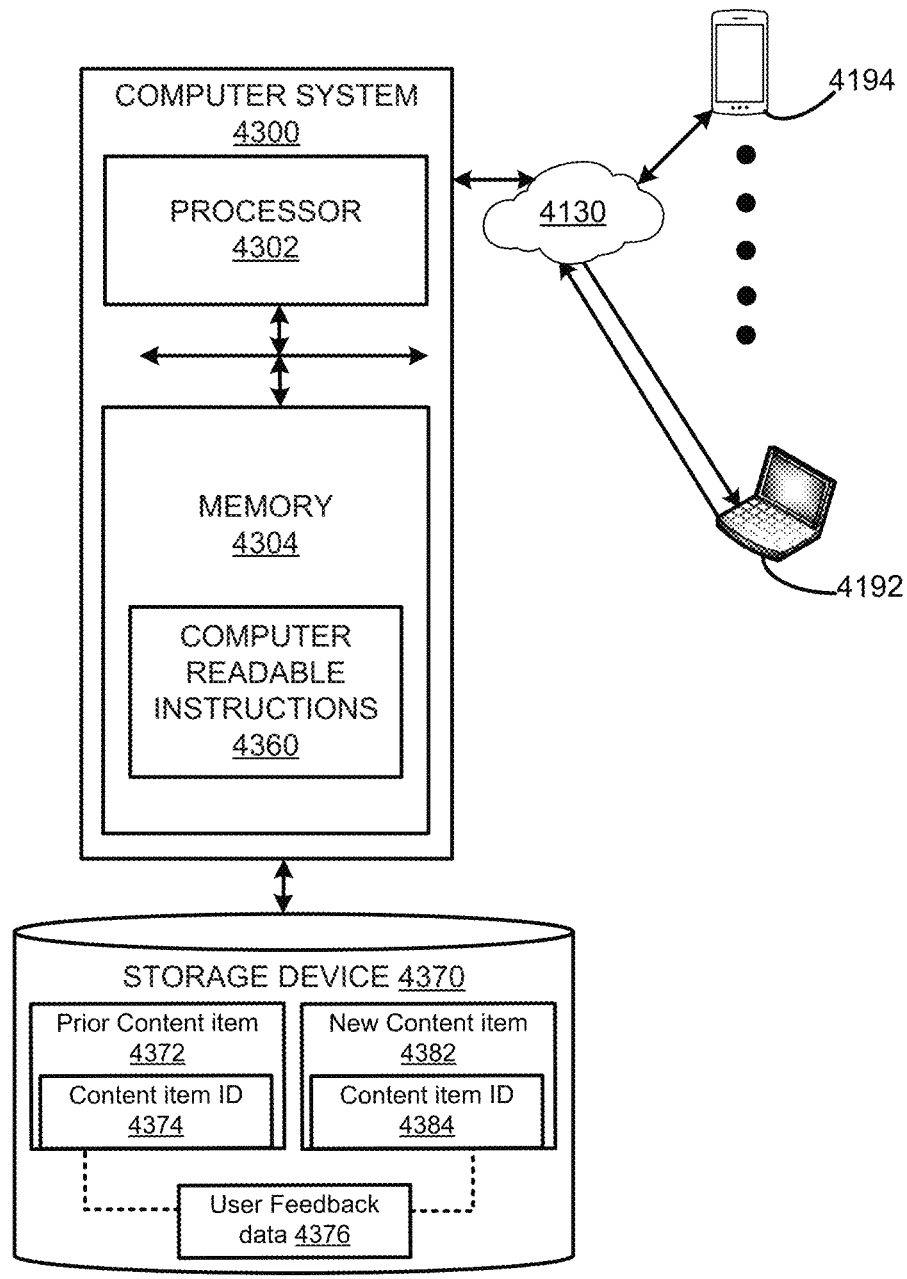
FIG. 16A illustrates a block diagram of a computer system used for the creation and presentation of content items with the user feedback data, according to an example.
Figure 16B:
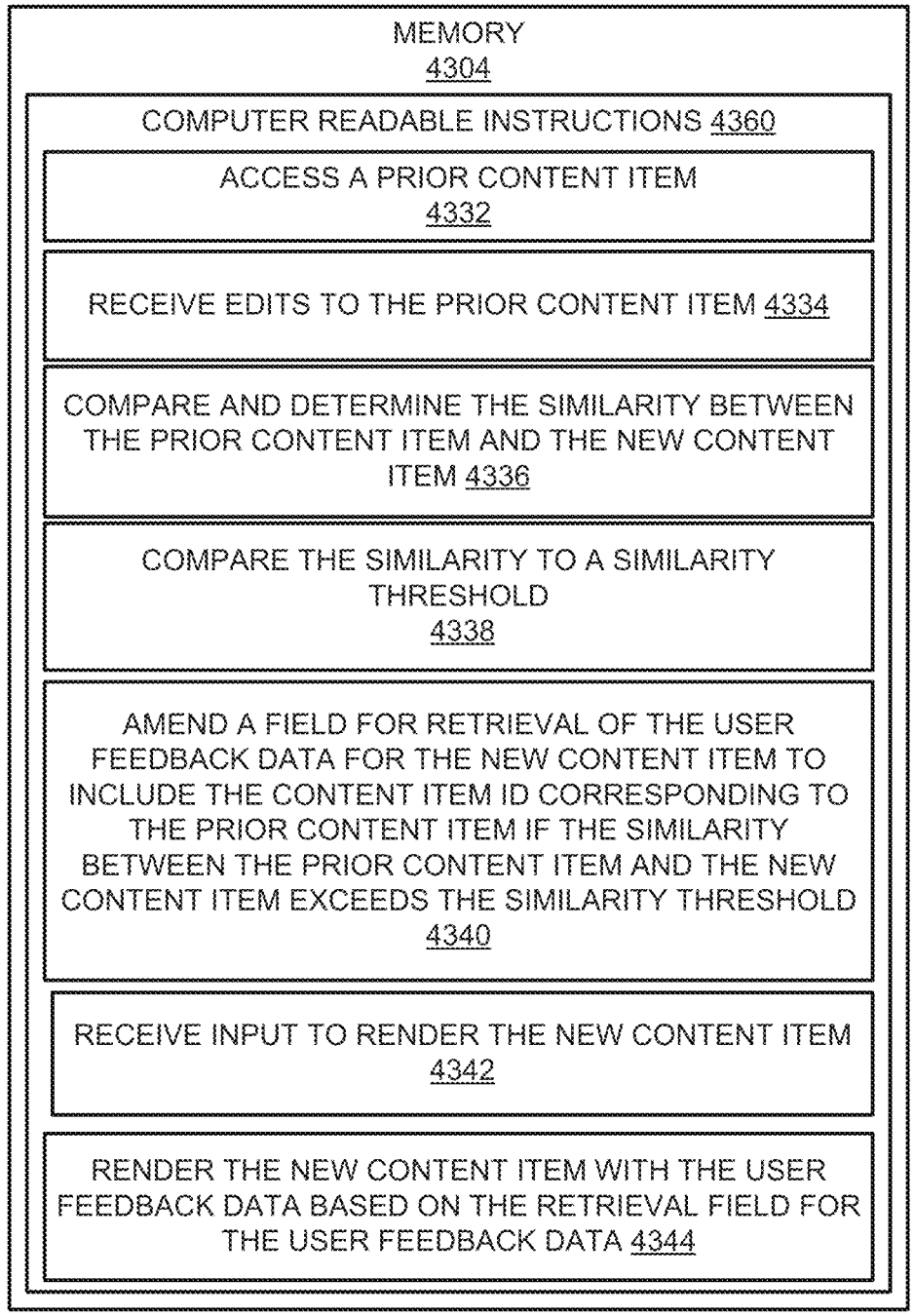
FIG. 16B illustrates a block diagram of a memory included in the computer system used for the creation and presentation of content items with the user feedback data, according to an example.

FIGS. 16A-16B illustrate a block diagram of a computer system 4300 including a memory 4304 included therein that is used for the creation and presentation of content items such as page posts along with the corresponding user feedback data according to an example. As shown in FIG. 16A the computer system 4300 may include a processor 4302 and a memory 4304. FIG. 16B illustrates a block diagram of the memory 4304 including computer-readable instructions 4360, that when executed by the processor 4302 may be configured to provide for a series of optimizations for improving the performance of a social media website in enabling proper arrangement and display of user feedback data such as likes, comments, etc., associated with a prior content item 4372 to be transferred to a new content item 4382 which may be substantially similar to the prior content item 4372 albeit minor edits. In the interests of brevity, the description of similar components used in FIGS. 16A-16B such as the processor 4302, the memory 4304 are not repeated herein. Unless otherwise specified, it may be assumed that the descriptions for FIGS. 14A-14B for similar components are equally applicable to FIGS. 16A-16B.

The processor 4302 may execute instructions 4332 to access a content item or a page post including an advertisement e.g., the prior content item 4372 identified by the content item ID 4174. The prior content item 4372 may have been displayed previously and may have received user feedback data 376 such as but not limited to, comments, likes, and shares such as forwards from one or more members to other members of the social media platform. The prior content item 4372 may include content components such as text, images, links, buttons, or other user interface (UI) elements, etc.

The processor 4302 may execute instructions 4334 to receive edits to the prior content item 4372 from a user operating the user communication device 4192. The user may edit one or more of the content components such as the text, the images, the links, buttons, or the user interface (UI) elements, of the prior content item 4372 to generate the new content item 4382.

The processor 4302 may execute instructions 336 to compare and determine the similarity between the prior content item 4372 and the new content item 4382. Various similarity determination techniques may be executed based on the user edits. For example, if the user makes changes to textual data including link data, then textual similarity techniques such as but not limited to Jaccard coefficient, Dice, and Cosine similarity may be used. If, however, the user edits image data, then image comparison which is quantified in terms of a distance measure defined on the corresponding multi-dimensional feature space may be used. Common distance measures that may be employed include but are not limited to, the Minkowski distance, the Manhattan distance, the Euclidean distance, and the Hausdorff distance. In an example, the similarity determination may be implemented by rules to speed up the content item generation process. For example, a rule may be defined so that any change in a specific data type, e.g., image data may automatically decrease the similarity below a similarity threshold thereby saving on processing resources.

The processor 4302 may execute instructions 4338 to compare the similarity between the prior content item 4372 and the new content item 4382 with a similarity threshold. In an example, the similarity threshold may be predetermined from empirical observations.

Generally, when a new content item is generated, then the field for retrieval of user feedback data is set by default to a content item ID of the new content item. Based on the comparison result obtained from executing the instructions 4338, the processor may execute instructions 4240. If the similarity between the prior content item 4372 and the new content item 4382 exceeds the similarity threshold, then the processor 4302 may execute instructions 4340 to amend a field for retrieval of the user feedback data for the new content item 4382 to include the content item ID 4374 corresponding to the prior content item 4372.

If the similarity between the prior content item 4372 and the new content item 4382 is below the similarity threshold, then the processor 4302 may leave the field for retrieval of the user feedback data unchanged for the new content item 4382 to include the corresponding content item ID 4384.

The processor 4302 may execute instructions 4342 to receive input to render the new content item 4384.

The processor 4302 may execute instructions 4344 to render the new content item 4384 with the user feedback data based on the retrieval field for the user feedback data. If the retrieval field for the user feedback data of the new content item 4382 is set to the content item ID 4374 corresponding to the prior content item 4372, then the user feedback data 376 of the prior content item 4372 is displayed with the new content item 4382. If the retrieval field for the user feedback data of the new content item 4382 is set to the content item ID 4384 of the new content item 4382, then only user feedback received after uploading the new content item 4382 is displayed as the user feedback data 4376 from the prior content item 4372 is not linked to the new content item. The users are therefore permitted to make minor tweaks or edits to content items to generate new content items without losing user feedback data so long as the changes keep the similarity above the similarity threshold.

Figure 17:
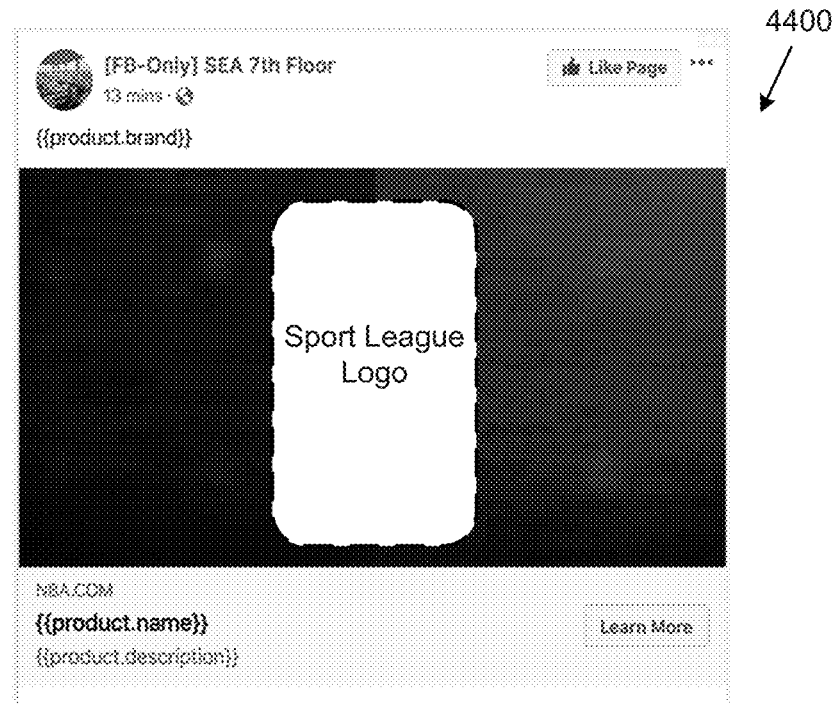
FIG. 17 shows a template post and a content item generated using the template post according to some examples.
Figure 17:

FIG. 17 shows a template post 4400 and a content item 450 generated using the template post according to some examples. As mentioned above, the template post 4400 is formed from a data structure wherein the content item components can be overlaid at the rendering time. Accordingly, the content item components such as the product brand 4452, the image 4454, the headline and description 4456, and the toolbar 4458 are stored separately and overlaid on the template post 4400 at the time of rendering to speed up the process of providing content item previews.

Figure 18:
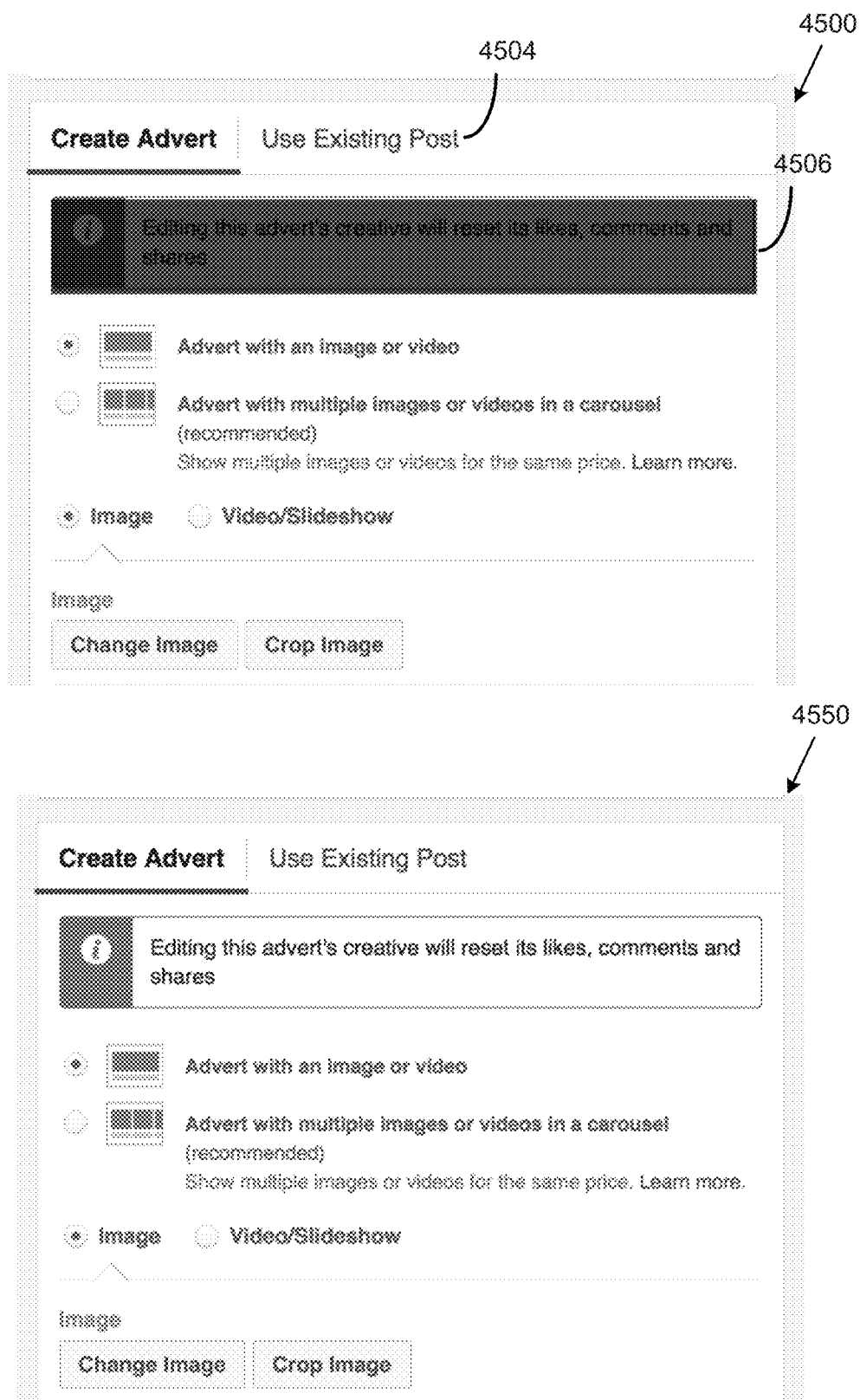
FIG. 18 shows a content item creation screen according to some examples.

FIG. 18 shows a content item creation screen 4500 accordingly to some examples. A content item such as an advert from an existing post 4504 may be generated using the content item creation screen 4500. A notice 4506 regarding the editing of the advert's creative that the user feedback data such as likes, comments, etc., will be reset may initially be grayed out or may not be displayed at all. However, as the user edits the existing post to create a new advertisement, the computer system 4300 may execute the instructions 4360, to iteratively determine the similarity between the prior content item 4372 and the new content item 4382 with each user edit. The notice 4506 may stay invisible or may remain grayed out so long as the similarity between the new content item and the prior content item remains above the similarity threshold but as the user continues to edit the new content item so that the similarity slips below the similarity threshold, the notice 4506 may be actively displayed as shown on the screen 4550.

Figure 19:
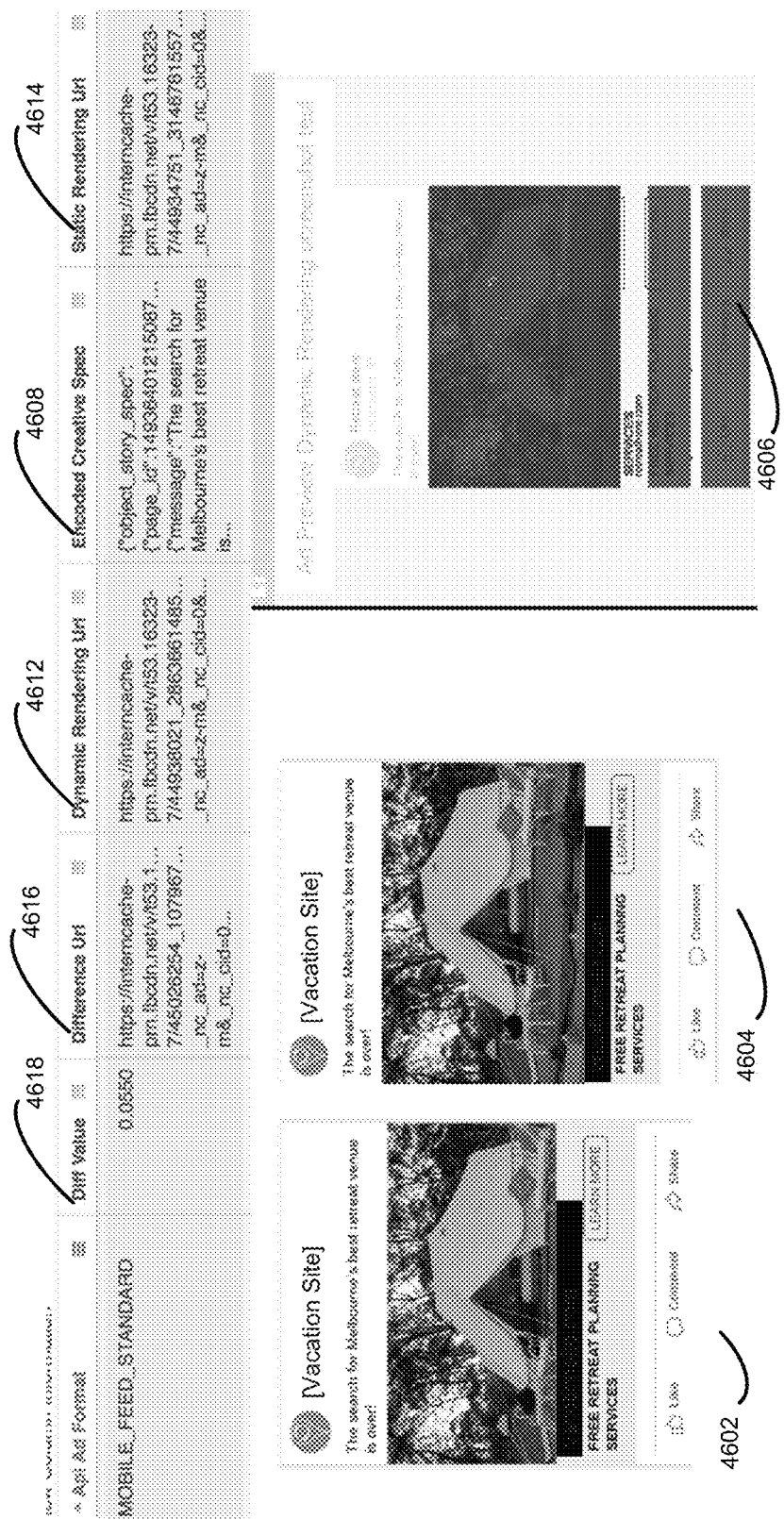
FIG. 19 shows example screenshots and a template post that may be used for generating content item previews in accordance with some examples.

FIG. 19 shows example screenshots 4602, 4604, and a template post 4606 that is used for identifying and correcting inconsistencies that may arise in the use of the template post for generating content item previews in accordance with some examples. The corresponding links that are used in the analysis of the inconsistencies include the dynamic rendering universal resource locator (URL) 4612, the static rendering URL 4614, and the difference URL 4616. The encoded creative specification 4608 is rendered on the template post 4606 during a dynamic preview of the content item. A difference value 4618 between the screenshot rendered from a page post associated with the content item versus the template post is determined to be 0.550. If the difference value 4618 is within the predetermined threshold then the template post is used, else an alert is raised.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the local systems, the user communication devices 4192, 4194, . . . etc., and the storage devices 4170, 4270 and 4370 may bar the use of information obtained from one or more of the plurality of data feeds.

In particular examples, one or more objects of a computing system may be associated with one or more privacy settings. The one or more objects may be stored on or otherwise associated with any suitable computing system or application, such as, for example, the computer systems 4100, 4200, and 4300, the user communication devices 4192, 4194, . . . etc., and the storage devices 4170, 4270 and 4370, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the computer systems 4100, 4200, and 4300, the user communication devices 4192, 4194, . . . etc., and the storage devices 4170, 4270 and 4370 or shared with other systems. Although this disclosure describes using particular privacy settings in a particular manner, this disclosure contemplates using any suitable privacy settings in any suitable manner.

In particular examples, the computer systems 4100, 4200, and 4300, the user communication devices 4192, 4194, . . . etc., and the storage devices 4170, 4270 and 4370 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the computer systems 4100, 4200, and 4300, the user communication devices 4192, 4194, . . . etc., and the storage devices 4170, 4270 and 4370 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the computer systems 4100, 4200, and 4300, the user communication devices 4192, 4194, . . . etc., and the storage devices 4170, 4270 and 4370 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the computer systems 4100, 4200, and 4300, the user communication devices 4192, 4194, . . . etc., and the storage devices 4170, 4270 and 4370 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The computer systems 4100, 4200, and 4300, the user communication devices 4192, 4194, . . . etc., and the storage devices 4170, 4270 and 4370 may access such information in order to provide a particular function or service to the first user, without the computer systems 4100, 4200, and 4300, the user communication devices 4192, 4194, . . . etc., and the storage devices 4170, 4270 and 4370 having access to that information for any other purposes. Before accessing, storing, or using such objects or information, the computer systems 4100, 4200, and 4300, the user communication devices 4192, 4194, . . . etc., and the storage devices 4170, 4270 and 4370 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the computer systems 4100, 4200, and 4300, the user communication devices 4192, 4194, . . . etc., and the storage devices 4170, 4270 and 4370.

In particular examples, a user may specify whether particular types of objects or information associated with the first user may be accessed, stored, or used by the computer systems 4100, 4200, and 4300, the user communication devices 4192, 4194, . . . etc., and the storage devices 4170, 4270 and 4370. As an example and not by way of limitation, the first user may specify that images sent by the first user through the computer systems 4100, 4200, and 4300, the user communication devices 4192, 4194, . . . etc., and the storage devices 4170, 4270 and 4370 may not be stored by the computer systems 4100, 4200, and 4300, the user communication devices 4192, 4194, . . . etc., and the storage devices 4170, 4270 and 4370. As another example and not by way of limitation, a first user may specify that messages sent from the first user to a particular second user may not be stored by the computer systems 4100, 4200, and 4300, the user communication devices 4192, 4194, . . . etc., and the storage devices 4170, 4270 and 4370. As yet another example and not by way of limitation, a first user may specify that all objects sent via a particular application may be saved by the computer systems 4100, 4200, and 4300, the user communication devices 4192, 4194, . . . etc., and the storage devices 4170, 4270 and 4370.

In particular examples, privacy settings may allow a first user to specify whether particular objects or information associated with the first user may be accessed from the computer systems 4100, 4200, and 4300, the user communication devices 4192, 4194, . . . etc., and the storage devices 4170, 4270 and 4370. The privacy settings may allow the first user to opt in or opt out of having objects or information accessed from a particular device (e.g., the phone book on a user's smart phone), from a particular application (e.g., a messaging app), or from a particular system (e.g., an email server). The computer systems 4100, 4200, and 4300, the user communication devices 4192, 4194, . . . etc., and the storage devices 4170, 4270 and 4370 may provide default privacy settings with respect to each device, system, or application, and/or the first user may be prompted to specify a particular privacy setting for each context. As an example and not by way of limitation, the first user may utilize a location-services feature of the computer systems 4100, 4200, and 4300, the user communication devices 4192, 4194, . . . etc., and the storage devices 4170, 4270 and 4370 to provide recommendations for restaurants or other places in proximity to the user. The first user's default privacy settings may specify that the computer systems 4100, 4200, and 4300, the user communication devices 4192, 4194, . . . etc., and the storage devices 4170, 4270 and 4370 may use location information provided from one of the user communication devices 4192, 4194, . . . etc., of the first user to provide the location-based services, but that the computer systems 4100, 4200, and 4300, the user communication devices 4192, 4194, . . . etc., and the storage devices 4170, 4270 and 4370, may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The computer systems 4100, 4200, and 4300, the user communication devices 4192, 4194, . . . etc., and the storage devices 4170, 4270 and 4370 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the computer systems 4100, 4200, and 4300, the user communication devices 4192, 4194, . . . etc., and the storage devices 4170, 4270 and 4370 may use a user's previous activities and calculated moods, emotions, or sentiments to determine a present mood, emotion, or sentiment. A user who wishes to enable this functionality may indicate in their privacy settings that they opt in to the computer systems 4100, 4200, and 4300, the user communication devices 4192, 4194, . . . etc., and the storage devices 4170, 4270 and 4370 receiving the inputs necessary to determine the mood, emotion, or sentiment. As an example and not by way of limitation, the computer systems 4100, 4200, and 4300, the user communication devices 4192, 4194, . . . etc., and the storage devices 4170, 4270 and 4370 may determine that a default privacy setting is to not receive any information necessary for determining mood, emotion, or sentiment until there is an express indication from a user that the computer systems 4100, 4200, and 4300, the user communication devices 4192, 4194, . . . etc., and the storage devices 4170, 4270 and 4370 may do so. By contrast, if a user does not opt in to the computer systems 4100, 4200, and 4300, the user communication devices 4192, 4194, . . . etc., and the storage devices 4170, 4270 and 4370 receiving these inputs (or affirmatively opts out of the computer systems 4100, 4200, and 4300, the user communication devices 4192, 4194, . . . etc., and the storage devices 4170, 4270 and 4370 receiving these inputs), the computer systems 4100, 4200, and 4300, the user communication devices 4192, 4194, . . . etc., and the storage devices 4170, 4270 and 4370 may be prevented from receiving, collecting, logging, or storing these inputs or any information associated with these inputs. In particular examples, the computer systems 4100, 4200, and 4300, the user communication devices 4192, 4194, . . . etc., and the storage devices 4170, 4270 and 4370 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the computer systems 4100, 4200, and 4300, the user communication devices 4192, 4194, . . . etc., and the storage devices 4170, 4270 and 4370 may use the user's mood, emotion, or sentiment to provide newsfeed items, pages, friends, or advertisements to a user. The user may specify in their privacy settings that the computer systems 4100, 4200, and 4300, the user communication devices 4192, 4194, . . . etc., and the storage devices 4170, 4270 and 4370 may determine the user's mood, emotion, or sentiment. The user may then be asked to provide additional privacy settings to indicate the purposes for which the user's mood, emotion, or sentiment may be used. The user may indicate that the computer systems 4100, 4200, and 4300, the user communication devices 4192, 4194, . . . etc., and the storage devices 4170, 4270 and 4370 may use his or her mood, emotion, or sentiment to provide newsfeed content and recommend pages, but not for recommending friends or advertisements. The computer systems 4100, 4200, and 4300, the user communication devices 4192, 4194, . . . etc., and the storage devices 4170, 4270 and 4370 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the computer systems 4100, 4200, and 4300, the user communication devices 4192, 4194, . . . etc., and the storage devices 4170, 4270 and 4370 may be restricted in its access, storage, or use of the objects or information. The computer systems 4100, 4200, and 4300, the user communication devices 4192, 4194, . . . etc., and the storage devices 4170, 4270 and 4370 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the computer systems 4100, 4200, and 4300, the user communication devices 4192, 4194, . . . etc., and the storage devices 4170, 4270 and 4370 may temporarily store the message in a content data store until the second user has viewed or downloaded the message, at which point the computer systems 4100, 4200, and 4300, the user communication devices 4192, 4194, . . . etc., and the storage devices 4170, 4270 and 4370 may delete the message from the data store. As another example and not by way of limitation, continuing with the prior example, the message may be stored for a specified period of time (e.g., 2 weeks), after which point may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the computer systems 4100, 4200, and 4300, the user communication devices 4192, 4194, . . . etc., and the storage devices 4170, 4270 and 4370 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the computer systems 4100, 4200, and 4300, the user communication devices 4192, 4194, . . . etc., and the storage devices 4170, 4270 and 4370. The user's privacy settings may specify that such information may be used only for particular processes, such as authentication, and further specify that such information may not be shared with any external system or used for other processes or applications associated with the computer systems 4100, 4200, and 4300, the user communication devices 4192, 4194, . . . etc., and the storage devices 4170, 4270 and 4370. As another example and not by way of limitation, the computer systems 4100, 4200, and 4300, the user communication devices 4192, 4194, . . . etc., and the storage devices 4170, 4270 and 4370 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the computer systems 4100, 4200, and 4300, the user communication devices 4192, 4194, . . . etc., and the storage devices 4170, 4270 and 4370. As another example and not by way of limitation, the computer systems 4100, 4200, and 4300, the user communication devices 4192, 4194, . . . etc., and the storage devices 4170, 4270 and 4370 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the computer systems 4100, 4200, and 4300, the user communication devices 4192, 4194, . . . etc., and the storage devices 4170, 4270 and 4370.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The computer systems 4100, 4200, and 4300, the user communication devices 4192, 4194, . . . etc., and the storage devices 4170, 4270 and 4370 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the computer systems 4100, 4200, and 4300, the user communication devices 4192, 4194, . . . etc., and the storage devices 4170, 4270 and 4370 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the computer systems 4100, 4200, and 4300, the user communication devices 4192, 4194, . . . etc., and the storage devices 4170, 4270 and 4370 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the computer systems 4100, 4200, and 4300, the user communication devices 4192, 4194, . . . etc., and the storage devices 4170, 4270 and 4370 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the computer systems 4100, 4200, and 4300, the user communication devices 4192, 4194, . . . etc., and the storage devices 4170, 4270 and 4370 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the computer systems 4100, 4200, and 4300, the user communication devices 4192, 4194, . . . etc., and the storage devices 4170, 4270 and 4370 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the computer systems 4100, 4200, and 4300, the user communication devices 4192, 4194, . . . etc., and the storage devices 4170, 4270 and 4370 may send a reminder to the user to confirm his or her privacy settings every six months or after every ten photo posts. In particular examples, privacy settings may also allow users to control access to the objects or information on a per-request basis. As an example and not by way of limitation, the computer systems 4100, 4200, and 4300, the user communication devices 4192, 4194, . . . etc., and the storage devices 4170, 4270 and 4370 may notify the user whenever an external system attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing content, comprising:
a processor; and
a memory storing instructions, which is executable by the processor, wherein the instructions, when executed by the processor, cause the processor to:
analyze a content item to identify an associated content provider and one or more identifying aspects;
utilize the associated content provider and the one or more identifying aspects to identify one or more associated content items;
implement one or more lift studies associated with the content item and the one or more associated content items;
implement a machine-learning (ML) model to measure creative experience associated with the content item; and
generate one or more quantitative indicators to measure and predict impact of creative qualities of a content item.

2. The system of claim 1, wherein the instructions, when executed by the processor, cause the processor to:
receive visual content information from a local display system;
analyze the visual content information to determine information relating to a viewing audience;
access a store of digital content including individual items of digital content;
generate display content utilizing the information relating to the viewing audience and the store of digital content; and
transmit the display content to the local display system for display on a display device.

3. The system of claim 2, wherein to analyze the visual content information, the instructions when executed by the processor further cause the processor to:
identify an audience characteristic relating to the viewing audience;
identify attribute information relating to the viewing audience; and
determine circumstantial information for a location associated with the visual content information.

4. The system of claim 2, wherein the visual content information includes:
visual imagery information captured by a camera device;
audience identification information relating to an individual subject in the viewing audience;
context information for a location associated with the visual imagery information; and
settings information for the location associated with the visual imagery information.

5. The system of claim 2, wherein to generate the display content, the instructions when executed by the processor further cause the processor to rank the individual items of digital content.

6. The system of claim 5, wherein to rank the individual items of digital content the instructions when executed by the processor further cause the processor to utilize a bidding system associated with the store of digital content.

7. The system of claim 2, wherein the instructions when executed by the processor further cause the processor to receive audience interest information from the local display system.

8. The system of claim 7, wherein the instructions when executed by the processor further cause the processor to modify the display content based on the audience interest information.

9. The system of claim 1, wherein the instructions, when executed by the processor, cause the processor to:
transmit a selected engagement content item for transmission to a user device;
receive an indication of interest relating to the selected engagement content item;
select, based on the received indication of interest, an enhanced content item;
process the enhanced content item to generate a stream of content data associated with the enhanced content item; and
transmit the stream of content data associated with the enhanced content item to the user device.

10. The system of claim 9, wherein the instructions when executed by the processor further cause the processor to:
transmit a viewing application component to the user device.

11. The system of claim 9, wherein a viewing application component may include a browser and a decoder.

12. The system of claim 1, wherein the instructions, when executed by the processor, cause the processor to:
receive user edits to an initial content item;
store an intermediate content item including the user edits to an onboard cache; and
generate a content item preview from the onboard cache to display the intermediate content item.

13. The system of claim 1, wherein the instructions, when executed by the processor, cause the processor to:
store a content item in terms of content item components;
receive a request to render a preview of the content item;
generate the content item preview by:
initially rendering a template post that does not include data regarding the content item components; and
subsequently rendering the content item components in the template post.

14. The system of claim 1, wherein the instructions, when executed by the processor, cause the processor to:
generate a new content item from a prior content item, wherein the new content item includes user edits to the prior content item and a user feedback data retrieval field of the new content item is set to a content item id associated with the new content item;
determine an extent of similarity between the prior content item and the new content item based on a similarity threshold;
set a user feedback data retrieval field of the new content item to a content item id associated with the prior content item if the similarity between the prior content item and the new content item is above the similarity threshold,
else leave unchanged, the user feedback data retrieval field of the new content item; and
render the new content item and user feedback data for the new content item based on the content item id included in the user feedback data retrieval field of the new content item.

15. A method for providing content to a user, comprising:
generating a new content item from a prior content item, wherein the new content item includes user edits to the prior content item and a user feedback data retrieval field of the new content item is set to a content item id associated with the new content item;
determining an extent of similarity between the prior content item and the new content item based on a similarity threshold;
setting a user feedback data retrieval field of the new content item to a content item id associated with the prior content item if the similarity between the prior content item and the new content item is above the similarity threshold,
else leave unchanged, the user feedback data retrieval field of the new content item; and
render the new content item and user feedback data for the new content item based on the content item id included in the user feedback data retrieval field of the new content item.

16. The method of claim 15, wherein the method comprises:
receiving visual content information from a local display system;
analyzing the visual content information to determine information relating to the viewing audience;
accessing a store of digital content including individual items of digital content;
generating the display content utilizing the information relating to the viewing audience and the store of digital content; and
transmitting the display content to the local display system for display on a display device.

17. The method of claim 15, wherein the method comprises:
transmit a selected engagement content item for transmission to a user device;
receive an indication of interest relating to the selected engagement content item;
select, based on the received indication of interest, an enhanced content item;
process the enhanced content item to generate a stream of content data associated with the enhanced content item; and
transmit the stream of content data associated with the enhanced content item to the user device.

18. A non-transitory computer-readable storage medium storing instructions, which when executed by a processor, performs the method of claim 15.

19. A system for providing content, comprising:
a processor; and
a memory storing instructions, which is executable by the processor, wherein the instructions, when executed by the processor, cause the processor to:
generate a new content item from a prior content item, wherein the new content item includes user edits to the prior content item and a user feedback data retrieval field of the new content item is set to a content item id associated with the new content item;
determine an extent of similarity between the prior content item and the new content item based on a similarity threshold;
set a user feedback data retrieval field of the new content item to a content item id associated with the prior content item if the similarity between the prior content item and the new content item is above the similarity threshold,
else leave unchanged, the user feedback data retrieval field of the new content item; and
render the new content item and user feedback data for the new content item based on the content item id included in the user feedback data retrieval field of the new content item.

20. The system of claim 19, wherein the instructions, when executed by the processor, cause the processor to:
transmit a selected engagement content item for transmission to a user device;
receive an indication of interest relating to the selected engagement content item;
select, based on the received indication of interest, an enhanced content item;
process the enhanced content item to generate a stream of content data associated with the enhanced content item; and
transmit the stream of content data associated with the enhanced content item to the user device.

* * * * *